US012485438B2

(12) United States Patent
Kavchok et al.

(10) Patent No.: US 12,485,438 B2
(45) Date of Patent: Dec. 2, 2025

(54) SPRAY WAND

(71) Applicant: W.M. Barr & Company, Inc., Memphis, TN (US)

(72) Inventors: Kevin Andrew Kavchok, Huntersville, NC (US); Matthew Michael Petkus, Memphis, TN (US); Alana Byrd, Memphis, TN (US); Rachel Ann Farmer, Memphis, TN (US)

(73) Assignee: W.M. BARR & COMPANY, INC., Memphis, TN (US)

( * ) Notice: Subject to any disclaimer, the term of this patent is extended or adjusted under 35 U.S.C. 154(b) by 342 days.

(21) Appl. No.: 18/103,717

(22) Filed: Jan. 31, 2023

(65) Prior Publication Data

US 2023/0166278 A1 Jun. 1, 2023

Related U.S. Application Data

(63) Continuation-in-part of application No. 17/354,783, filed on Jun. 22, 2021, now Pat. No. 11,833,553,
(Continued)

(51) Int. Cl.
*B05B 7/12* (2006.01)
*B05B 7/04* (2006.01)
*B05B 7/10* (2006.01)

(52) U.S. Cl.
CPC .............. *B05B 7/12* (2013.01); *B05B 7/0408* (2013.01); *B05B 7/10* (2013.01)

(58) Field of Classification Search
CPC ......... B05B 15/658; B05B 15/58; B05B 1/06; B05B 1/3026; B05B 1/3494;
(Continued)

(56) References Cited

U.S. PATENT DOCUMENTS

| | | | |
|---|---|---|---|
| 1,743,370 | A | 1/1930 | Messmer |
| 2,218,790 | A | 10/1940 | Gifford |

(Continued)

FOREIGN PATENT DOCUMENTS

| | | | |
|---|---|---|---|
| DE | 6807437 | U | 10/1976 |
| DE | 8814667 | U1 | 5/1989 |

(Continued)

OTHER PUBLICATIONS

International Search Report and Written Opinion for PCT/US2020/065560, dated Mar. 15, 2021, 10 pages.

(Continued)

*Primary Examiner* — Steven J Ganey
(74) *Attorney, Agent, or Firm* — Jason A. Smith; Shumaker, Loop & Kendrick, LLP

(57) ABSTRACT

A spray wand includes: a hollow tubular main body; a nozzle mounted on the output end of the main body; and a valve assembly configured to mount the input end of the main body. The valve assembly includes: a housing having an input conduit for coupling the valve assembly with a fluid source; a sealing piston biased within the input conduit toward a sealing position thereof; and a valve core having a column rotatable within the interior space of the housing and a handle extending from the column, the valve core being rotatable between at least one open position corresponding to an open condition of the valve assembly and at least one closed position corresponding to a closed condition of the valve assembly. Upon rotation of the column to at least one open position thereof, the sealing piston biased within the input conduit is pressed from the sealing position.

19 Claims, 52 Drawing Sheets

Related U.S. Application Data which is a continuation-in-part of application No. 17/124,186, filed on Dec. 16, 2020, now Pat. No. 11,679,404.

(60) Provisional application No. 63/108,597, filed on Nov. 2, 2020, provisional application No. 62/951,376, filed on Dec. 20, 2019.

(58) Field of Classification Search
CPC ....... B05B 7/2462; B05B 1/3415; B05B 7/04; B05B 7/10; B05B 7/12; B05B 7/0408; B08B 3/08; B08B 3/026; B08B 2203/0217
USPC ....... 239/310, 315, 316, 317, 322, 444, 525, 239/526, 530, 532, 581.1
See application file for complete search history.

(56) References Cited

U.S. PATENT DOCUMENTS

| | | | | |
|---|---|---|---|---|
| 2,225,759 | A | 12/1940 | Strout | |
| 2,338,615 | A | 1/1944 | Armstrong et al. | |
| 3,134,545 | A | 5/1964 | Armond | |
| 3,770,205 | A | 11/1973 | Proctor et al. | |
| 4,613,074 | A * | 9/1986 | Schulze | B08B 3/026 239/444 |
| 4,634,053 | A | 1/1987 | Herzfeld et al. | |
| 4,635,830 | A * | 1/1987 | Wehr | B05B 9/0426 239/322 |
| 4,812,070 | A | 3/1989 | Marty | |
| 5,906,316 | A | 5/1999 | Gatzemeyer et al. | |
| 6,618,977 | B1 | 9/2003 | Curro | |
| 6,814,306 | B1 | 11/2004 | Okubo | |
| 6,948,663 | B1 | 9/2005 | Graham, Jr. et al. | |
| 7,124,962 | B1 | 10/2006 | Fryan et al. | |
| 7,410,105 | B2 | 8/2008 | Horstman et al. | |
| 8,403,241 | B2 | 3/2013 | Jung | |
| 9,278,801 | B2 | 3/2016 | Gruder | |
| 9,533,331 | B1 | 1/2017 | Kane et al. | |
| 10,221,546 | B2 | 3/2019 | Mercieca | |
| 2003/0182839 | A1 | 10/2003 | Curro | |
| 2004/0082491 | A1 | 4/2004 | Olson et al. | |
| 2005/0161530 | A1 | 7/2005 | Bartsch et al. | |
| 2007/0194148 | A1 * | 8/2007 | Rosko | B05B 1/3402 239/526 |
| 2010/0320157 | A1 | 12/2010 | Sachnitzler | |
| 2011/0089253 | A1 | 4/2011 | Moorman | |
| 2012/0228800 | A1 | 9/2012 | Arora et al. | |
| 2013/0026250 | A1 | 1/2013 | Burt et al. | |
| 2013/0109609 | A1 | 5/2013 | Smith et al. | |
| 2015/0351332 | A1 | 12/2015 | Janku et al. | |
| 2018/0371727 | A1 | 12/2018 | Mercieca | |
| 2021/0187536 | A1 | 6/2021 | Kavchok et al. | |
| 2021/0187560 | A1 | 6/2021 | Petkus et al. | |

FOREIGN PATENT DOCUMENTS

| | | | |
|---|---|---|---|
| EP | 0120331 | A1 | 10/1984 |
| EP | 0819474 | A2 | 1/1998 |
| EP | 1518607 | A1 | 3/2005 |
| FR | 2906485 | A1 | 4/2008 |
| WO | 2013083929 | A1 | 6/2013 |
| WO | 2021127219 | A1 | 6/2021 |

OTHER PUBLICATIONS

International Search Report and Written Opinion for PCT/US2020/065671, dated May 7, 2021, 33 pages.
International Search Report and Written Opinion for PCT/US2022/033808, dated Sep. 28, 2022, 8 pages.
International Preliminary Report on Patentability of Patent Application PCT/US2020/065560, dated May 17, 2022, 8 pages.
International Preliminary Report on Patentability of Patent Application PCT/US2020/065671, dated May 17, 2022, 13 pages.
European Search Report Issued in EP App No. 23188523.7 on Jun. 19, 2024 (10 Pages).
Non-Final Office Action (OA) issued for U.S. Appl. No. 18/385,620; mailed on Oct. 15, 2024; 10 pages.
International Preliminary Report on Patentability Issued on Jan. 4, 2024 in PCT/US2022/033808 (7 Pages).
Notice of Allowance (NOA) issued for U.S. Appl. No. 18/204,629; dated May 31, 2024; (10 pages).
Supplementary European Search Report of corresponding European Application No. 20901173.3; mailed on Apr. 10, 2024; (16 pages).
Non-Final Office Action (NFOA) issued for U.S. Appl. No. 18/385,620; dated May 21, 2024; (14 pages).

* cited by examiner

SPRAY WAND

CROSS-REFERENCE TO RELATED APPLICATION

This application is a continuation-in-part application of U.S. patent application Ser. No. 17/354,783, filed Jun. 22, 2021, which is a continuation-in-part of U.S. patent application Ser. No. 17/124,186, filed on Dec. 16, 2020, which claims the benefit of U.S. Provisional Patent Application No. 62/951,376, filed on Dec. 20, 2019, and of U.S. Provisional Patent Application No. 63/108,597, filed on Nov. 2, 2020, in the United States Patent and Trademark Office. All above-referenced applications are incorporated herein by reference in their entireties.

FIELD OF THE INVENTION

The present invention relates to a spray wand, more particularly to a spray wand for use with a chemical or chemical formulation in solid form.

BACKGROUND OF THE INVENTION

Outdoor cleaning requires applying a significant amount of cleaner over large surface areas, such as house siding, roofs, decks, patios, and automobiles. The industry standard solution for addressing such cleaning activities are liquid based hose-end type products. These products typically contain a bottom reservoir where a concentrated liquid chemistry solution is stored. The final cleaning solution is created when a hose is attached to the nozzle of the device and water passes through the hose. Liquid concentrate is drawn up a dip tube and mixed with the water passing through the nozzle of the device. The diluted chemistry is then dispensed onto the surface to be cleaned.

Some problems with standard hose-end devices are that they tend to be very heavy, bulky, and ergonomically displeasing to use. Due to the location where the hose hooks into the device, the range of motion when cleaning is greatly hindered, and the added weight from the liquid concentrate creates the need for users to often use two hands when operating the device. Also, water flow restrictors tend to be used to ensure the correct dilution ratio is met. The use of these water flow restrictors can greatly diminish the overall reach of the diluted spray.

Thus, there is a need for a hose-end type product that is lighter and designed for an optimal ergonomic outdoor cleaning experience.

SUMMARY OF THE INVENTION

The spray wand device of present invention solves the above referenced problems, including providing a device which is ergonomically superior to current hose-end products on the market and which can easily be held with one hand when in operation. The spray wand device of the present invention can dilute concentrated solid chemistry consistently to deliver an output cleaning solution that contains a pesticidal active to kill microorganisms and be registered with the EPA.

The device of the present invention can be used to achieve the proper dilution of the solid chemistry to yield the optimal cleaning solution. Ensuring consistent and accurate dilution of solid chemistry to water is not only important for product longevity to clean large outdoor surface areas, but is even more important when ensuring the correct dosage of a pesticidal active (i.e. Calcium Hypochlorite) when killing microorganisms such as mold. Products delivering pesticidal actives must be qualified through GLP (Good Laboratory Practice) testing and registered with the EPA (Environmental Protection Agency). Such GLP testing requires a specific range of pesticidal active concentration to be defined and tested against the killing of the intended microorganism to ensure efficacy of the final cleaning solution. A device delivering the final cleaning solution needs to consistently deliver the proper dilution ratio of pesticidal actives to ensure it is the same chemistry tested in GLP testing to be compliant with the EPA.

The invention also allows water to pass over the solid chemistry in such a way that the output stream from the device has further spray reach than current hose-end products on the market.

The device of the present invention allows connection of a hose in such a way that the hose does not hinder range of motion when cleaning, and the device is light enough in weight so that the device can easily be held with only one hand when in operation. In order to achieve lighter weight, the device operates using chemistries of solid composition. This enables less weight to be used in the device since chemistries of solid composition are more concentrated than their liquid counterparts.

In at least one embodiment, a spray wand includes: a hollow tubular main body having an input end and an output end; a nozzle mounted on the output end of the main body; and a valve assembly configured to mount the input end of the main body. The valve assembly includes: a housing having a interior space and an input conduit for coupling the valve assembly with a fluid source; a sealing piston biased within the input conduit toward a sealing position thereof; and a valve core having a column rotatable within the interior space of the housing and a handle extending from the column, the valve core being rotatable between at least one open position corresponding to an open condition of the valve assembly and at least one closed position corresponding to a closed condition of the valve assembly. Upon rotation of the column to at least one open position thereof, the sealing piston biased within the input conduit is pressed from the sealing position.

In at least one example, upon rotation of the column to at least one open position thereof, the sealing piston biased within the input conduit is pressed by a contoured section of the column from the sealing position.

The housing may have an input opening from the input conduit to the interior space, and the sealing piston can include a knob received by the input opening and extending toward the contoured section of the column.

The contoured section of the column may include at least one recess that aligns with the input opening when the valve core is at the at least one closed position, permitting the sealing piston to reside at the sealing position thereof.

The contoured section of the column may include at least one input channel that aligns with the input opening when the valve core is at the at least one open position.

In at least one example, the contoured section of the column includes a cam that aligns with the input opening and presses the sealing piston from the sealing position when the valve core is at the least one open position.

The cam, in at least one embodiment, bifurcates the at least one input channel.

The sealing piston may include a shank and a sealing cap attached to a forward end of the shank, the sealing cap facing the input opening.

The sealing piston may include a fluted knob attached to the forward end of the sealing cap.

The fluted knob may have a cruciform profile defined by four external flutes.

In use, source fluid flows along the external flutes from the input conduit into the input opening when the sealing piston biased within the input conduit is pressed from the sealing position.

The sealing cap, in various non-limiting examples, has a planar annular forward surface for sealing the input opening, or a tapered forward surface for sealing the input opening.

A helical compression spring may be mounted on the shank trapped between the cap and a vented retainer that engages the interior of the input conduit.

The spray wand may include a cartridge assembly having a swirl chamber and an elongate container extending along a longitudinal axis, the swirl chamber having a rearward end for engaging a forward end of the valve assembly.

In at least one example, the swirl chamber includes openings in a rearward side thereof leading into raised projections each having a respective exit window that is radially offset from the longitudinal axis.

The swirl chamber may include a forward extending inner wall that circumferentially surrounds the raised projections and exit windows to divert source fluid radially and tangentially with respect to the longitudinal axis such that source fluid flows circumferentially in a tangential swirling manner within the inner wall of the swirl chamber around the longitudinal axis and forward along the longitudinal axis.

The housing may have a mix output opening leading to the swirl chamber and a bypass output opening leading to the main body.

The valve core may have a mix output channel and a bypass output channel that are offset and directed in opposite radial directions to align in alternating order with the respective mix output opening and bypass output opening corresponding to mix and bypass modes of the spray wand as the valve core is rotated.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DETAILED DESCRIPTIONS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Figure 1:
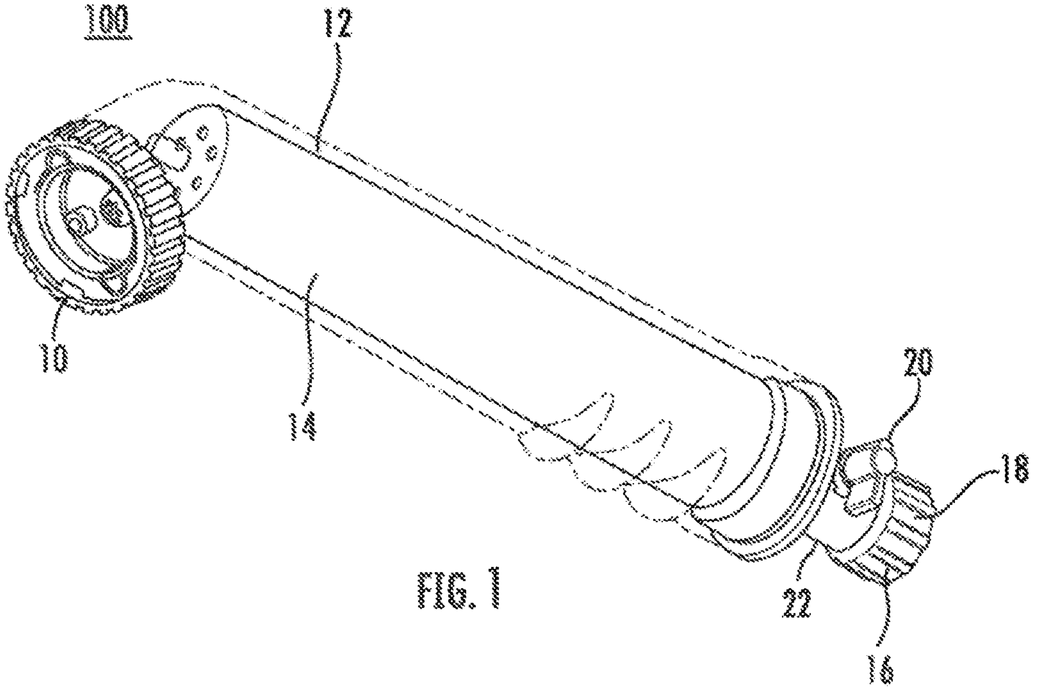
FIG. 1 is an isometric view of a spray wand with a refill cartridge assembly in accordance with the present invention.

In an embodiment of the invention, a spray wand 100 is provided. Spray wand 100 comprises a spray nozzle 10, a non-disposable spray body 12 shown in a shape of a tube, and a replaceable refill cartridge assembly 14 inside of spray body 12. Referring to the figures, FIG. 1 is an isometric view of spray wand 100 in accordance with the present invention. Spray wand 100 comprises non-disposable spray body 12 and replaceable refill cartridge assembly 14 having a refill cartridge that holds a chemical or chemical formulation in solid form, also referred to herein as a solid chemistry. At a shut-off or hose end 16 of spray wand 100, a user connects a garden hose with a rotating or swivel hose nut to a hose nut 18 of hose end 16. The user can open and close the fluid flow with a shut-off valve 20. Shut-off valve 20 is located on a handle 22 of spray wand 100 which allows the user, for example, to turn off water in the middle of use at handle 22 and detach the spray body to replace the solid chemistry or cartridge.

Water passes through refill cartridge assembly 14 in a tangential swirling manner that tumbles or flows through the solid chemistry, maximizing exposure to the solid chemistry resulting in higher applied chemistry concentration. The chemistry fluid mix is dispensed at distal nozzle 10. The user can rotate nozzle 10 to select a desired spray setting. Although two settings are shown, additional spray settings may be present and are within the scope of the present invention. Nozzle 10 preferably has one or more detented positions, more preferably four detented positions.

Figure 2:
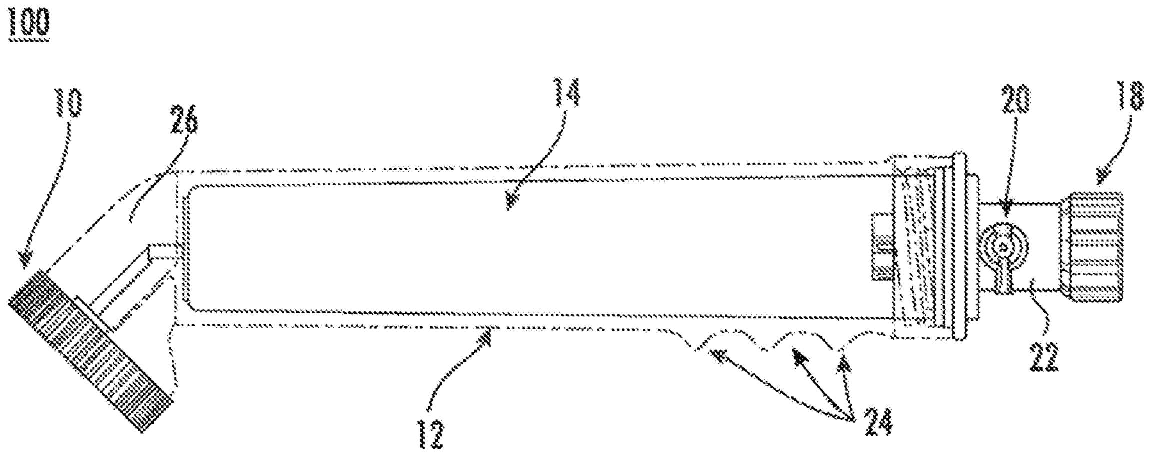
FIG. 2 is a side view of the spray wand with the refill cartridge assembly of FIG. 1.

FIG. 2 is a side view of spray wand 100 of FIG. 1. In FIG. 2, optional molded in grip features 24 are shown on spray body 12. By having grips 24 on spray body 12 versus further down past shutoff end 16, torque on an arm of a user is minimized, thus reducing user fatigue. FIG. 2 illustrates that spray wand 100 comprises spray body 12. Spray body 12 is comprised of a hollow tube, preferably transparent, with an angled wand spray end 26 attached to spray end selector or nozzle 10. FIG. 2 also illustrates shut-off valve 20 for control of water flow from a hose and hose nut 18 for connection to the hose. Spray wand 100 is particularly suited for cleaning outdoor hard surfaces.

The spray body in a form of a hollow tube is configured for receiving refill cartridge assembly 14 having a refill cartridge containing a solid chemistry. The hollow tube and/or refill cartridge may have an indicator or a marking to alert a user when the solid chemistry should be replaced to achieve a desired concentration level. The solid chemistry is preferably for cleaning, mold removal, or mildew removal purposes, among others. Examples of solid chemistry forms include, but are not limited to, pellets, tablets, or some other form of solid chemistry. Among the benefits of the solid chemistry is that the solid chemistry lasts for an extended period of time during use, makes the spray wand lighter in weight for an end user, no water volume or weight for shipping since solid active, and visibility of solid chemistry makes it possible to watch as it is used and know when to replace. Spray wand 100 of the present invention preferably contains a chemical or chemical formulation in a solid form such as a solid chlorine bleach. Non-limiting examples of chemical or chemical formulations include, but are not limited to, washing soda, baking soda, solid surfactants, calcium hypochlorite, sodium hypochlorite, citric acid, sodium sulfate, urea, quaternary amines, herbicides, insecticides, pesticides, fertilizers, and a combination thereof. Preferably, the chemical is or chemical formulation includes calcium hypochlorite. Calcium hypochlorite contains over 70% active available chlorine and has a long shelf like when stored appropriately.

Due to the geometry of spray wand 100, water passes directly over the solid chemistry and out of the nozzle of the spray wand. The spray wand of the present invention generates higher water pressures and thus further reach of spray out of the spray wand.

Spray wand 100 of the present invention has versatility in range of motion and is lighter in weight. Since the spray wand can be used with one hand, and a hose is connected into the handle of the spray wand, the spray wand can easily be adjusted to clean underneath cars or decks or other hard to reach places. The spray wand can be used one-handed making it easier for a user to lift his/her arm to get an even further reach, unlike products requiring two hands to use.

Figure 3:
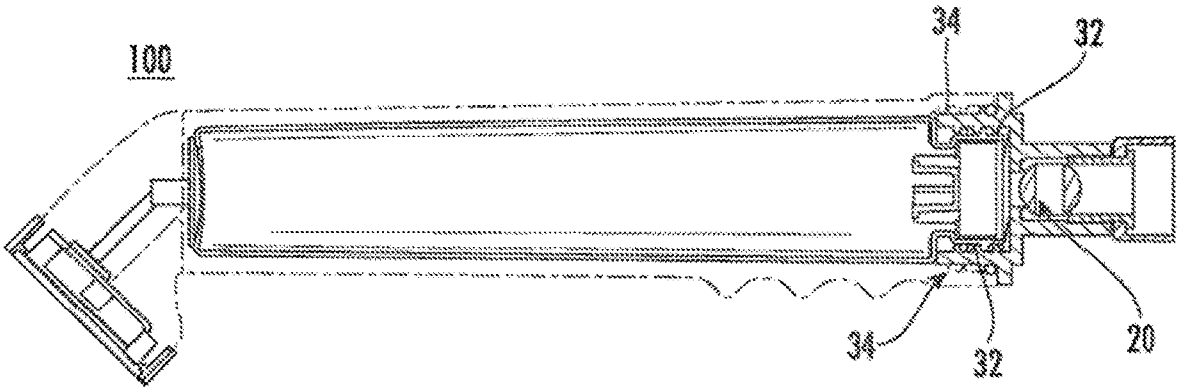
FIG. 3 is a cross-sectional view of the spray wand with the refill cartridge assembly.

FIG. 3 is a cross-sectional view of spray wand 100 with refill cartridge assembly 14. As shown in FIG. 3, external threads on the refill cartridge thread into internal threads 32 of the handle of the shut-off end of the spray wand. Once the refill cartridge is secure, the user threads the refill cartridge/shut-off assembly into threads 34 of the spray body. At this point the user rotates the shut-off valve 20 from the closed position to the open position and dispenses product.

Figure 4:
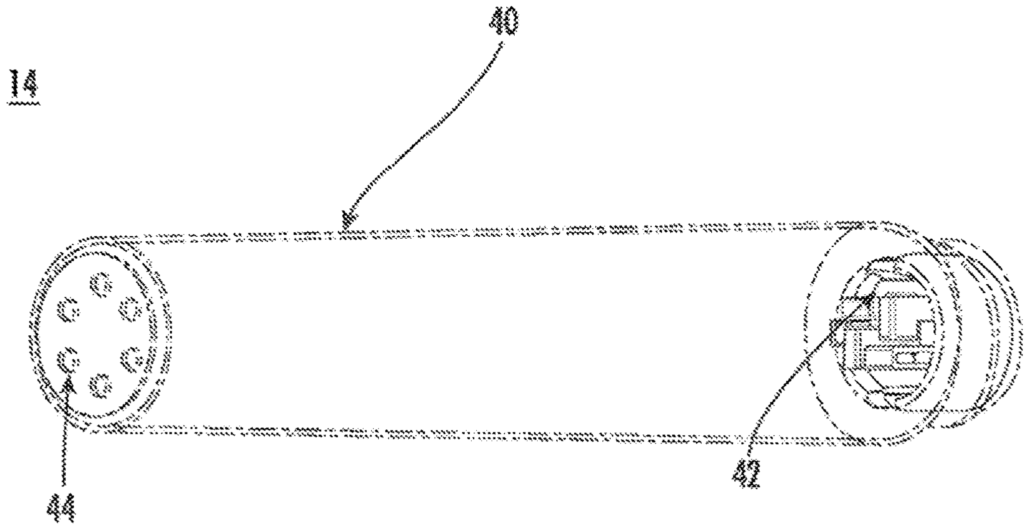
FIG. 4 illustrates the refill cartridge assembly.

FIG. 4 illustrates refill cartridge assembly 14. The refill cartridge assembly is comprised of a tubular refill cartridge 40, preferably transparent, and a swirl chamber 42 snapped into or otherwise attached or affixed to the proximal end of tubular refill cartridge 40. Refill cartridge 40 is hollow but is to be filled to contain the solid chemistry. Preferably, the tubular refill cartridge 40 is prefilled with the solid chemistry. Water enters the proximal end, travels through swirl chamber 42, the water tangentially tumbles or flows through the solid chemistry present and exits through orifices 44 on the distal end of refill cartridge 40.

Figure 5:
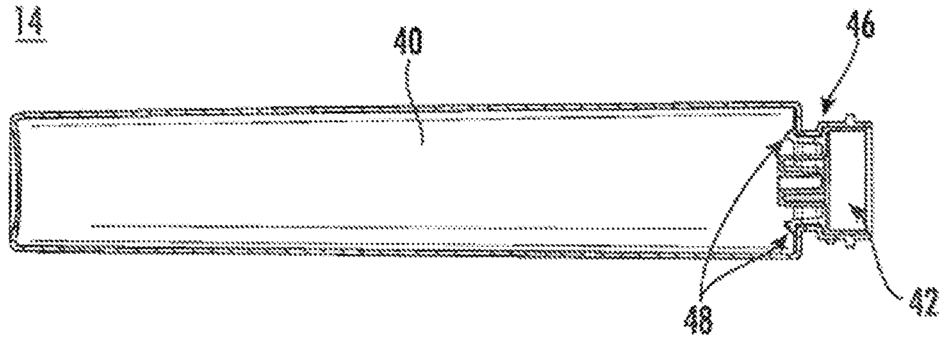
FIG. 5 is a cross-sectional view of the refill cartridge assembly.

FIG. 5 is a cross-sectional view of refill cartridge assembly 14. FIG. 5 illustrates how swirl chamber 42 is positioned within the refill cartridge. Swirl chamber 42 is inserted or pushed into refill cartridge 40 until swirl chamber 42 bottoms out on a shoulder(s) 46 of refill cartridge 40. Prongs or tabs 48 extending as part of swirl chamber 42 provide a one-way snap feature to engage with refill cartridge 40 preventing removal. It is also conceived that the swirl chamber could be attached to the refill cartridge using a threaded connection such as with a child resistant ratchet feature. The swirl chamber may also be attached by being chemically adhered or welded to the refill cartridge.

Spray wand 100 by use of swirl chamber 42 creates turbulence and/or a cyclone effect with water flow within the tubular body and re-directs the water flow over the solid chemistry so that the solid chemistry does not dilute too quickly and achieves chemical concentrations needed for effectiveness Changing the refill cartridge is used to meter the water flow to achieve an appropriate dilution of the solid chemistry. This is important for certain chemical products, such as products used to kill mold.

The advantage to the user with a transparent refill cartridge is that visibility allows the user to see the solid chemistry dissolve and to also know when to replace the solid chemistry and/or refill cartridge. The refill cartridge top has holes small enough to keep beads from blocking an exit orifice, but yet water moving through the exit orifice uninterrupted. Another benefit is the user need not touch the solid chemistry which can be toxic or is in concentrated solid form. The screw in/threaded connection of the refill cartridge assembly to the handle of the spray wand allows for water to pass through the refill cartridge for proper dilution of solid chemistry.

Figure 6:
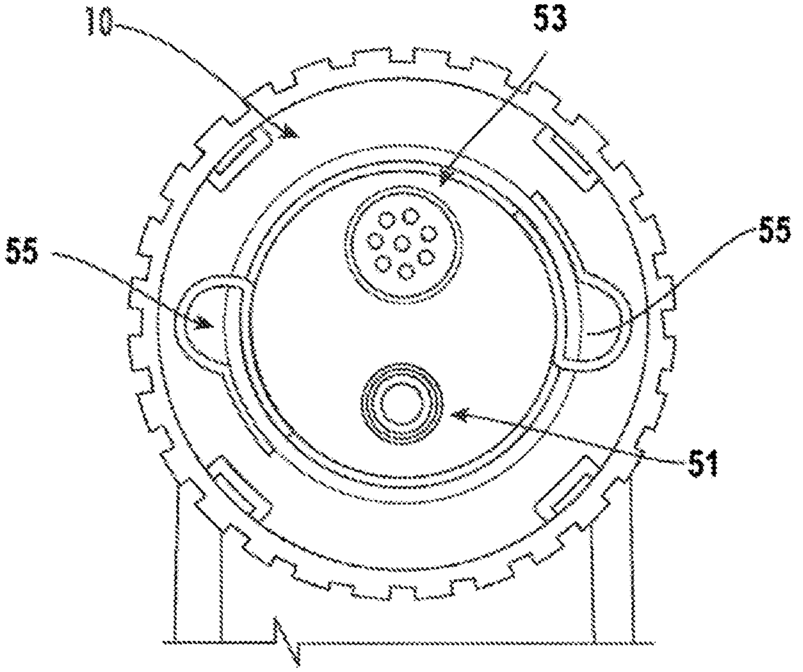
FIG. 6 is a close-up view of the spray nozzle.
Figure 7:
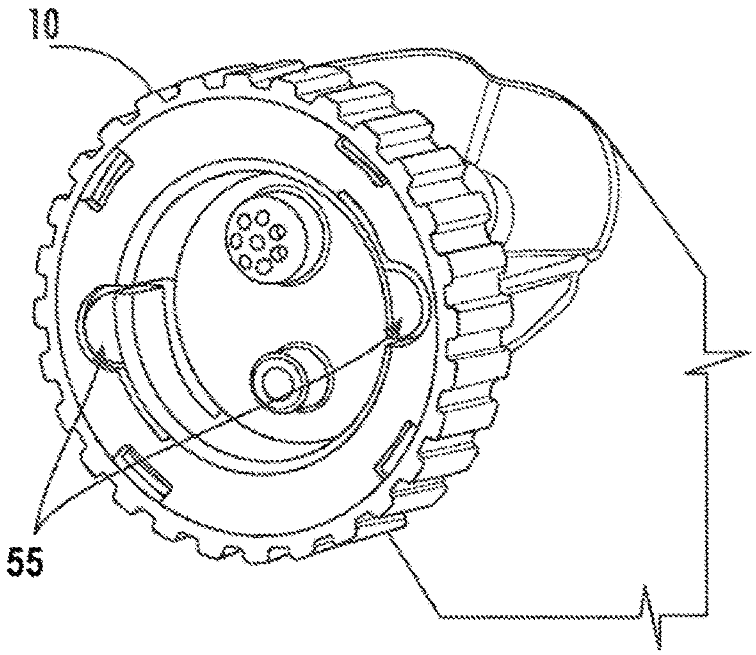
FIG. 7 is an isometric view of the spray nozzle.
Figure 8:
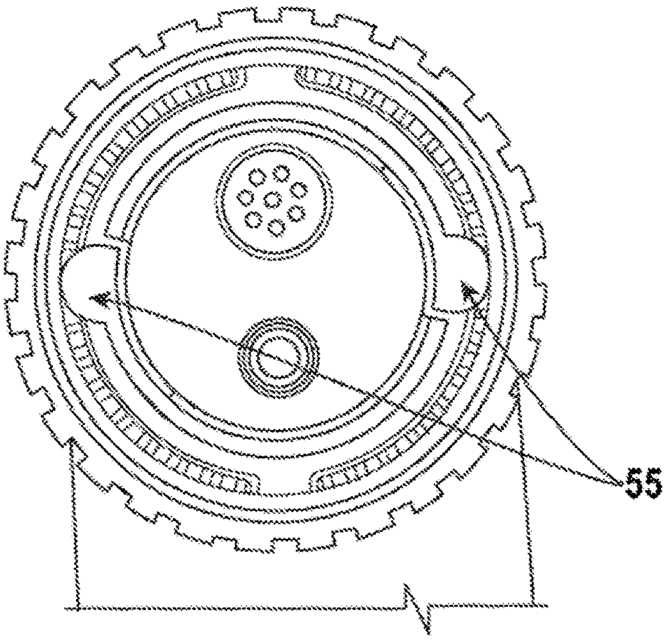
FIG. 8 is a cross-sectional view of the spray nozzle.

FIG. 6 is a close-up view of spray nozzle 10. Spray nozzle 10 preferably has at least two user selected settings, "stream" or "spray." The "stream" setting has a stream orifice 51. The "spray" setting has a spray orifice 53 in spray nozzle 10. The user can rotate the nozzle to make the spray selection. It is conceived that more than two settings are possible which may include a fan spray setting, for example. In FIG. 6, one or more detents 55 are features that are shown to cue the user and hold the spray nozzle into position. FIG. 7 is an isometric view of spray nozzle 10. FIG. 8 is a cross-sectional view of spray nozzle 10. FIG. 8 illustrates how detents 55 of the spray nozzle 10 interface with one or more detent pockets 60 (shown in FIG. 11) in the spray body to hold the spray nozzle into rotational position when in use.

Figure 9:
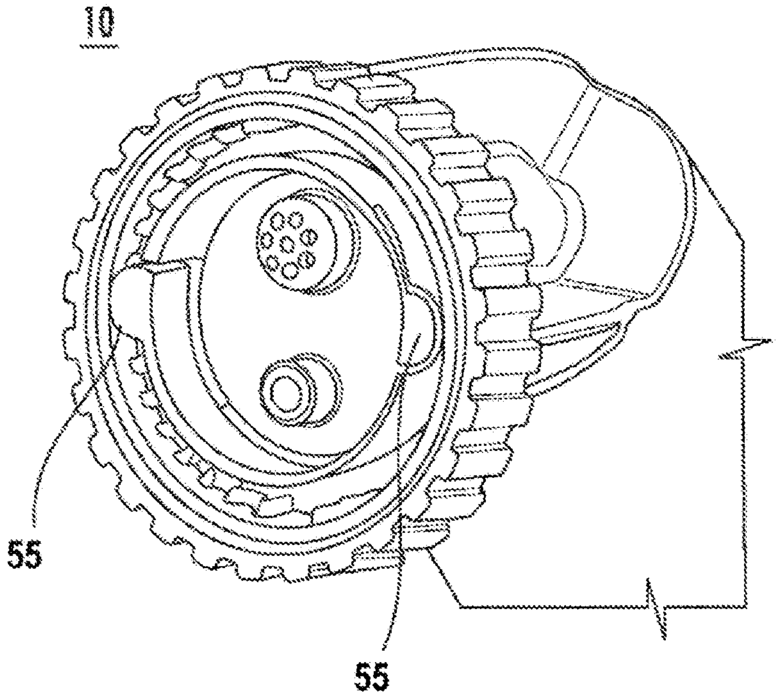
FIG. 9 is a cross sectional-isometric view of the spray nozzle.

FIG. 9 is a cross sectional-isometric view of spray nozzle 10. FIG. 9 provides another perspective on part interaction. When the user rotates spray nozzle 10, the spray nozzle detents 54 flex and snap into the next set of detent pockets 60.

Figure 10:
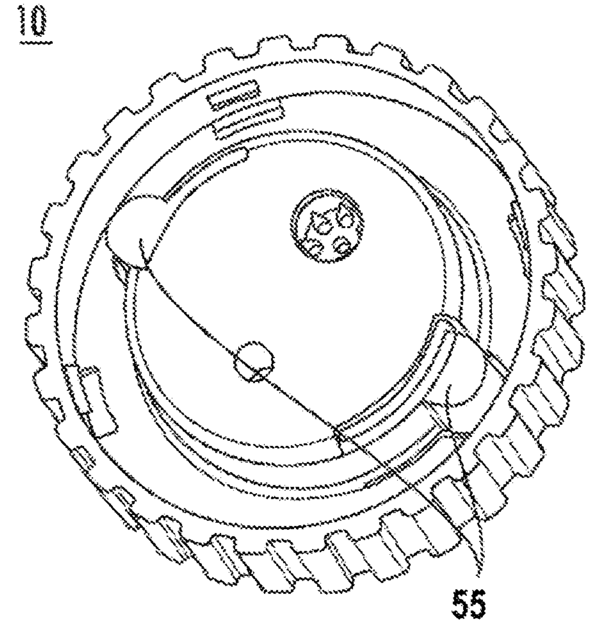
FIG. 10 is an internal view of the spray nozzle.

FIG. 10 illustrates molded in detents 54. Detents 54 in the spray nozzle can flex in and out to allow the user desired rotational movement.

Figure 11:
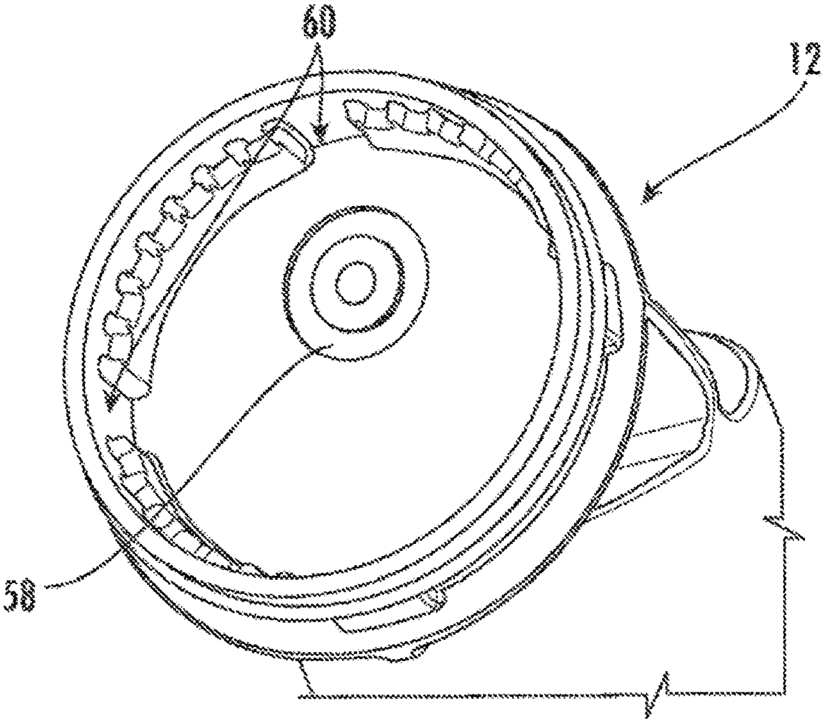
FIG. 11 is an end view of the spray body.

FIG. 11 illustrates mating spray body detent pockets 60 with which the spray nozzle detents 54 interact. The number of possible positions for the spray nozzle may vary. For example, FIG. 11 shows four positions for the spray nozzle. The user can select a spray pattern. When in a selected spray pattern, molded spray nozzle detents 54 fall into, and position is retained by, detent pockets 60 in spray body 12. It is contemplated that more than two settings may be present, which may include a fan spray setting. FIG. 11 also illustrates a recess 58 where an O-ring will be located.

Figure 12:
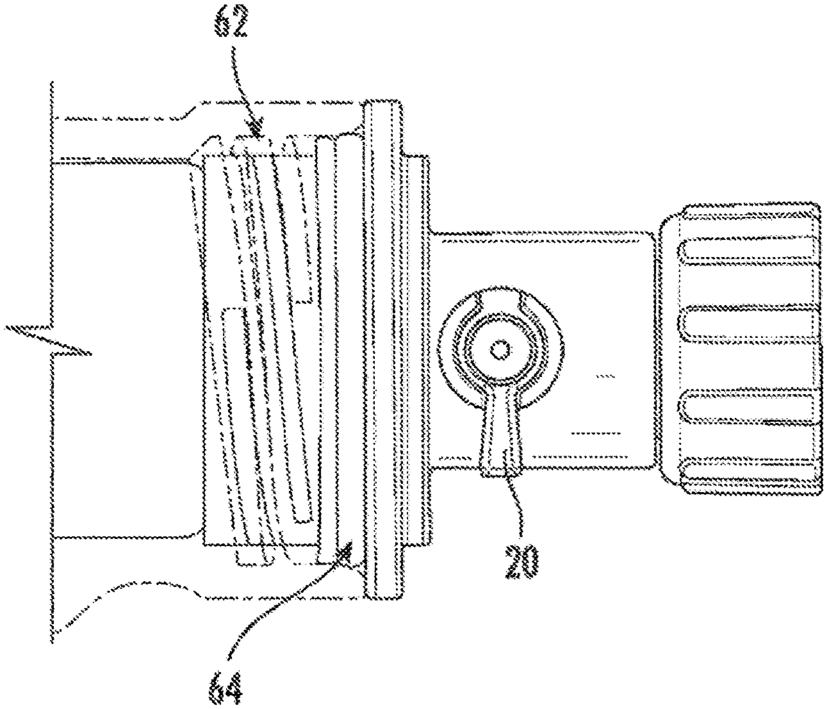
FIG. 12 illustrates the hose and refill connector.

FIG. 12 illustrates the hose end and refill connector. FIG. 12 illustrates a close-up view showing a threaded attachment 62 between shut-off valve 20 and the spray body. FIG. 12 also shows an O-ring 64 that provides a fluid seal between the spray body and the shut-off valve.

Figure 13:
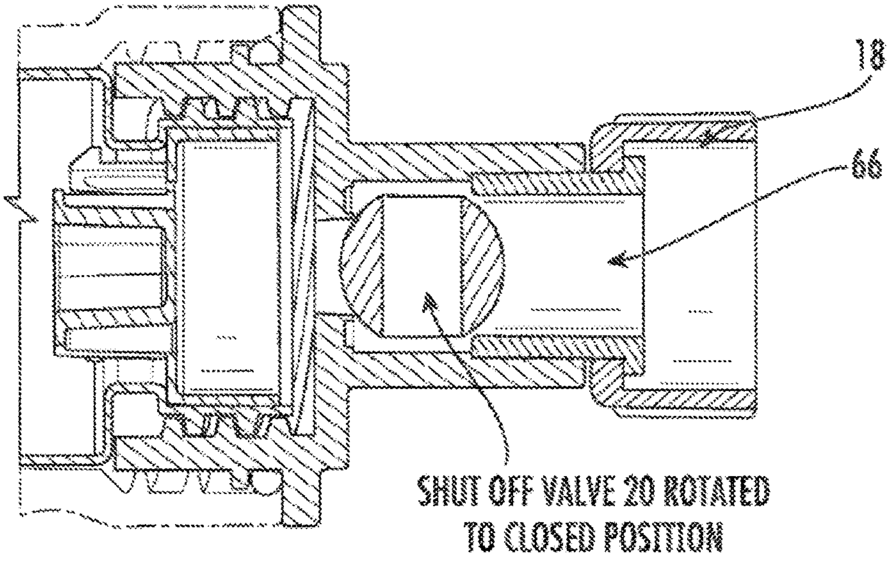
FIG. 13 is a cross-sectional view of the hose and refill connector.

FIG. 13 is a cross-sectional view of the connect between the hose end and the refill cartridge. FIG. 13 shows shut-off valve 20 rotated to the closed position. FIG. 13 also illustrates hose nut 18 attached to a hose nut retainer 66.

Figure 14:
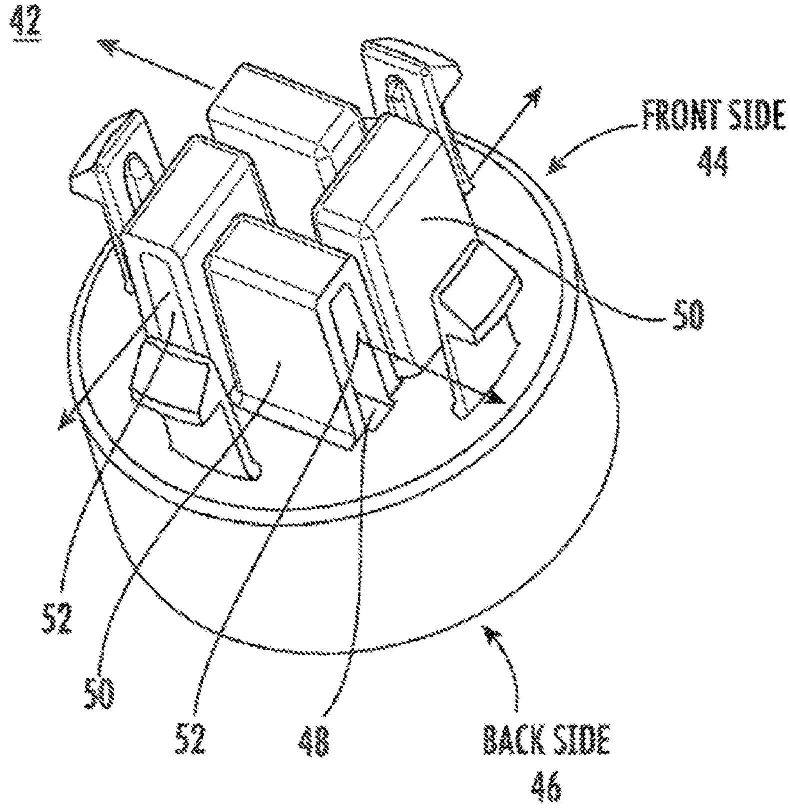
FIG. 14 illustrates a swirl chamber.
Figure 15A:
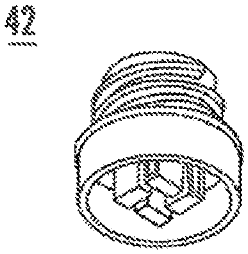
FIGS. 15A-D illustrate various views of the swirl chamber.
Figure 15B:
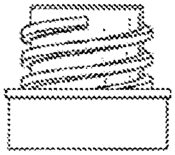
Figure 15C:
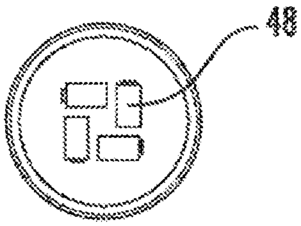
Figure 15D:
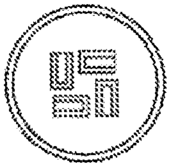

FIG. 14 illustrates swirl chamber 42. Swirl chamber 42, having a front side 44 and a back side 46, creates a fluid tumble within the refill cartridge. Without the swirling and tumbling of water, the water would directly pass through the refill cartridge and result in a lower concentration of chemistry. Water enters in a linear fashion on back side 46 of swirl chamber 42. The swirl chamber causes a directional change and the fluid exits in a tangential manner. Potential swirl chamber configurations may include one or more tangential channels 48, preferably two or more tangential channels 48. Channels 48 may be of various geometric shapes such as rectangular or helical. Providing spacing between channels results in greater tangential forces, however, it may or may not result in greater concentration. The swirl chamber has one or more raised projections 50 having fluid exit windows 52, and the fluid exit windows may be rectangular, square, round, or another shape. As illustrated, rectangular is shown. The swirl chamber may have various configurations. Considerations for selecting a configuration include, but are not limited to, suitability for an injection molding process, and cross-sectional flow area as to not restrict fluid flow. FIGS. 15A-D illustrate various views of the swirl chamber including illustrating channels 48.

During use, water passes through the swirl chamber and creates a swirl or vortex. The swirl chamber aids in preventing release of chemical too quickly or tapering off too fast. It is used to mix the water and dissolving chemical preferably at an even ratio.

As indicated above, swirl chamber 42 may have alternate configurations and still be within the scope of the present invention so long as the configuration creates a swirl or vortex of water when water passes through the swirl chamber. For example, water comes in as one stream and creates several streams in one direction to create swirl or cyclone effect.

Figure 16A:
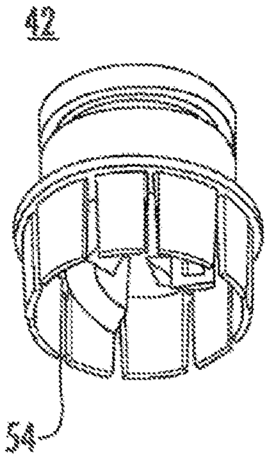
FIGS. 16A-C illustrate various views of a ramped swirl chamber.
Figure 16B:
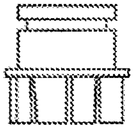
Figure 16C:

It is within the scope of the invention that there may be alternate configurations of the swirl chamber. For example, the swirl chamber may be in a form of a ramped swirl chamber having one or more ramps as projections. FIGS. 16A-C illustrate various views of a ramped swirl chamber having one or more ramps 54.

Figure 17:
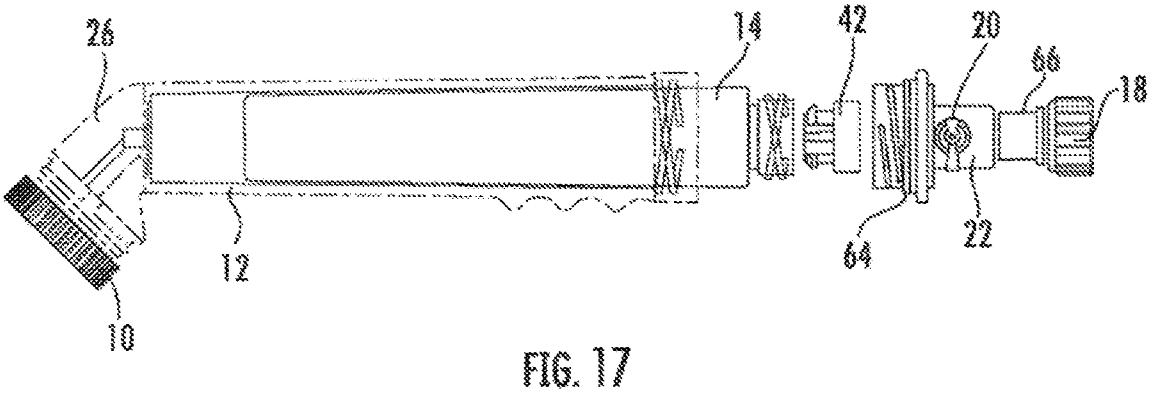
FIG. 17 is an exploded view of the spray wand with refill cartridge.

FIG. 17 is an exploded view of the spray wand with refill cartridge.

Figure 18:
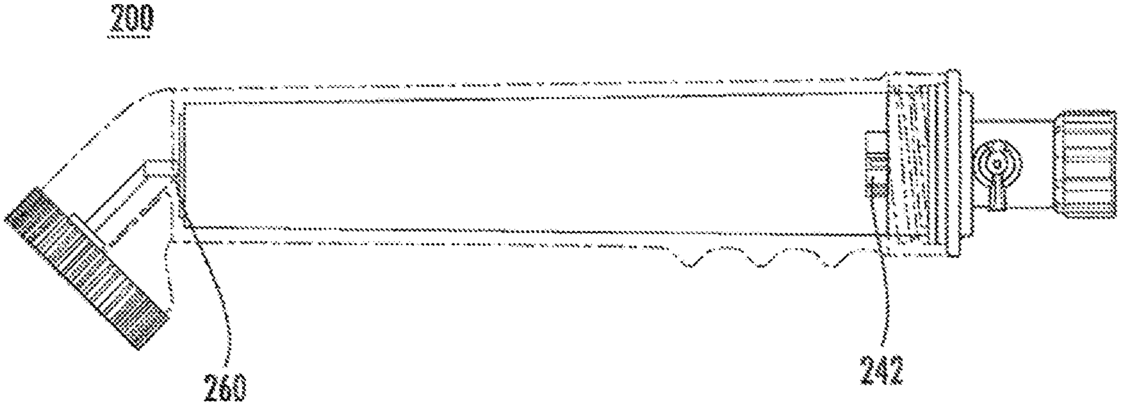
FIG. 18 is a side view of a spray wand with integrated screen and a swirl chamber.
Figure 19:
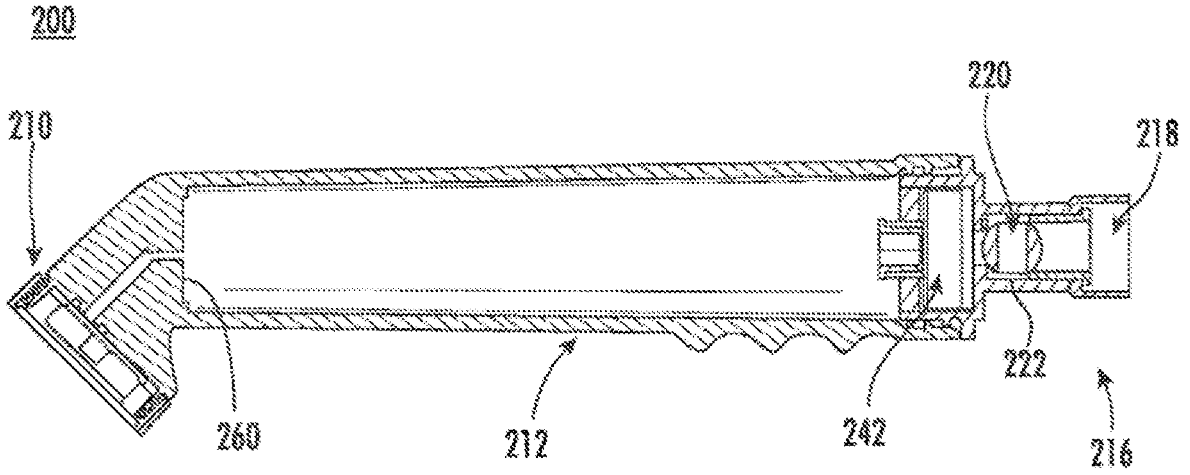
FIG. 19 is a cross-sectional side view of the spray wand with integrated screen and swirl chamber.

In another embodiment of the invention, referring to FIGS. 18 and 19, a spray wand 200 is provided with an integrated screen 260 and a swirl chamber 242, but without a refill cartridge. FIG. 18 is a side view of spray wand 200 with integrated screen 260 and a swirl chamber 242. Similar to the spray wand with refill cartridge, the spray wand with the integrated screen and the swirl chamber performs in the same manner but without a refill cartridge. In this embodiment, spray wand 200 with integrated screen 260 and swirl chamber 242 permanently fixes the screen into spray body 212 and permanently fixes swirl chamber 242 into shut-off end 216. The user loads spray body 212 with solid chemistry and screws the spray body to shut-off/hose end 216 to begin using. At the shut-off/hose end 216, the user connects a garden hose with a rotating hose nut. The user can open and close the fluid flow with a shut-off valve. Water passes through the shut-off/hose end in a tangential swirling manner that tumbles through the solid chemistry, maximizing exposure to the solid chemistry and resulting in a high applied chemistry concentration. The solid chemistry/fluid mix is dispensed at distal spray nozzle 210. The user can rotate spray nozzle 210 to select a desired spray setting. The nozzle has one or more detented positions, more preferably four detented positions.

FIG. 19 is a cross-sectional side view of the spray wand with integrated screen 260 and swirl chamber 242. In FIG. 19, there is not a refill cartridge. The swirl chamber is permanently fixed or glued in place.

Figure 20:
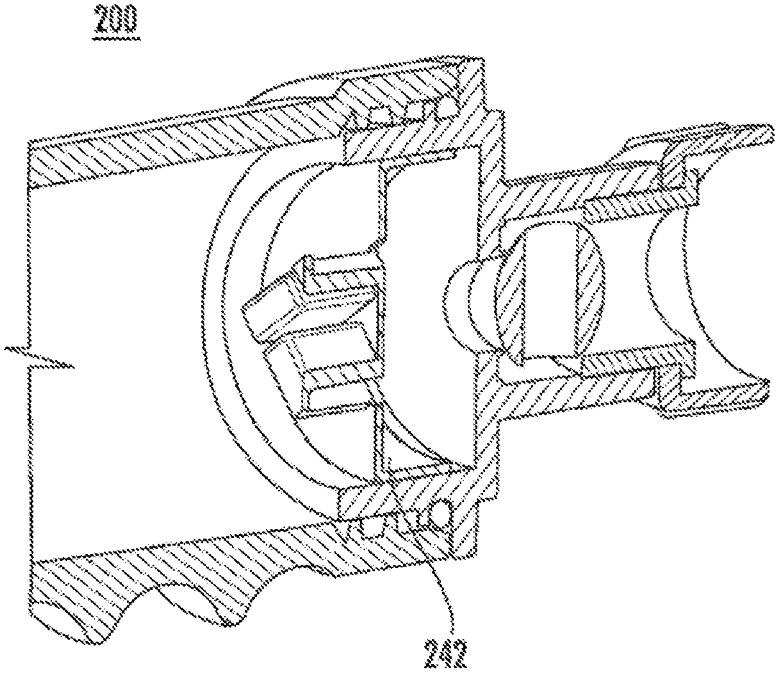
FIG. 20 is a cross-sectional, isometric view of the spray wand with swirl chamber.

FIG. 20 is a cross-sectional, isometric view of spray wand 200 with swirl chamber 242. FIG. 20 shows the direction of water flow, as water enters spray wand 200 and passes through swirl chamber 242.

Figure 21:
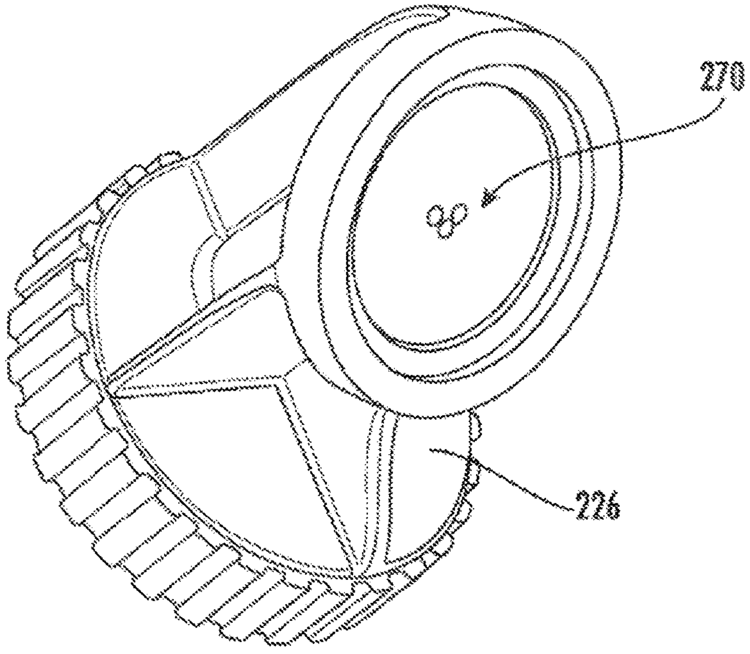
FIG. 21 is a section view of the spray body.

FIG. 21 is a section view of the angled wand spray end 226. As shown in FIG. 21, a group of smaller holes 270 is molded into the end of the spray body. This function prevents the chemistry from traveling down and blocking a single larger orifice. This function is provided by either a series of holes 270 or a permanent screen.

Figure 22:
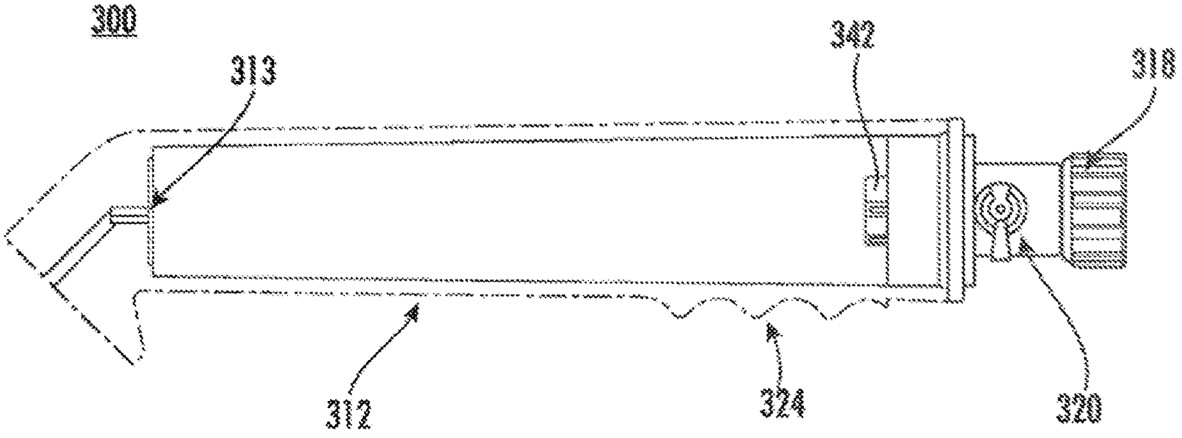
FIG. 22 is a side view of the disposable spray wand.

In another embodiment of the invention, a spray wand 300 that is disposable and non-refillable is provided. FIG. 22 is a side view of disposable spray wand 300 having grips 324. The spray wand has an integrated screen 313 and a swirl chamber 342. In this embodiment, the disposable spray wand eliminates the refill cartridge. Disposable spray wand 300 with integrated screen 313 and swirl chamber 342 permanently fixes the screen 313 into spray body 312 and permanently fixes swirl chamber 342 into the shut-off end. Disposable spray wand 300 is to be prefilled with solid chemistry and spray body 312 is permanently fixed to the shut-off/hose end having shut-off valve 320.

At the shut-off/hose end, the user connects a garden hose with a non-rotating hose nut 318. The user can open and close the fluid flow with shut-off valve 320. Water passes through the shut-off/hose end and swirl chamber 342 in a tangential swirling manner that tumbles through the solid chemistry, maximizing exposure to the solid chemistry resulting in higher applied chemistry concentration. The solid chemistry/fluid mix is dispensed at the distal end of the spray body.

Figure 23:
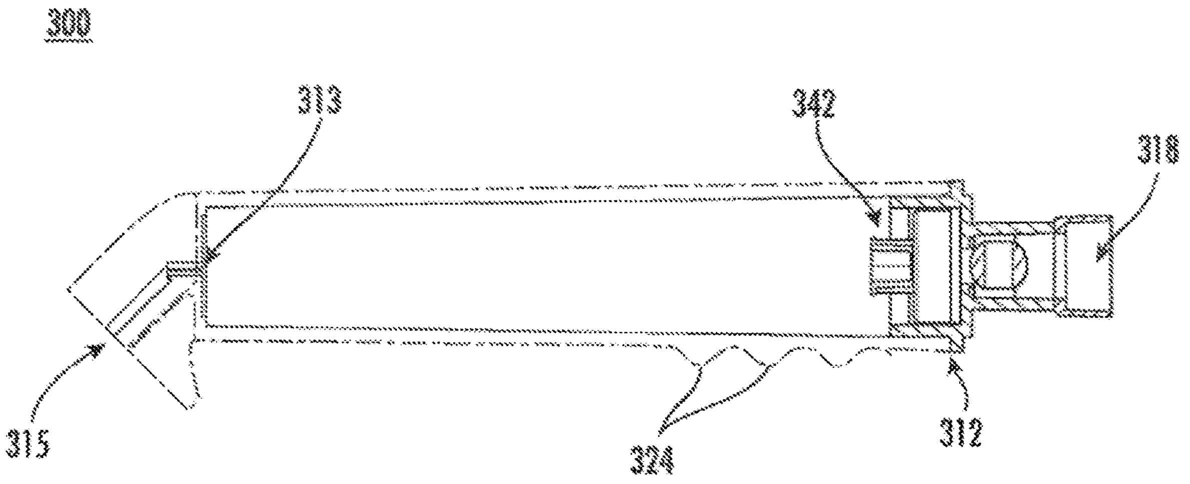
FIG. 23 is a cross-sectional side view of disposable spray wand of FIG. 22.

FIG. 23 is a cross-sectional side view of disposable spray wand of FIG. 22. Spray wand 300 comprises a single spray orifice 315, an integrated screen 313, a non-removable spray body 312 with prefilled solid chemistry, an integrated swirl chamber 342, and an integrated hose nut 318.

Figure 24:
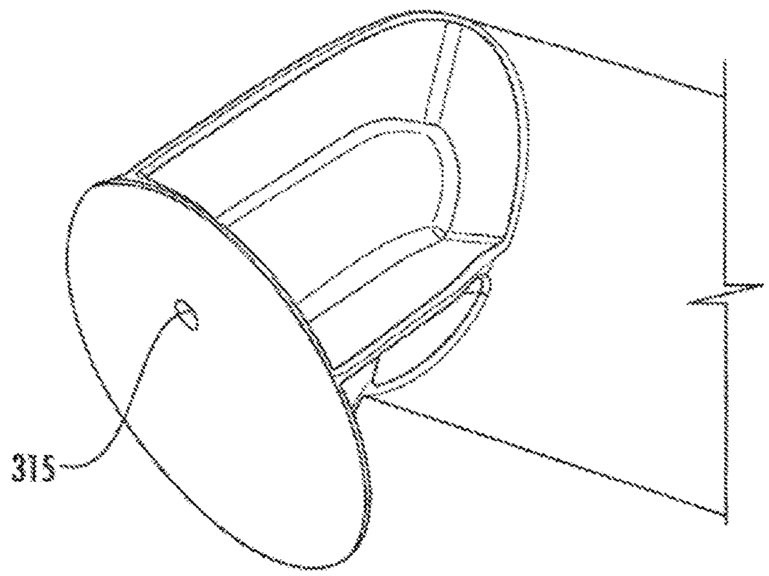
FIG. 24 illustrates the spray orifice.

FIG. 24 illustrates spray orifice 315. FIG. 24 shows a single molded in orifice to deliver the chemistry mixture. Disposable may optionally contain spray nozzle 210.

Figure 25:
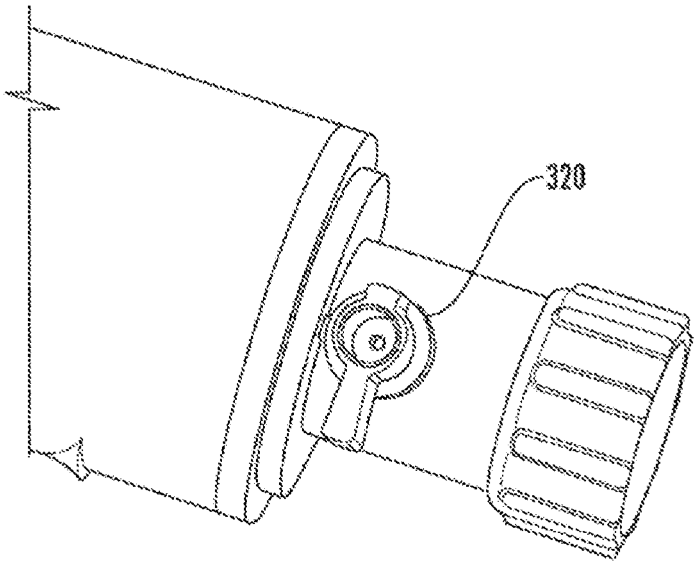
FIG. 25 is a close-up view of the integrated shut-off/hose end.

FIG. 25 is a close-up view of shut-off valve 320 of the integrated shut-off/hose end. FIG. 25 provides a close-up view of the integration of parts.

Figure 26:
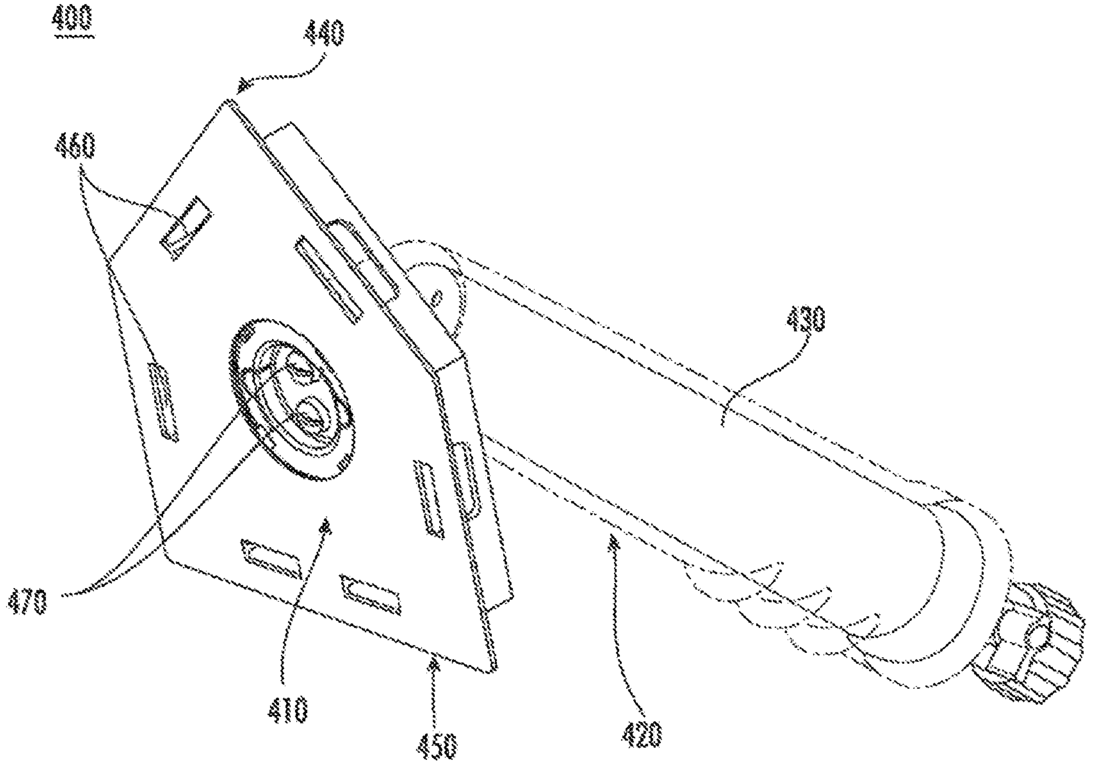
FIG. 26 illustrates the spray wand with car wash nozzle.

In an embodiment of the present invention, a spray wand with car wash nozzle is provided. FIG. 26 illustrates a spray wand 400 having a car wash nozzle 410 for use with a brush or a cloth (such as a microfiber cloth) and a refill cartridge 430 containing solid chemistry suitable for washing a car. Car wash spray nozzle 410 has a large flat foot print preferably with at least two scrub modes: a point 440 on one end to get into tight spots, and a flat surface 450 on the opposite side. The user is to wrap car wash spray nozzle 410 with a micro fiber cloth and tuck the loose ends in through holes 460. The user can cut a hole in the center for the fan spray or allow the fan spray to wet the micro fiber cloth. Car wash spray nozzle 410 preferably has two fan spray nozzles 470 to provide wide coverage of water/solid chemistry spray when in either scrub mode.

Figure 27:
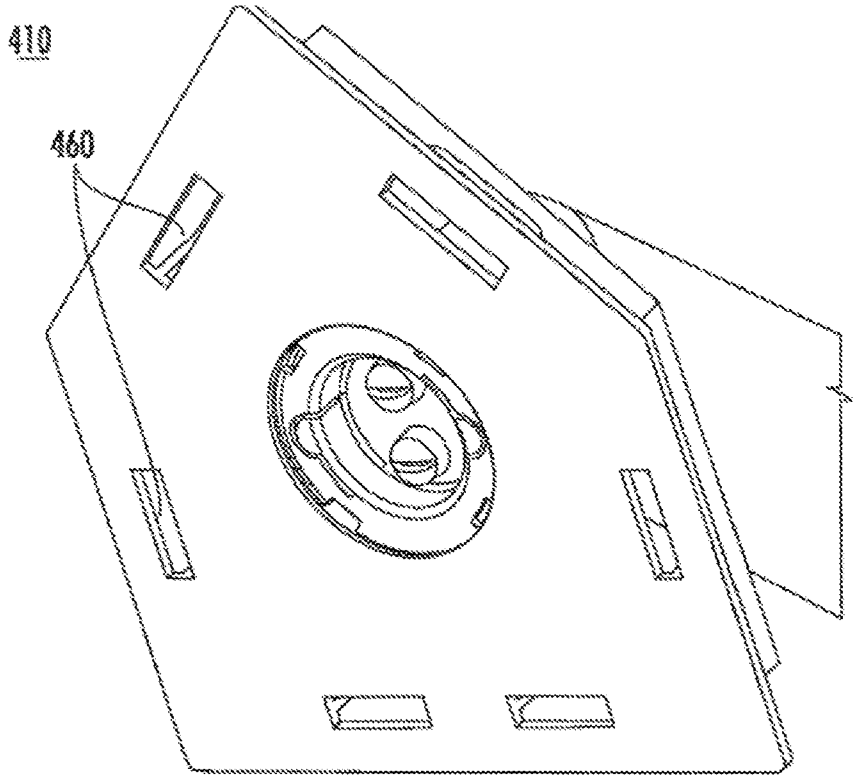
FIG. 27 is a view of the car wash spray nozzle.

FIG. 27 illustrates car wash spray nozzle 410 with two or more spray nozzles 470. Selections can be fan, stream, shower, among others.

Figure 28:
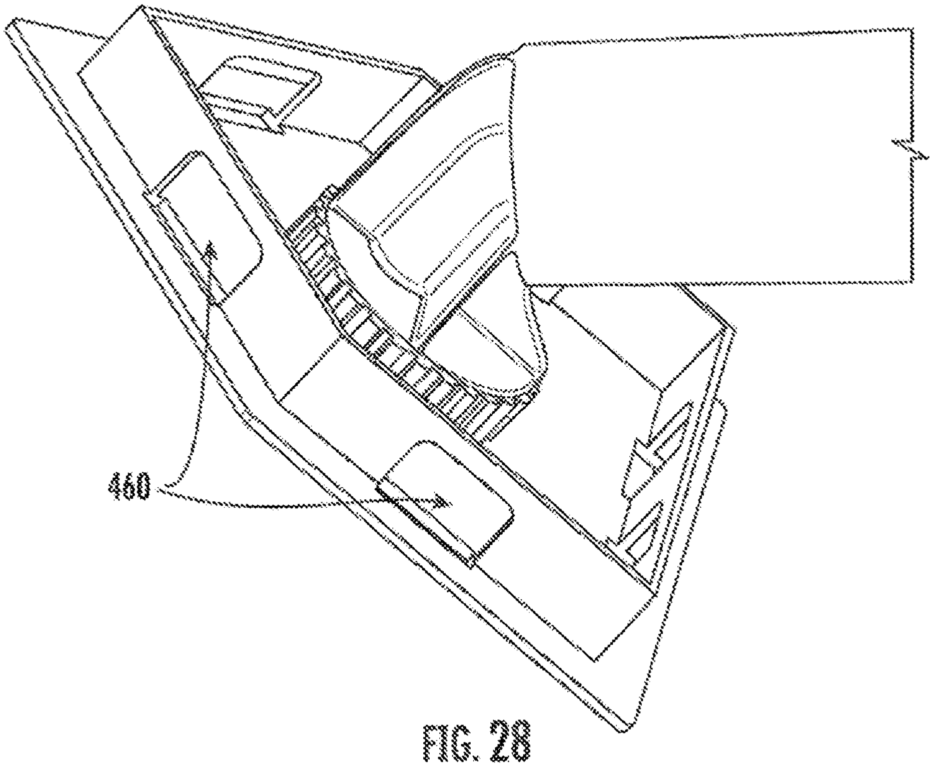
FIG. 28 is a side view of the car wash spray nozzle.

FIG. 28 is a side view of car wash spray nozzle 410. In FIG. 28, the through holes 460 in which to tuck the ends of the micro fiber cloth are shown.

Figure 29:
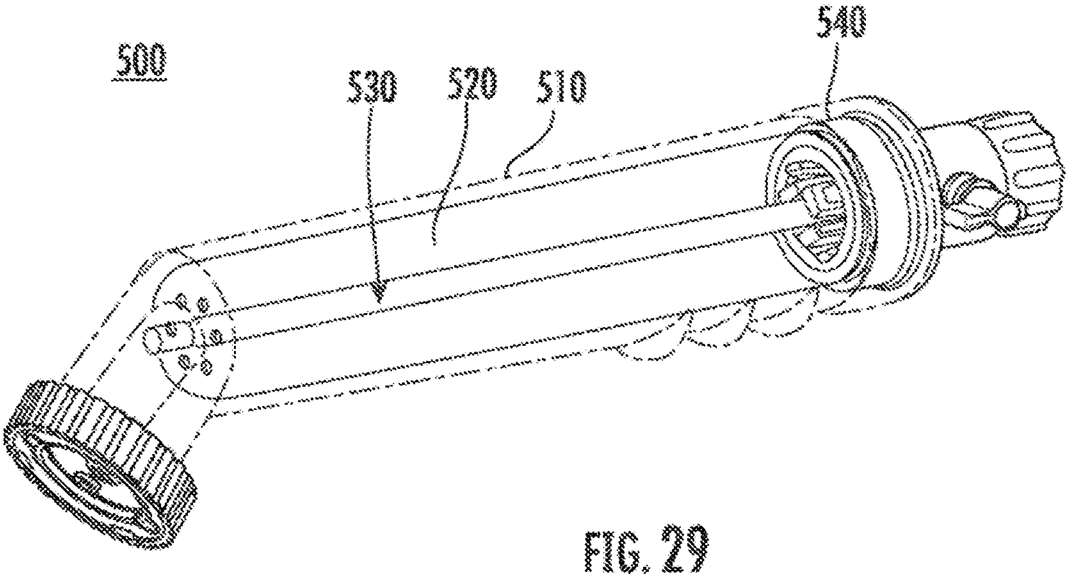
FIG. 29 illustrates a spray wand with rinse selection.

In an embodiment of the invention as shown in FIG. 29, a spray wand 500 with a rinse selection feature is provided. As a feature of spray wand 500, a rinse setting is present inside refill cartridge 520. As shown, spray wand 500 has a central channel or tube 530 that runs along the length of spray wand 500 that by-passes the solid chemistry of refill cartridge 520 within the outer body 510 for the rinse setting. Refill cartridge 520 holds the solid chemistry and is replaceable. At the shut-off/hose end, the user connects a garden hose with a rotating hose nut. The user can open and close the fluid flow with a shut-off valve to direct water through or around central channel or tube 530.

In a first option, water passes through refill cartridge 520 with swirl chamber in a tangential swirling manner that tumbles through the chemistry, maximizing exposure to the chemistry resulting in higher applied chemistry concentration. The chemistry fluid mix is dispensed at the distal nozzle. The user can rotate the nozzle to select the desired spray setting. In a second option, water passes through refill cartridge 520 down the center of the refill cartridge bypassing the solid chemistry and out the spray nozzle providing a non-chemistry rinse function.

Figure 30:
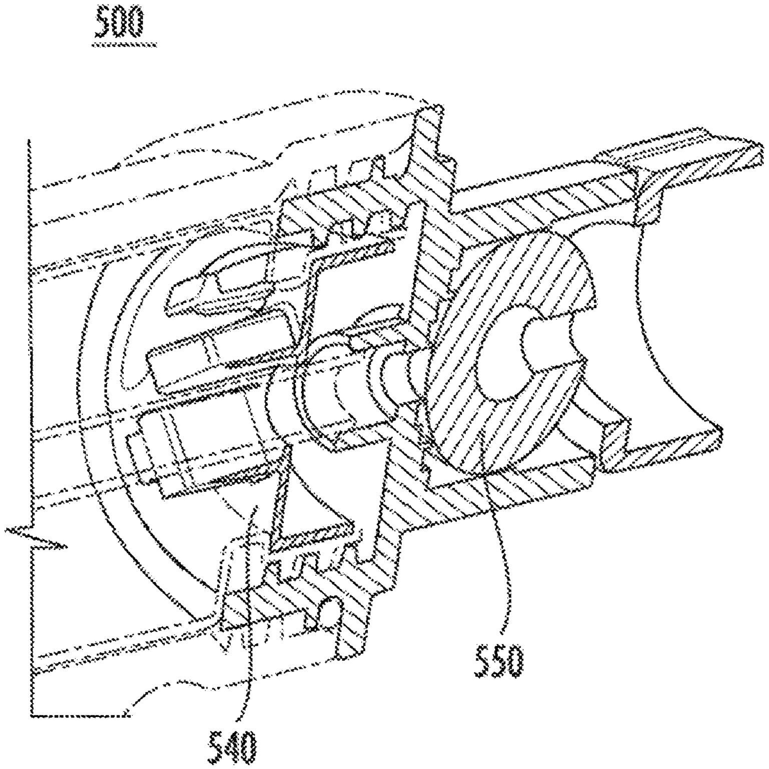
FIG. 30 is a cross-sectional view of spray wand of FIG. 29 with rinse-swirl mode.

FIG. 30 is a cross-sectional view of spray wand 500 of FIG. 29 with rinse-swirl mode. Spray wand 500 works as follows. When shut-off ball valve 550 is in the pictured position in FIG. 30, water enters a hole 545 in the center of shut-off ball valve 550 and is diverted through annular holes or passages that direct water through single swirl chamber 540.

Figure 31:
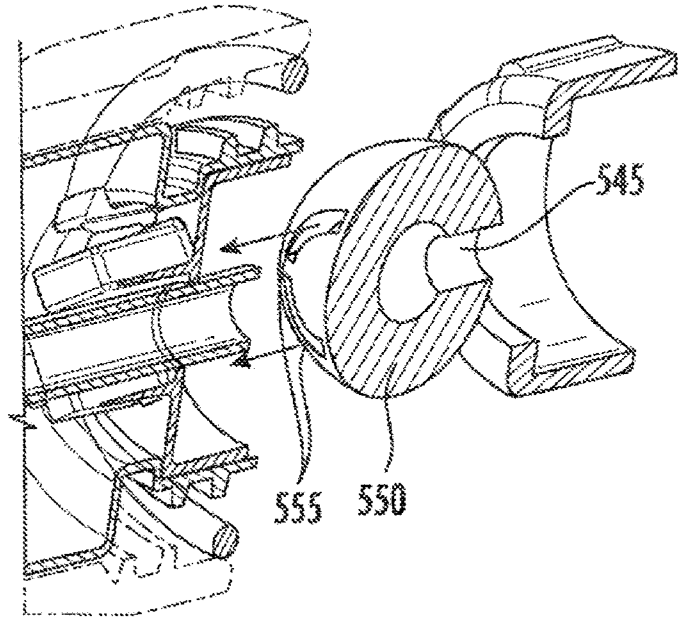
FIG. 31 is a cross-sectional view of spray wand of FIG. 29 with rinse-swirl mode-hose shut-off end suppressed.

FIG. 31 is a cross-sectional view of spray wand of FIG. 29 with rinse-swirl mode-hose shut-off end suppressed. In FIG. 31, the hose shut-off end is suppressed. FIG. 31 illustrates how water enters through single hole 545 and exits shut-off ball valve 550 through annular holes or passages 555 to swirl chamber 550.

Figure 32:
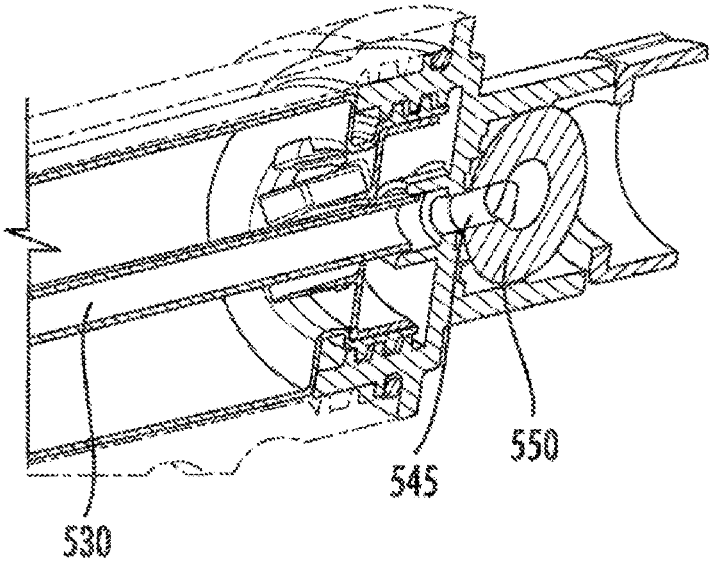
FIG. 32 is a cross-sectional view of spray wand of FIG. 29 with rinse-rinse mode.

FIG. 32 is a cross-sectional view of spray wand 500 of FIG. 29 with rinse-rinse mode. When ball valve 550 is in the pictured position, water enters annular holes or passages 555 in ball valve 550 and is diverted through center hole or passage 545 that directs water to center rinse tube 530.

Figure 33:
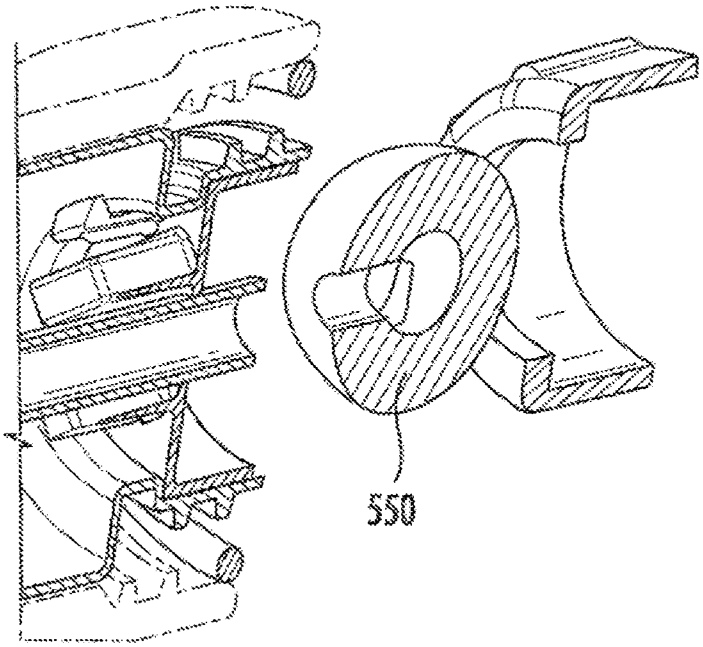
FIG. 33 is a cross-sectional view of spray wand of FIG. 29 with rinse-rinse mode-hose shut-off end suppressed.

FIG. 33 is a cross-sectional view of spray wand with rinse-rinse mode-hose shut-off end suppressed. In this view, the hose shut-off end is suppressed, and how water enters and exits shut-off ball valve 550 is shown.

Figure 34:
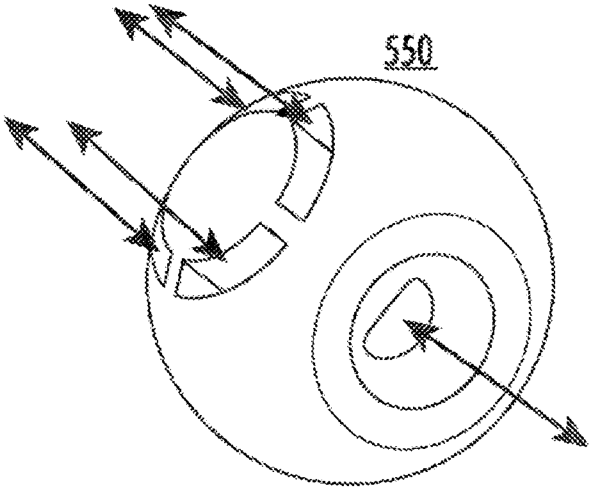
FIG. 34 illustrates the rinse shut-off valve of FIG. 29.

FIG. 34 illustrates rinse shut-off valve 550. As shown in FIG. 34, water flows in and out of passages in the shut-off ball valve. The passages allow for selection of flow by rotating the ball valve 180 degrees which directs fluid flow to the desired solid chemistry or rinse passages. When in an orthogonal 90 degree position, fluid flow is stopped.

Figure 35:
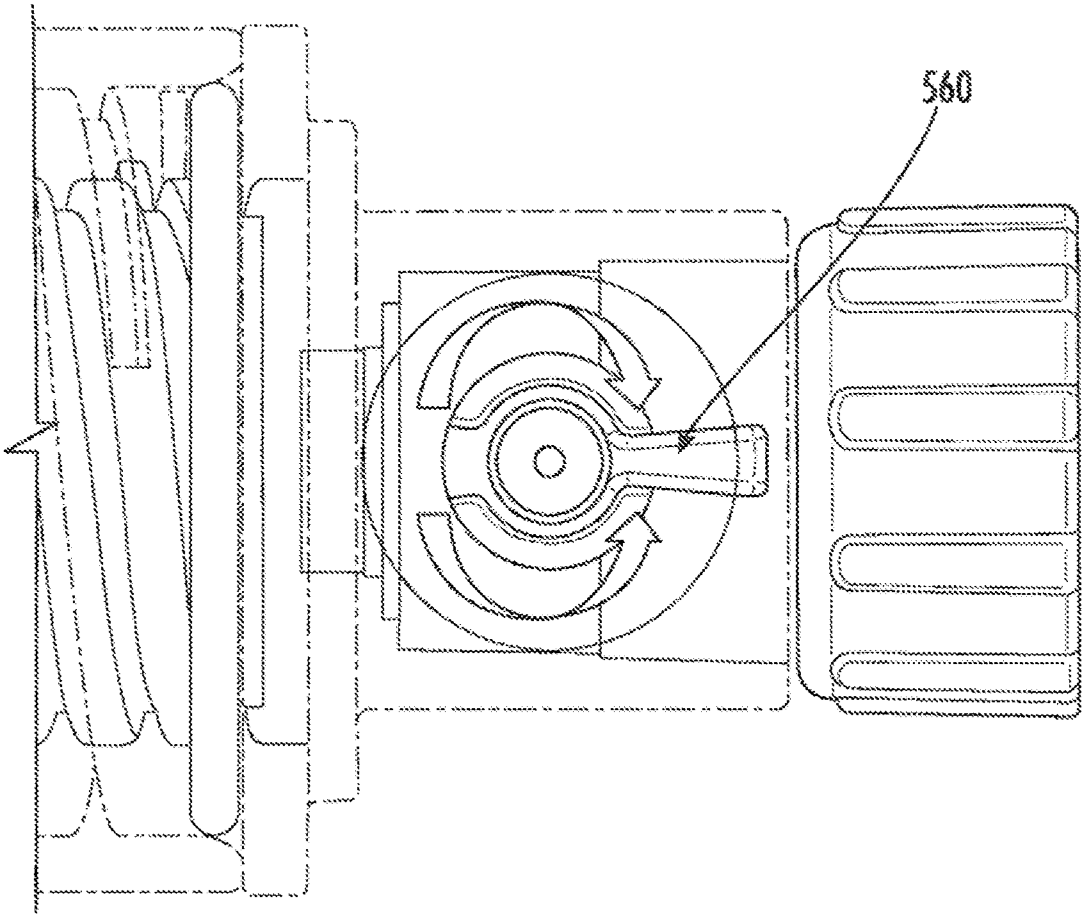
FIG. 35 is an external view of shut-off/hose end.

FIG. 35 is an external view of the shut-off/hose end. FIG. 35 shows how the user can rotate around the valve ball selector 560 to achieve the desired spray function.

Figure 36A:
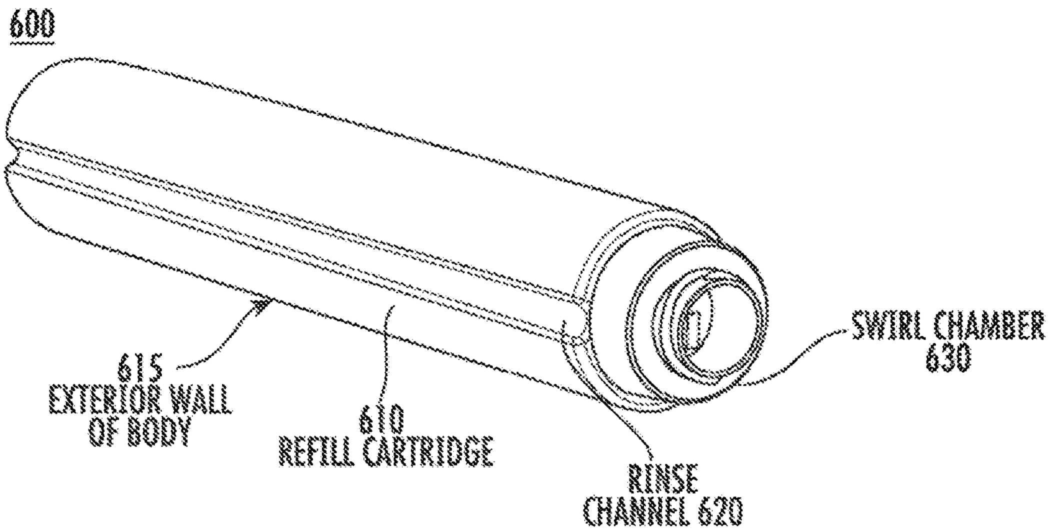
FIGS. 36A, 36B and 36C are isometric views of a refill cartridge assembly with external rinse channels.
Figure 36B:
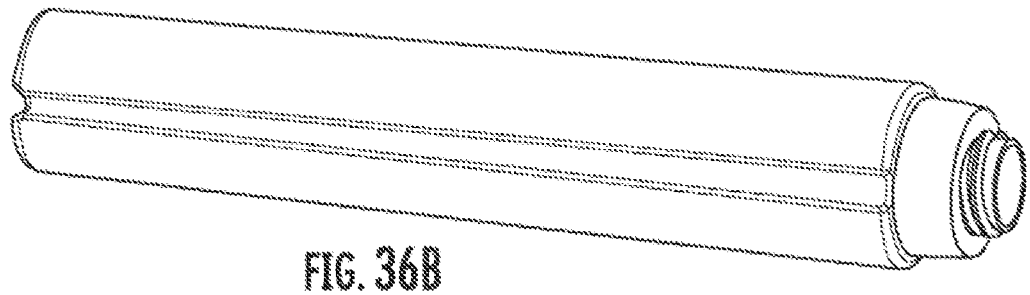
Figure 36C:
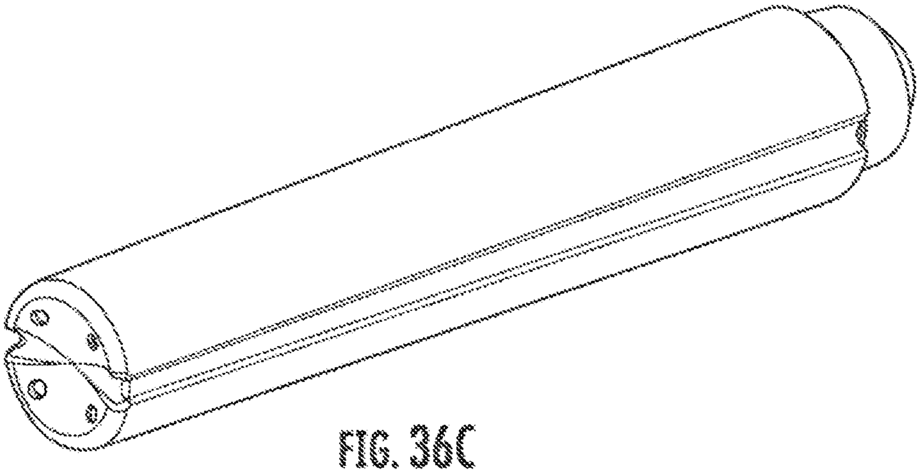

In another embodiment of the present invention, a refill cartridge assembly for use in a spray wand is provided, wherein the refill cartridge provides rinse capability to the spray wand. FIGS. 36A, 36B and 36C are isometric views of refill cartridge assembly 600 with one or more external rinse channels which run along the length of refill cartridge 610. Refill cartridge 610 can be made of a transparent material in order for the contents to be visible. As shown, refill cartridge 610 comprises one or more external rinse channels 620 on an exterior wall of body 615 of refill cartridge 610 to allow water to pass along the refill cartridge in the spray body and exit for rinsing. The external rinse channels 620 can be in the form of indentations or grooves formed into the exterior wall of body 615. The channels run continuously from one end of the refill cartridge to the other end. In a preferred embodiment, the refill cartridge uses two rinse channels, however, more or less rinse channels may be implemented. Spacing between rinse channels may vary. Cross-sectional area should be considered in the number and geometry of the rinse channels as to not restrict flow of water down the rinse channels during the rinse mode as the rinse channels are utilized to direct water flow in rinse mode. Swirl chamber 630 is attached to a proximal end of refill cartridge 610.

Figure 37:
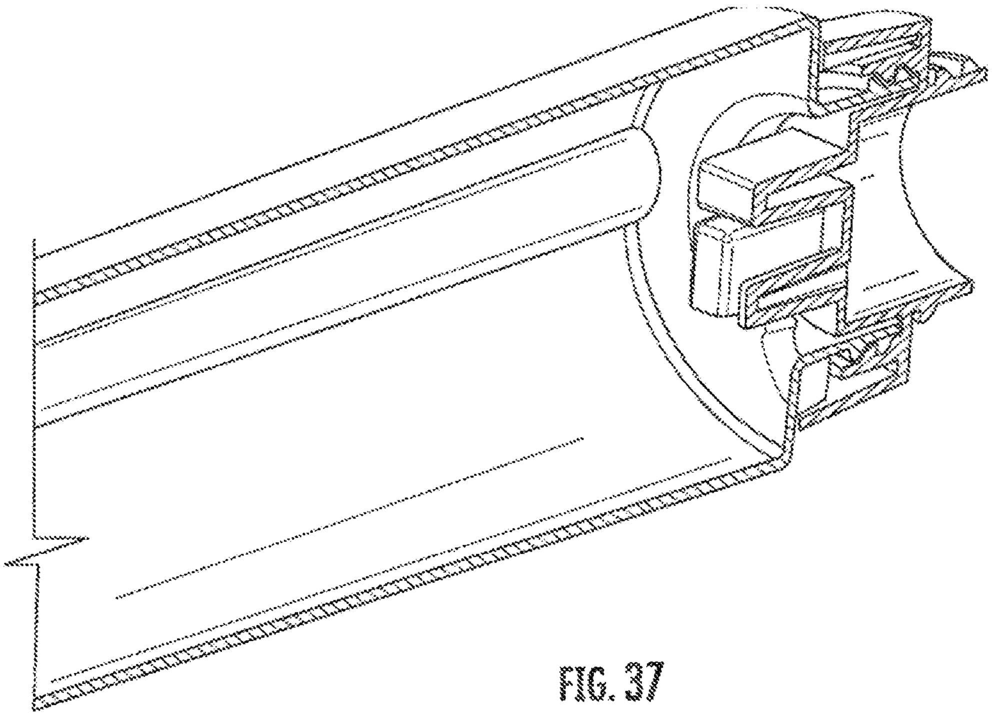
FIG. 37 is an internal view of the refill cartridge assembly of FIGS. 36A, 36B, and 36C.

FIG. 37 is an internal view of the refill cartridge assembly 600 of FIGS. 36A, 36B and 36C.

Figure 38:
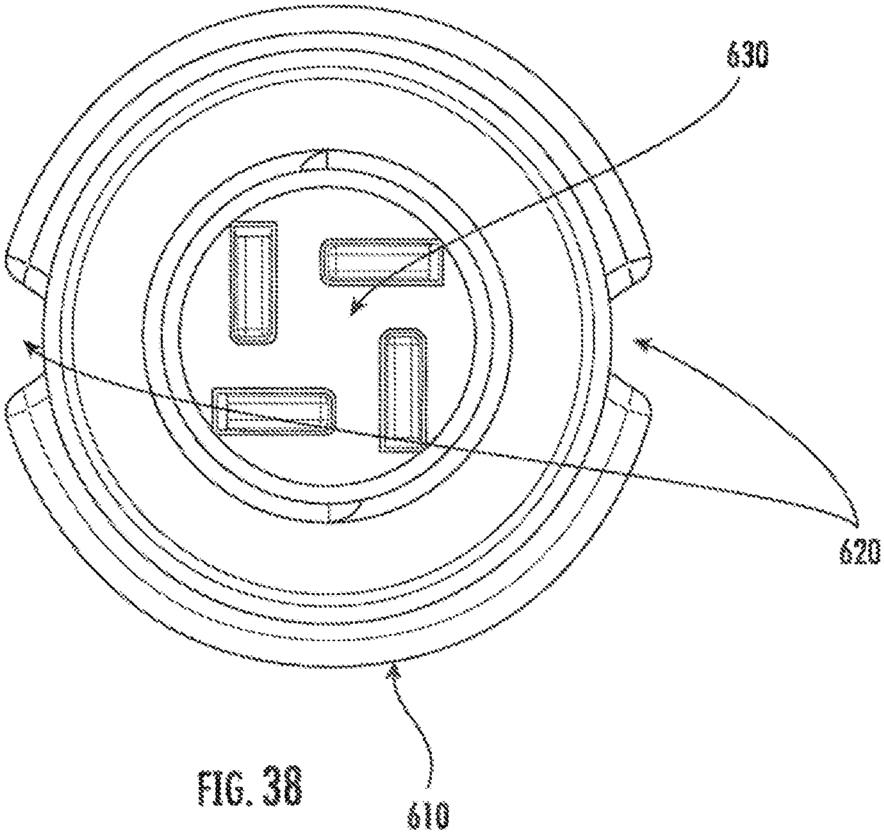
FIG. 38 is an axial view of the refill cartridge assembly of FIGS. 36A, 36B, and 36C.

FIG. 38 is an axial view of refill cartridge assembly 600. This view depicts two rinse channels 620 having an unobstructed flow path. Refill cartridge 610 having swirl chamber 630 affixed thereto enables swirl action for water swirl and mix and ensures the proper dilution of chemistry in the refill cartridge assembly. Swirl chamber 630 is preferably affixed or snapped or screwed with child resistant feature into refill cartridge 610.

Figure 39:
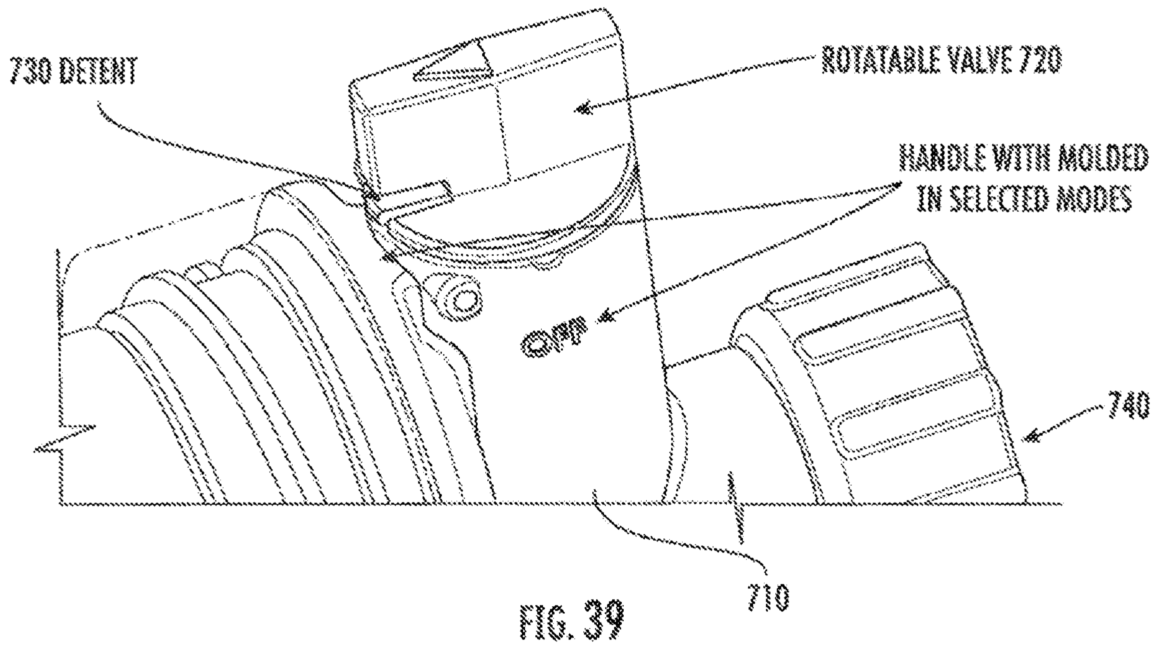
FIG. 39 is an external view of a handle and valve, in wash position, of a spray wand with refill cartridge having external channels in accordance with an embodiment of the present invention.

FIG. 39 is an external view of a handle 710 and a rotatable valve 720, in wash position, of a spray wand 700 with refill cartridge having external channels in accordance with an embodiment of the present invention. In this view, the handle is seen with molded in "wash" and "off" user selected modes 730. Valve 720 can be rotated such that the arrow on top of the rotatable valve lines up with the user selected mode 730. When in the selected mode 730, valve 720 provides positive user feedback by way of feel with a detent 730. In this view, valve 720 is rotated into the "wash" position or mode 730. Internally, water is routed from a hose end inlet 740 to the swirl chamber of the refill cartridge.

Figure 40:
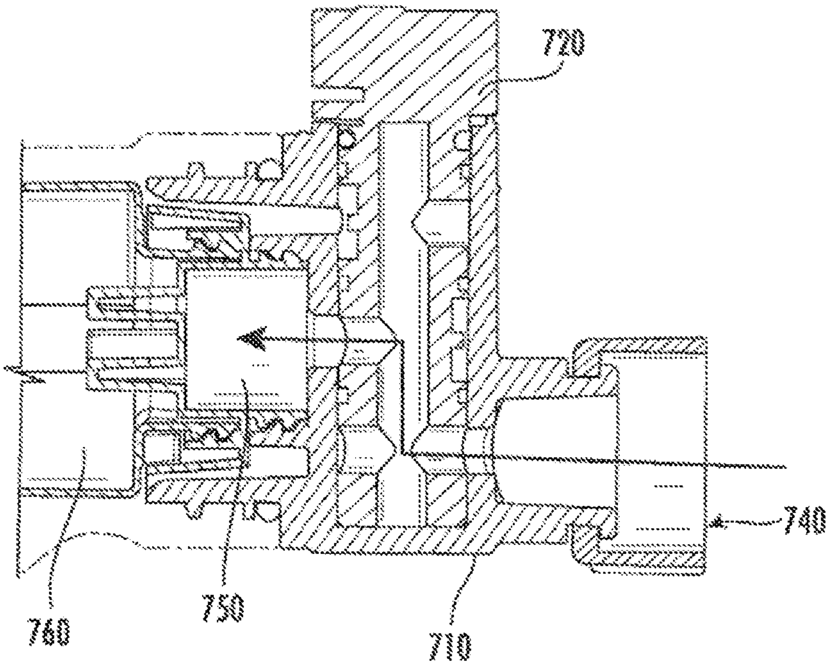
FIG. 40 is a cross-sectional, internal view of a handle and valve, in wash position, of a spray wand with refill cartridge having external channels in accordance with an embodiment of the present invention.

FIG. 40 is an internal view of handle 710 and rotatable valve 720, in wash position, of a spray wand 700 with refill cartridge having external channels in accordance with an embodiment of the present invention. In this view, when the valve is rotated into the "wash" position or mode 730, water is routed as shown by arrow from hose end inlet to a swirl chamber 750 of a refill cartridge 760. In this mode, water passes through the center of the refill cartridge containing solid chemistry. The refill cartridge screws directly into handle and is threaded. When valve 720 is set to the "wash" mode, the water stream is not restricted and allows for maximum spray output for "reach" of cleaning solution. The refill cartridge leaves sufficient room to allow water to bypass around the refill cartridge when in the rinse mode.

Figure 41:
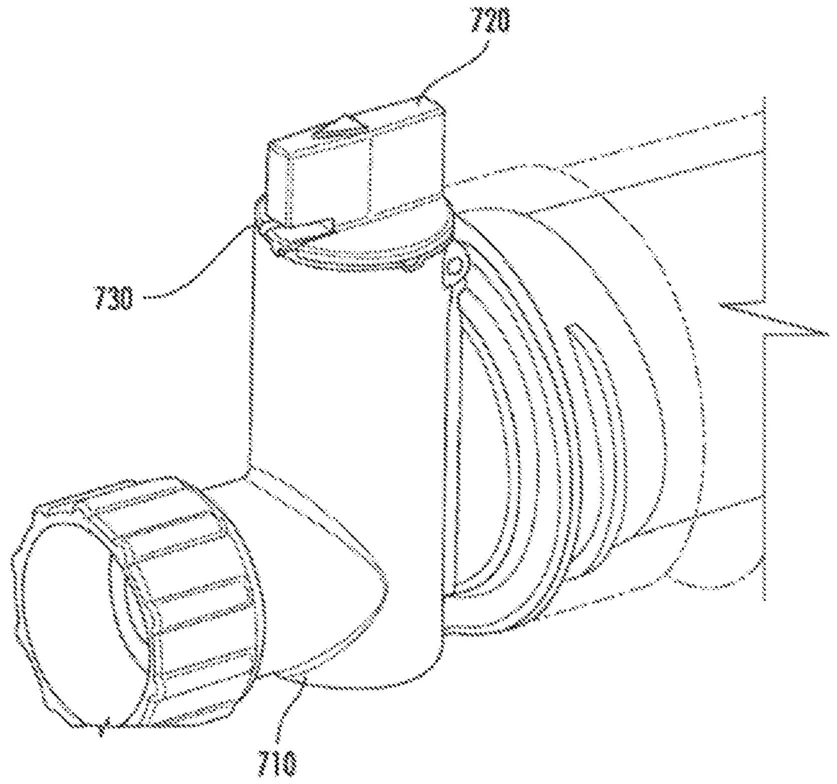
FIG. 41 is an external view of a handle and valve, in rinse position, of a spray wand with refill cartridge having external channels in accordance with an embodiment of the present invention.

FIG. 41 is an external view of handle 710 and rotatable valve 720, in rinse position of a spray wand 700 with refill cartridge having external channels in accordance with an embodiment of the present invention. In this view, the handle can be seen with molded in "rinse" and "off" modes. Valve 720 can be rotated such that the arrow on top of the rotatable valve lines up with the user selected mode 730. When in the selected mode, valve 720 provides positive user feedback by way of feel with detent 730. In this view, valve 720 is rotated into the "rinse" position or mode 730. Internally, water is routed from the hose end inlet bypasses the swirl chamber of the refill cartridge, and flow is directed around the external rinse channels of the refill cartridge.

Figure 42:
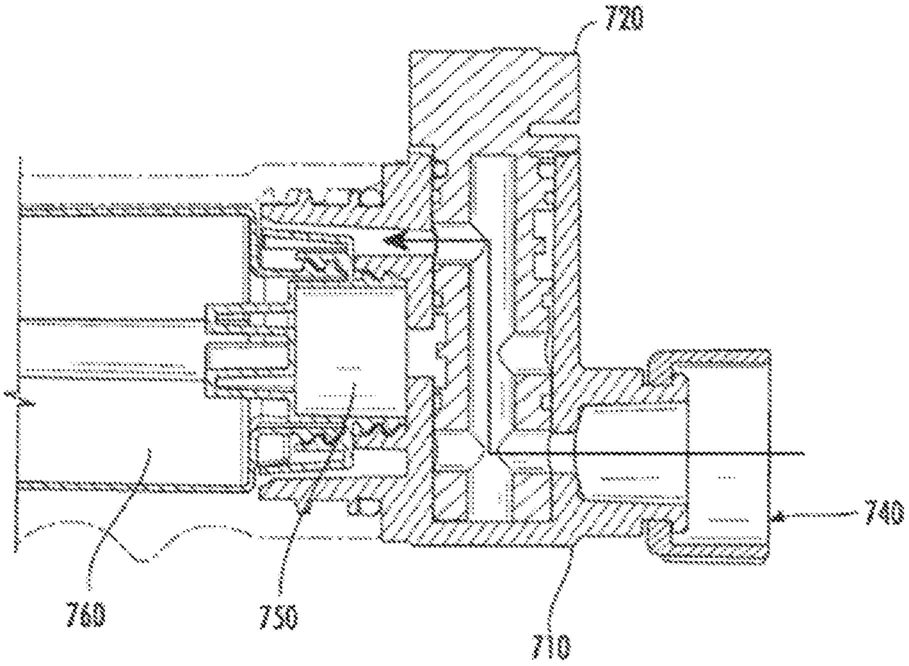
FIG. 42 is a cross-sectional, internal view of handle and valve, in rinse position, of a spray wand with refill cartridge having external channels in accordance with an embodiment of the present invention.

FIG. 42 is an internal view of handle 710 and rotatable valve 720, in rinse position, of a spray wand 700 with refill cartridge having external channels in accordance with an embodiment of the present invention. In this view, valve 720 is rotated into the "rinse" position or mode. Internally, water routed as shown by arrow from hose end inlet 740 bypasses internal swirl chamber 750 of refill cartridge 760, and flow is directed around the external rinse channels of the refill cartridge.

Figure 43:
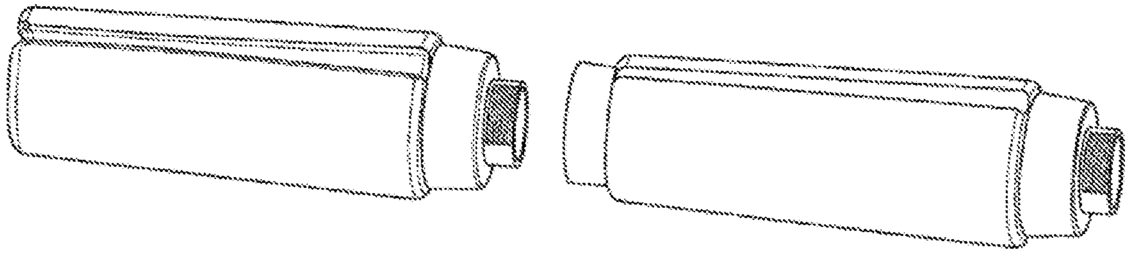
FIG. 43 is a perspective view of a multiple and stackable refill cartridge option, with refill cartridges unattached.
Figure 44:
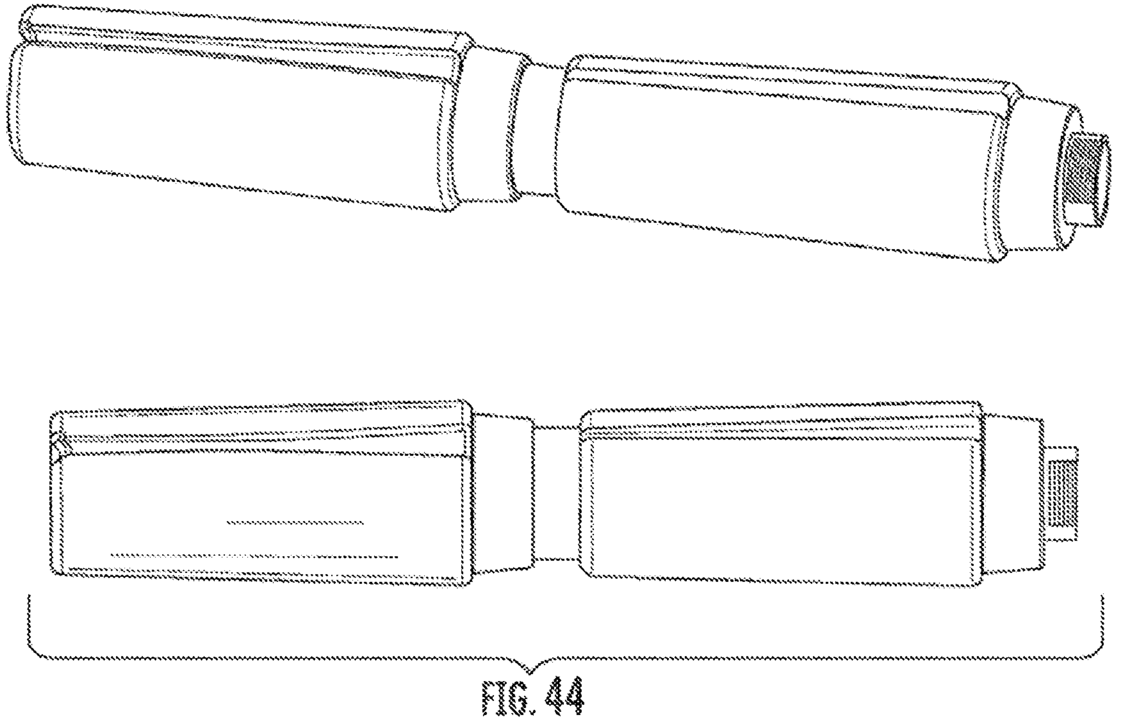
FIG. 44 is a perspective view of a multiple and stackable refill cartridge option, with refill cartridges attached.

The spray wand of the present invention may be of varying dimension including, but not limited to, length. Likewise, the refill cartridge may be of varying dimension including, but not limited to, length. For example, the refill cartridge may be ¼, ⅓, ½, etc., of the length of the spray wand body and one or more refill cartridges connect such as by threaded connections in order to run the entire length of the spray wand body. Different solid chemistry may be contained in each connected refill cartridge. FIG. 43 is a perspective view of a multiple and stackable refill cartridge option, with refill cartridges unattached. FIG. 44 is a perspective view of a multiple and stackable refill cartridge option, with refill cartridges attached. Each refill cartridge may contain its own solid chemistry which may be the same or different from the other refill cartridges.

In an embodiment of the present invention, the spray wand further comprises an insert/refill adapter. The refill adapter is threaded and is to be inserted into the hose wand handle (shutoff end).

Figure 45:
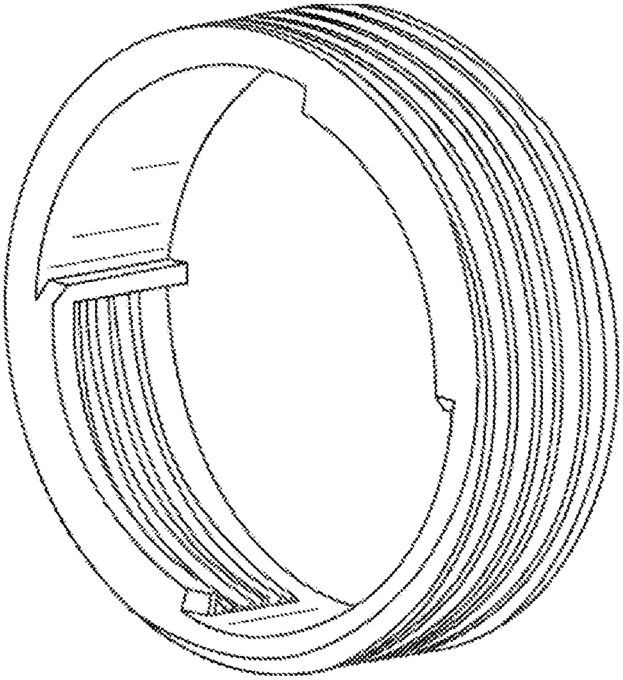
FIG. 45 illustrates an insert/refill cartridge adapter.

FIG. 45 illustrates an optional insert/refill cartridge adapter. Preferably, the insert/refill cartridge adapter is ring-shaped and having internal and external threads. FIG. 45 illustrates the insert/refill cartridge adapter with standard threads but custom threads are possible. The insert/refill adapter provides the ability to use different lock and key configurations for the refill cartridge.

Figure 46:
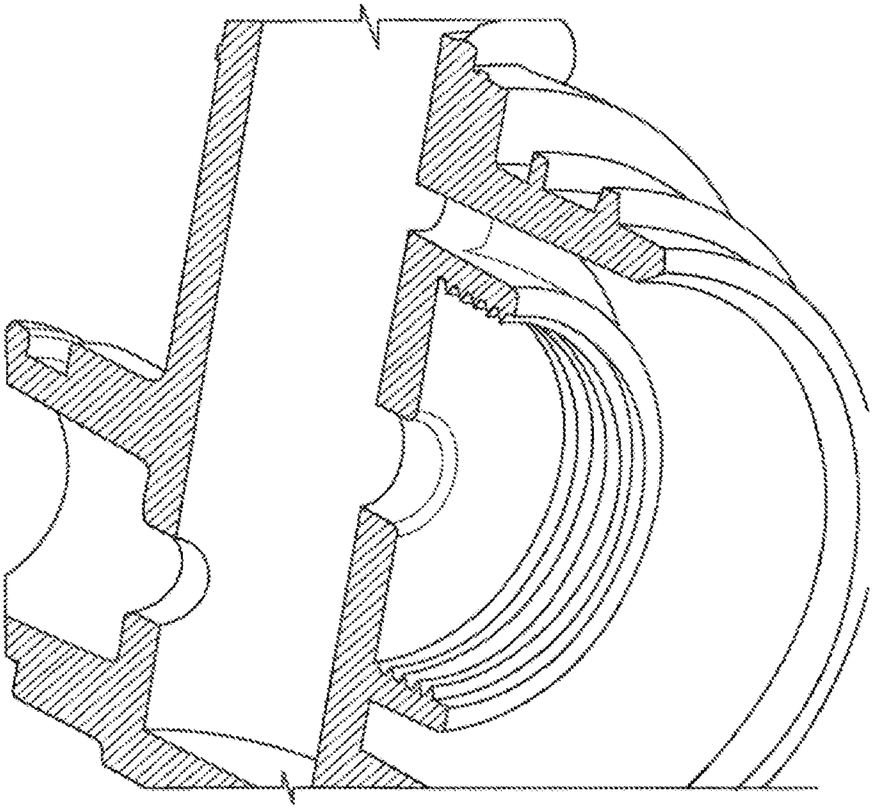
FIG. 46 illustrates the hose wand handle where the insert/refill cartridge adapter is received by the hose wand handle.

FIG. 46 illustrates the hose wand handle where the insert/refill cartridge adapter is received by the hose wand handle. The insert/refill cartridge adapter is inserted into the handle of the wand hose end and the insert/refill cartridge adapter is configured for receiving a mating threaded end of a refill cartridge.

Figure 47:
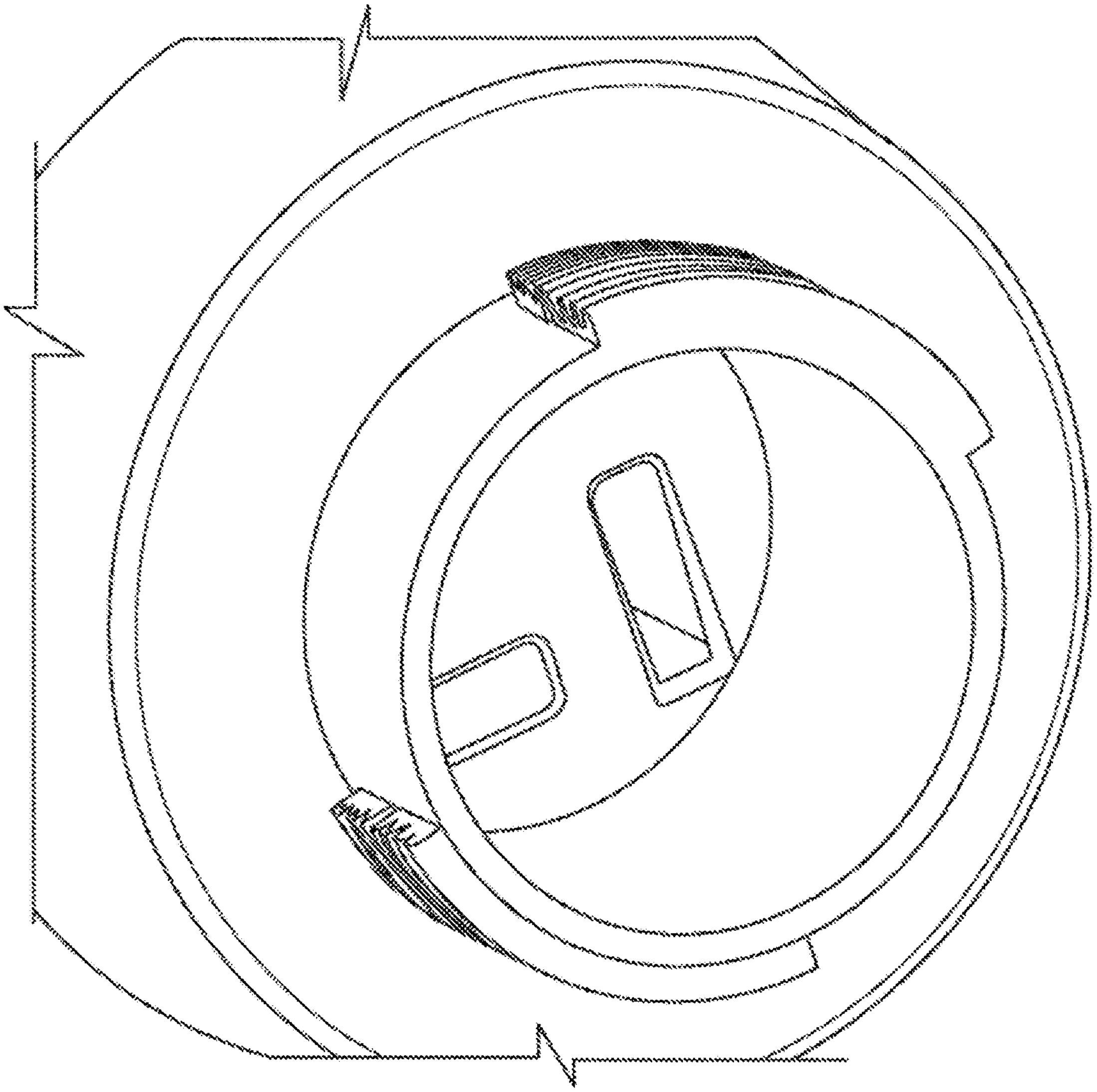
FIG. 47 illustrates a refill cartridge that can be inserted into an insert/refill cartridge adapter.

FIG. 47 illustrates the refill cartridge that can be inserted into an insert/refill cartridge adapter. In this example, the cartridge shown has custom threads and mating custom threads would be required on the respective insert/refill cartridge adapter.

Figure 48:
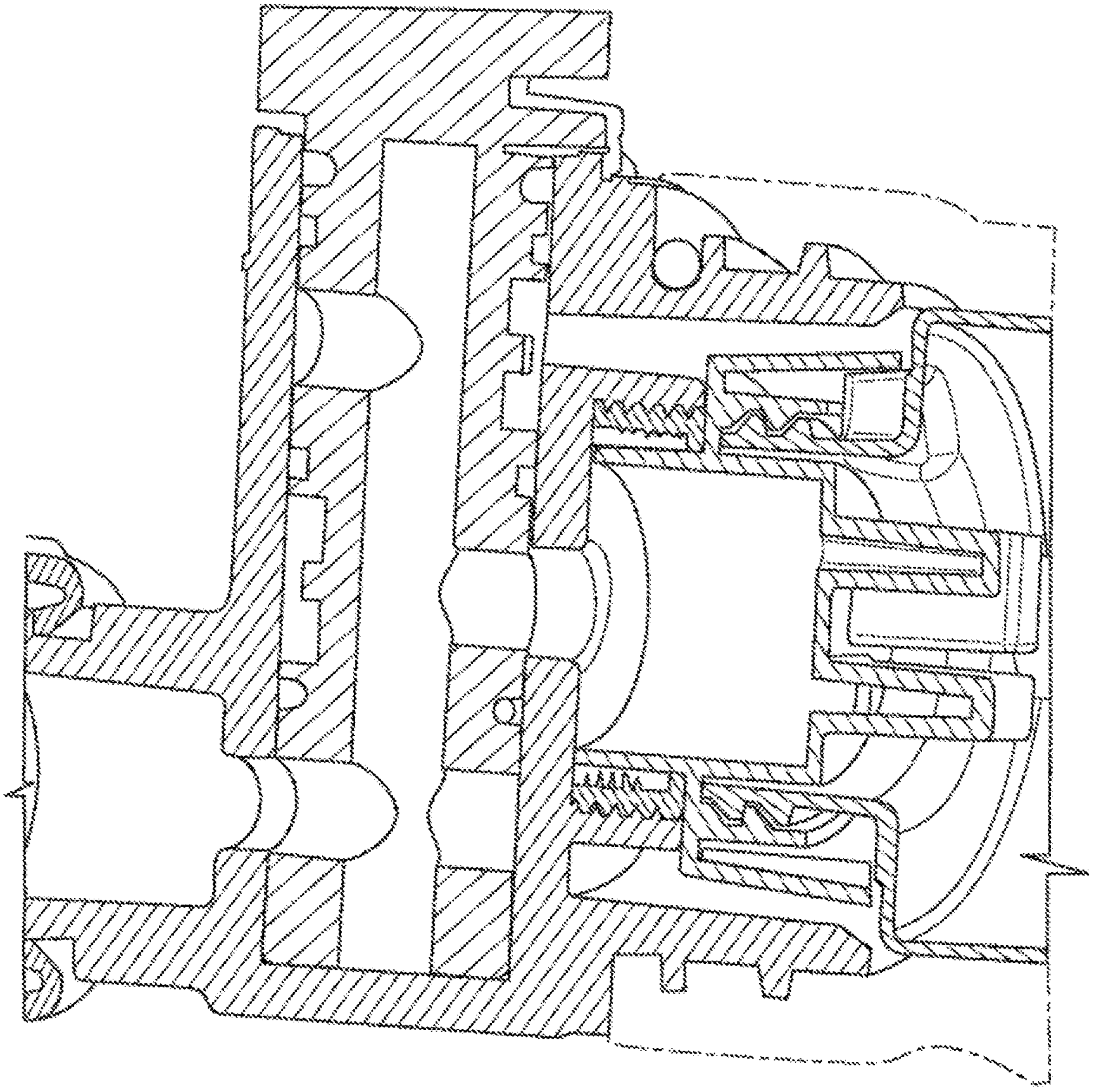
FIG. 48 illustrates a hose wand sprayer assembly showing the insert/refill cartridge adapter installed and interrelation of the components.

FIG. 48 illustrates the hose wand sprayer assembly showing the insert/refill cartridge adapter installed and interrelation of the components.

There are numerous benefits associated with the spray wand of the present invention. The benefits of the spray wand include, but are not limited to, ergonomic, ease of refill, longer lasting chemistry, farther spray distance and with longer reach, easy visibility for refill/transparent, versatility in range of motion, and metering benefits, improved safety, solid chemistry lighter weight for shipping and usage, among others.

The spray wand of the invention is ergonomic, for example, by providing balance to the user as the hose is connected into the handle such that a consumer can use the spray wand with one hand while cleaning as opposed to requiring use of two hands. The use of solid chemistry in the spray wand of the present invention makes the spray wand lighter in weight as compared to other products requiring water as part of their formulation chemistry.

Figure 49:
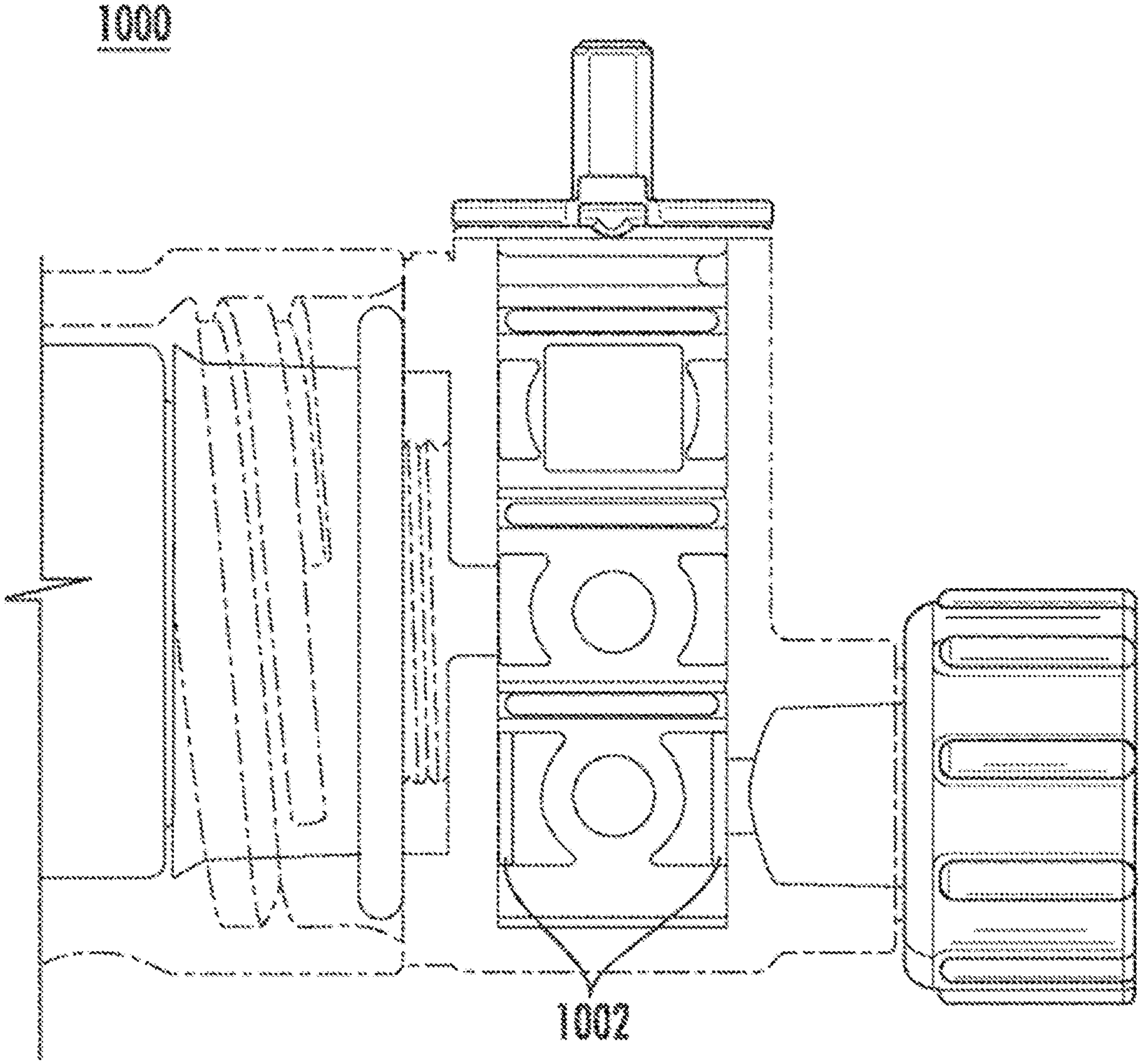
FIG. 49 illustrates stopper pads added to the spray wand shutoff/hose end valve.

FIG. 49 illustrates a spray wand shutoff/hose end valve 1000 having stopper pads 1002. A purpose of including the stopper pads is to provide added protection for fluid shut off when the valve is in the user selected "off" position. The additional stopper pads reduce the potential of fluid leakage.

Figure 50:
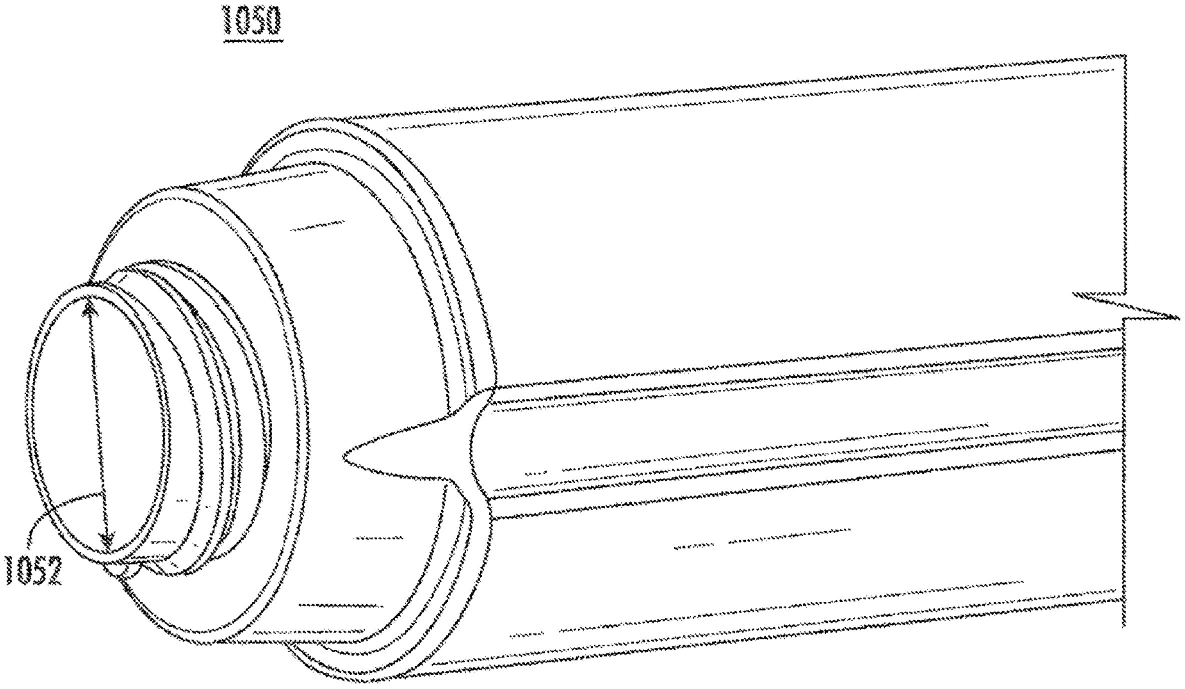
FIG. 50 illustrates a refill cartridge attached to a swirl chamber having an opening for water entry.

FIG. 50 illustrates a refill cartridge 1050 attached to a swirl chamber having an opening 1052 for water entry.

Figure 51:
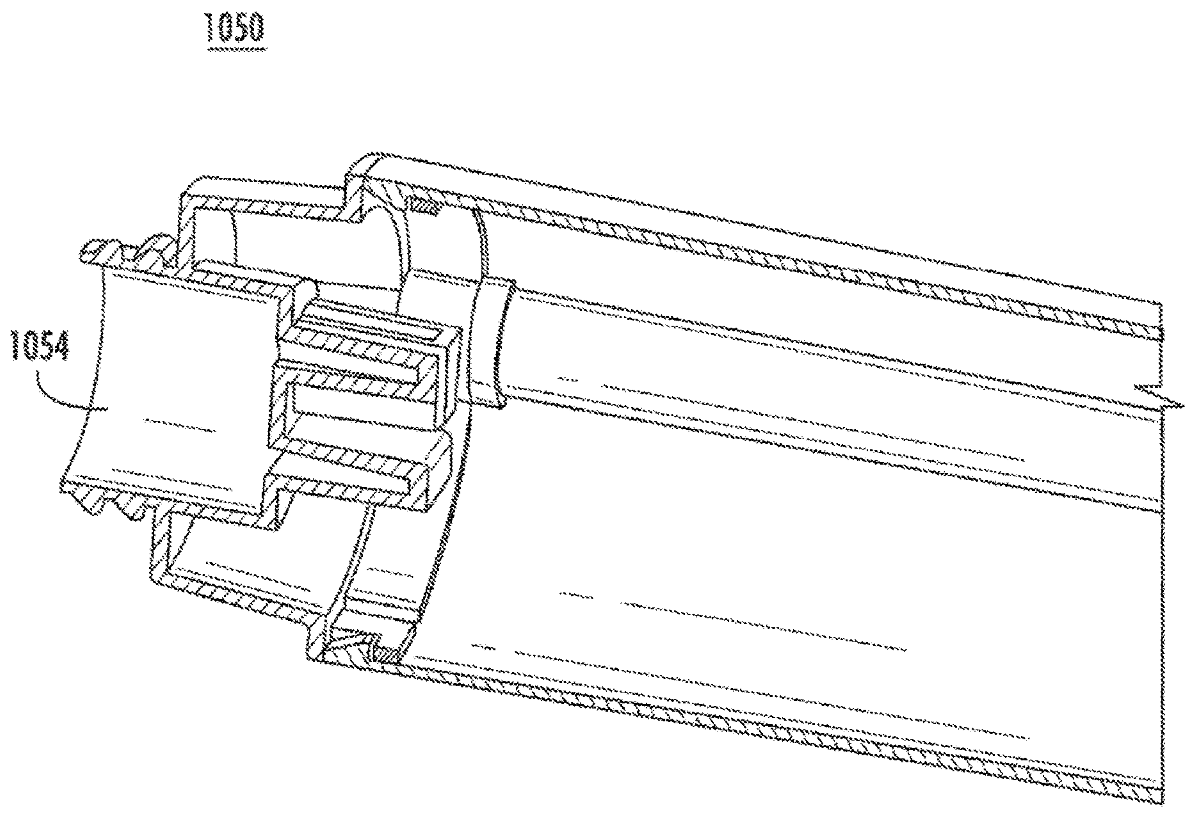
FIG. 51 illustrates a cross-section of the refill cartridge of FIG. 50 with a snap on swirl chamber.

FIG. 51 illustrates a cross-section of refill cartridge 1050 of FIG. 50 with a snap on swirl chamber 1054.

Figure 52:
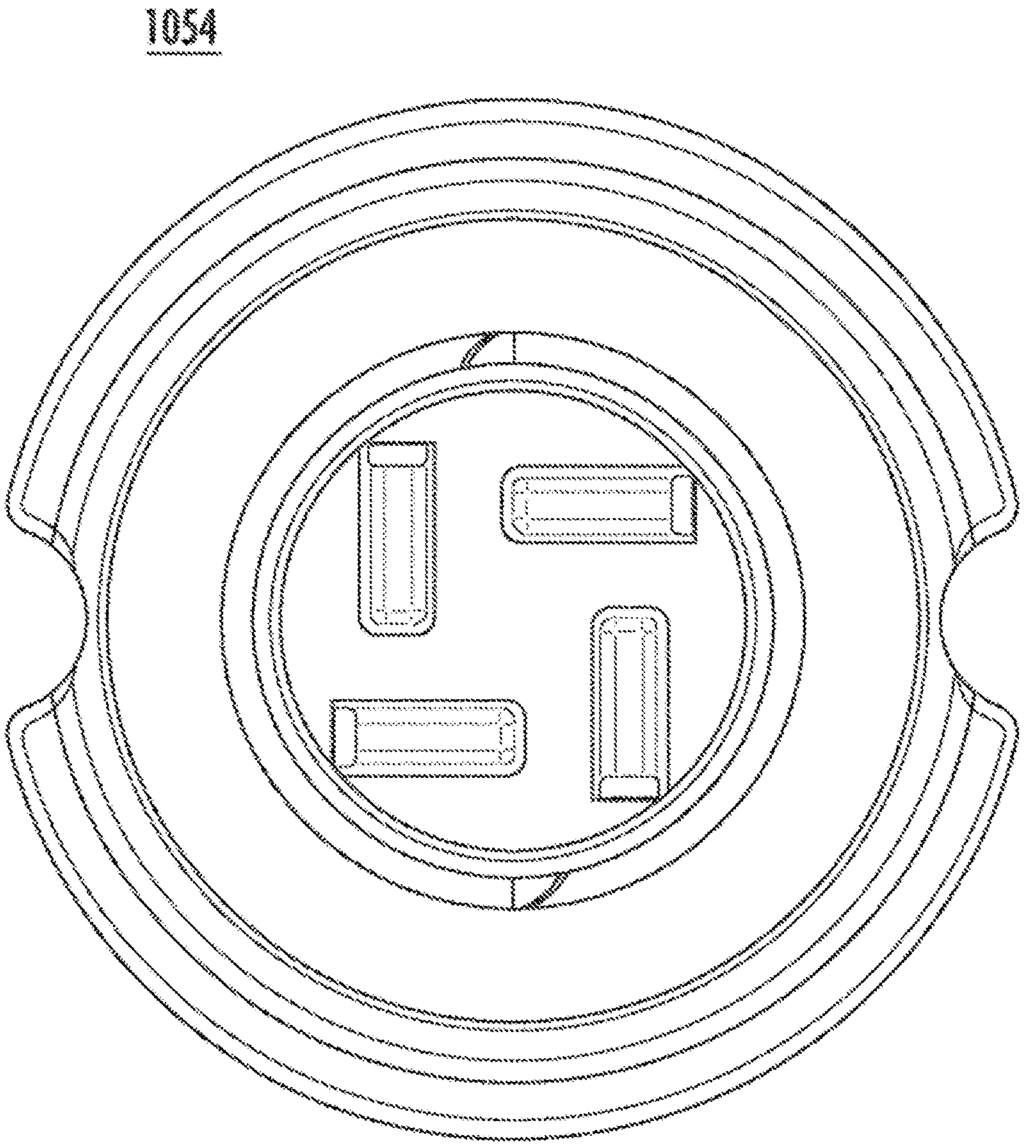
FIG. 52 illustrates a top view of the swirl chamber.

FIG. 52 illustrates a top view of swirl chamber 1054. The swirl chamber has the capability to snap into the refill cartridge.

Figure 53:
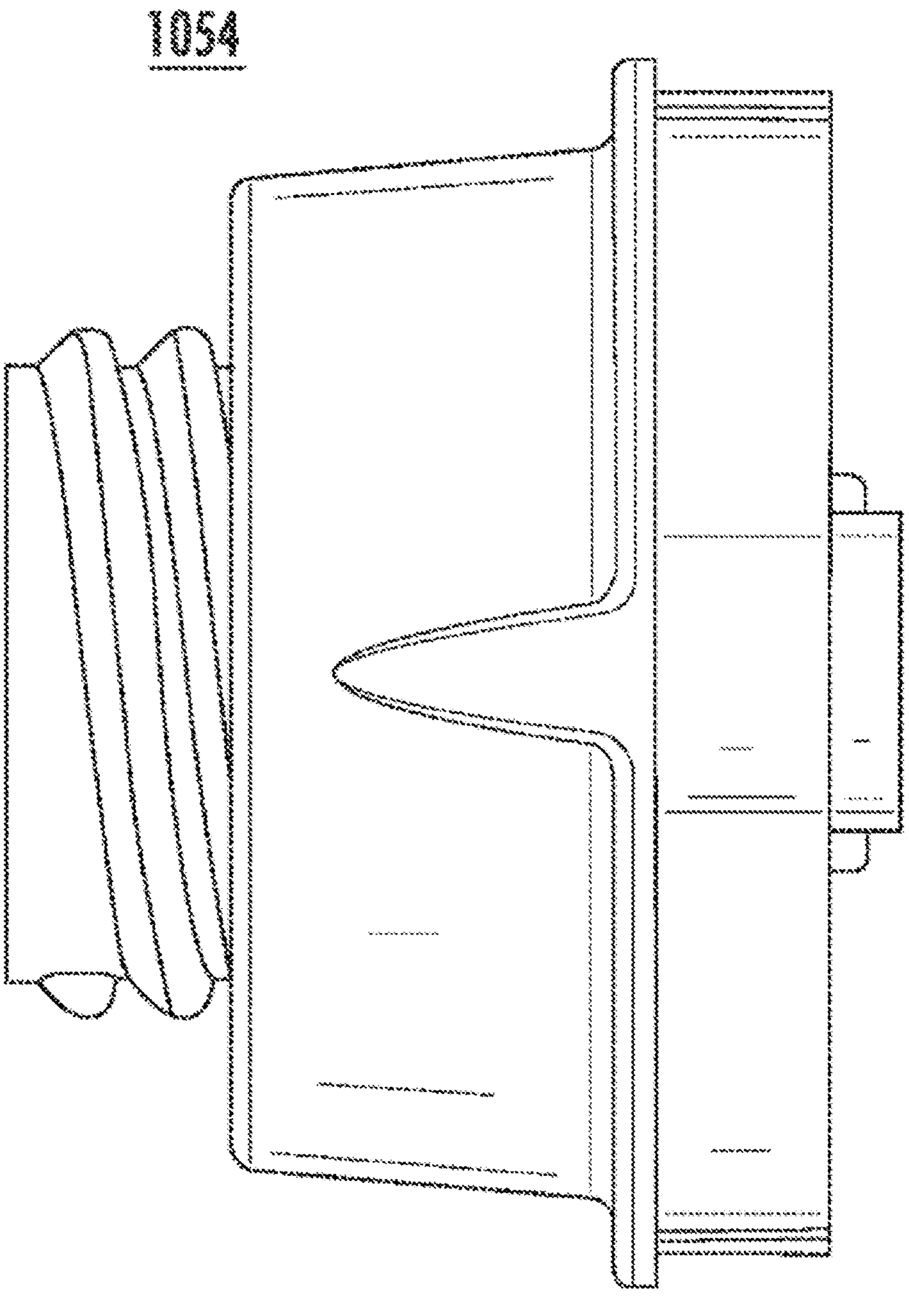
FIG. 53 illustrates a side view of the swirl chamber.

FIG. 53 illustrates a side view of swirl chamber 1054.

Figure 54:
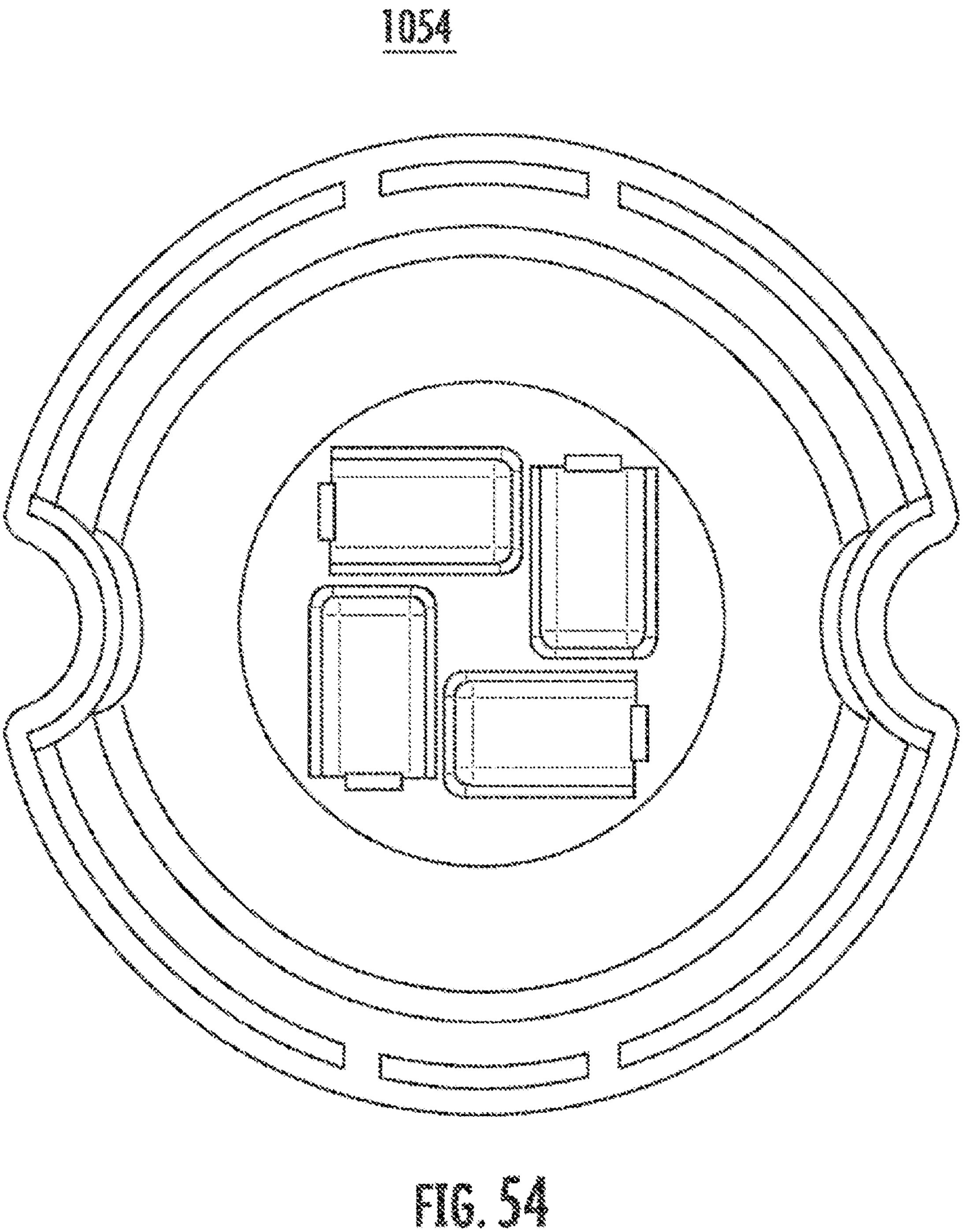
FIG. 54 illustrates an internal view of the swirl chamber.

FIG. 54 illustrates an internal view of swirl chamber 1054.

Figure 55:
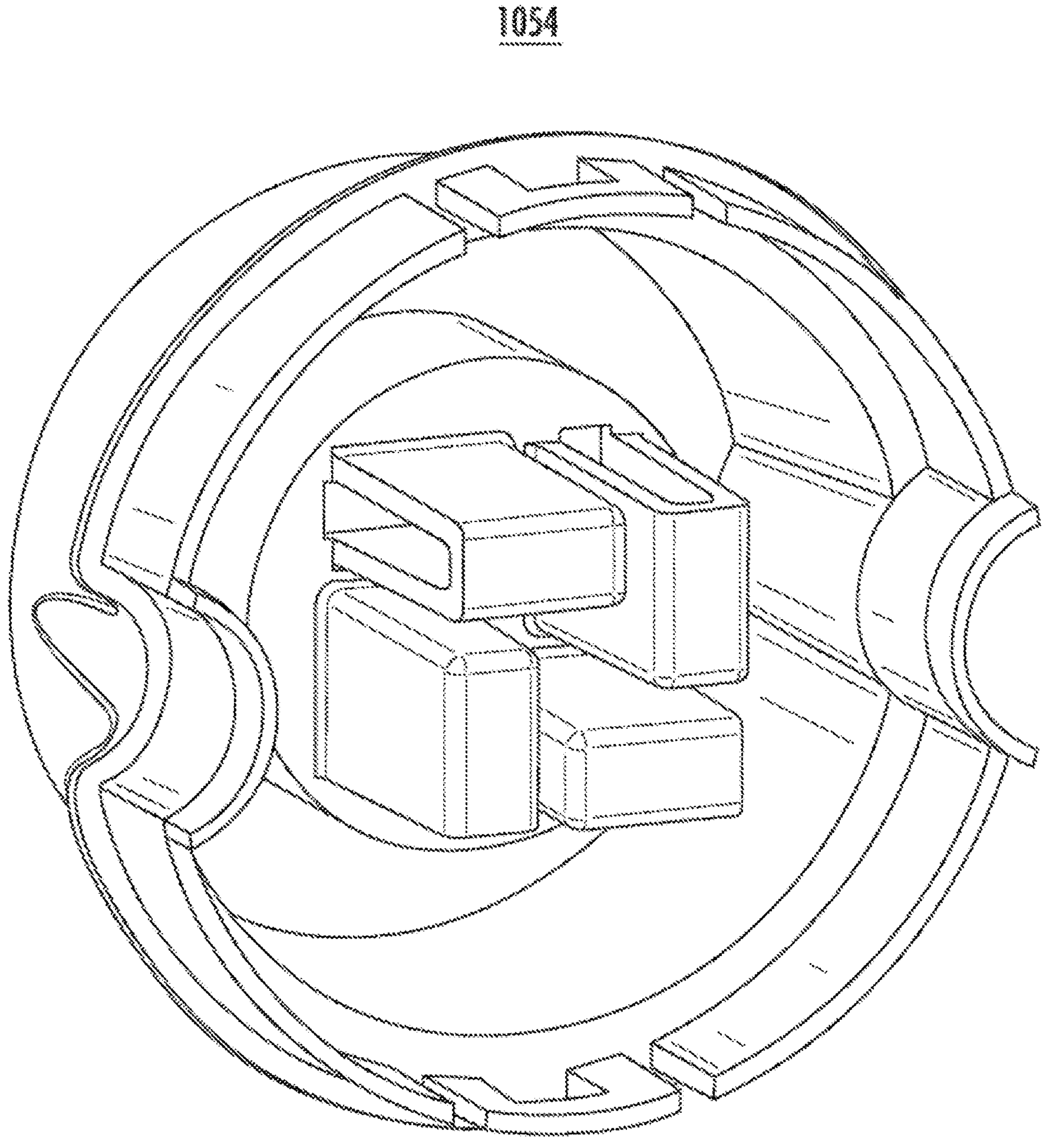
FIG. 55 is a perspective internal view of the swirl chamber.

FIG. 55 is a perspective internal view of swirl chamber 1054.

Figure 56:
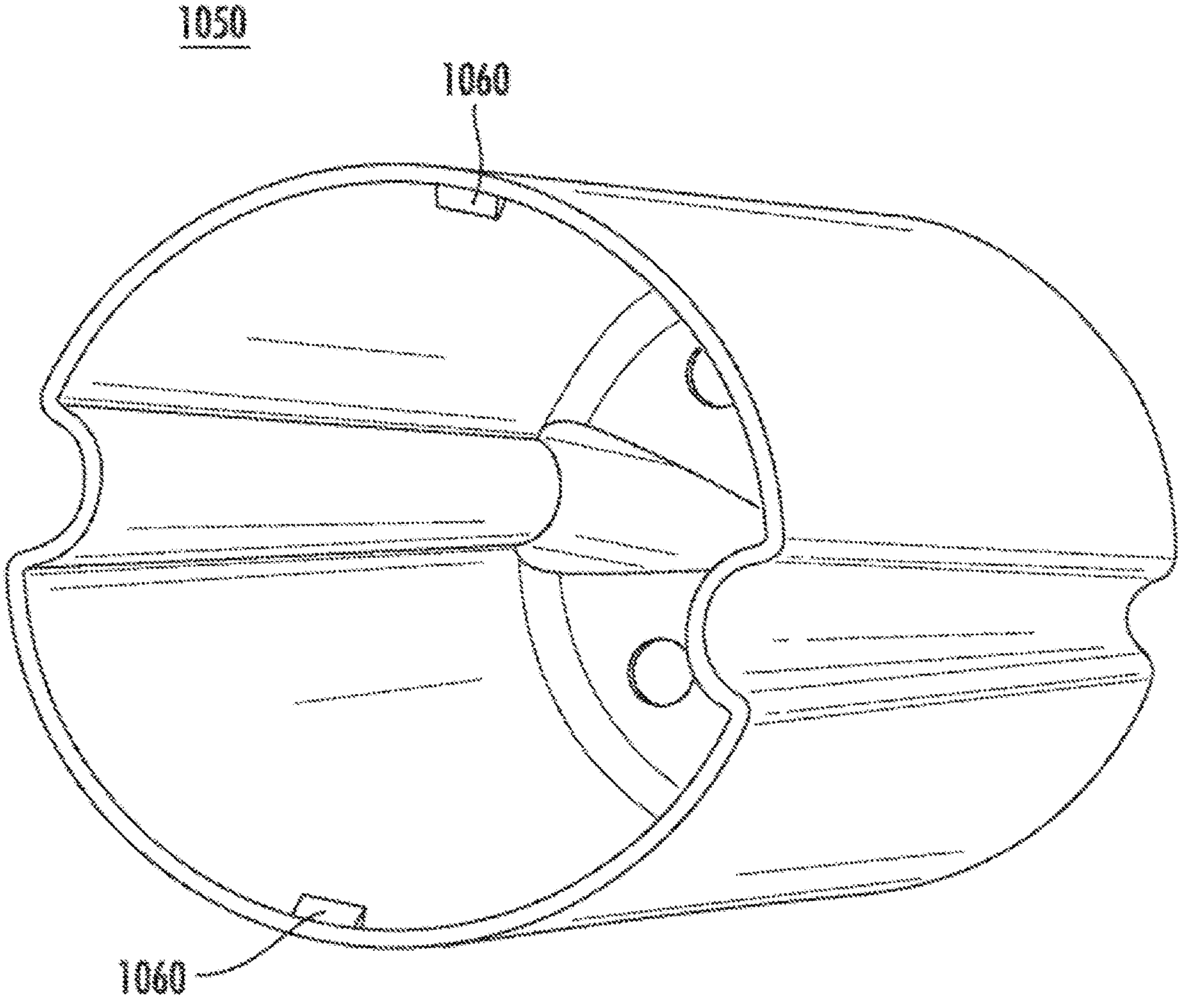
FIG. 56 is an internal view of the refill cartridge having an enlarged opening and nubs.

FIG. 56 is an internal view of refill cartridge 1050 having an enlarged opening and nubs 1060. The nubs on the top of the refill cartridge are for locking into mating parts on the swirl chamber.

Figure 57:
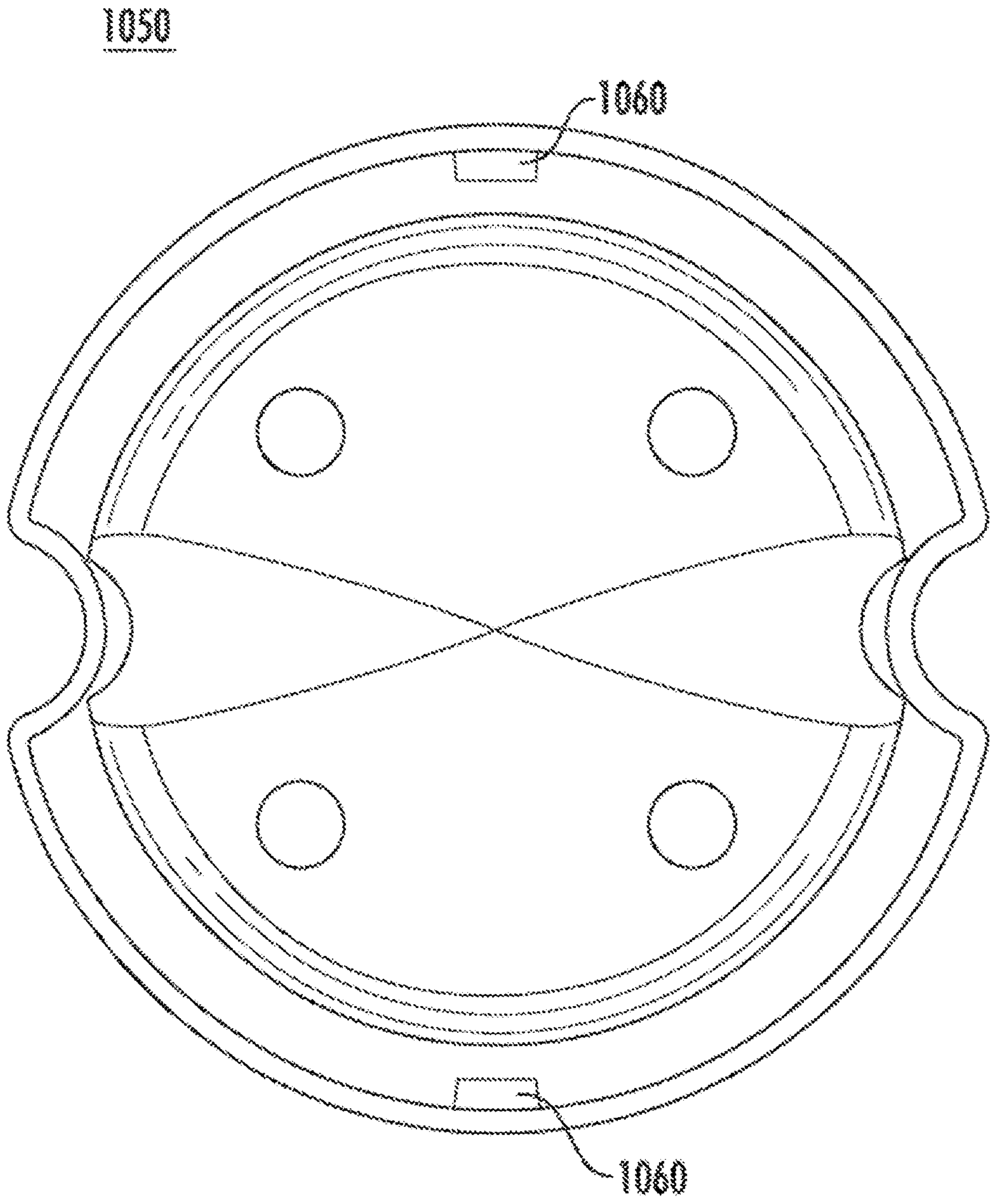
FIG. 57 illustrates a top view of the refill cartridge looking down through the large opening of the refill cartridge.

FIG. 57 illustrates a top view of refill cartridge 1050 looking down through the large opening of the refill cartridge.

Figure 58:
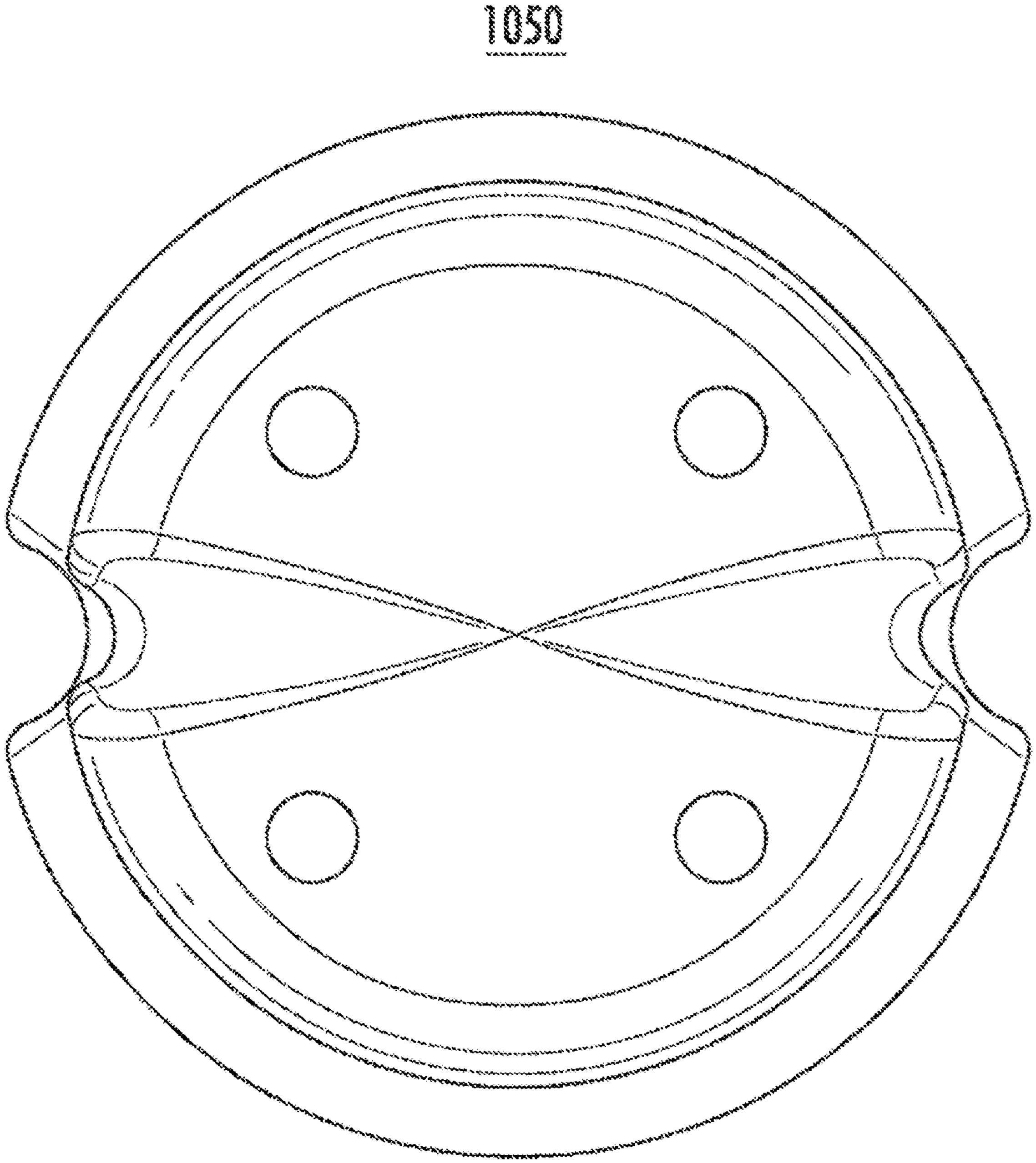
FIG. 58 illustrates a bottom view of the refill cartridge.

FIG. 58 illustrates a bottom view of refill cartridge 1050.

Figure 59:
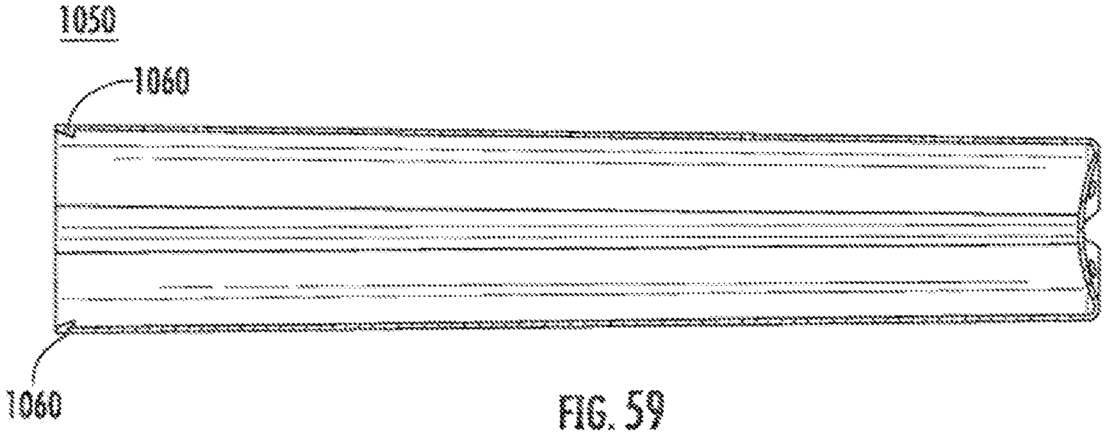
FIG. 59 is a cross-sectional view of the refill cartridge illustrating the nubs inside of the refill cartridge.

FIG. 59 is a cross-sectional view of refill cartridge 1050 illustrating nubs 1060 inside of refill cartridge 1050.

Figure 60:
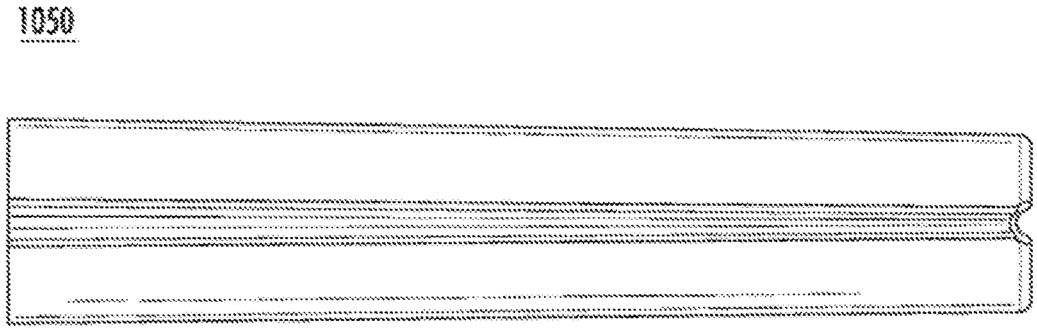
FIG. 60 is an external view of the refill cartridge.

FIG. 60 is an external view of refill cartridge 1050.

Figure 61:
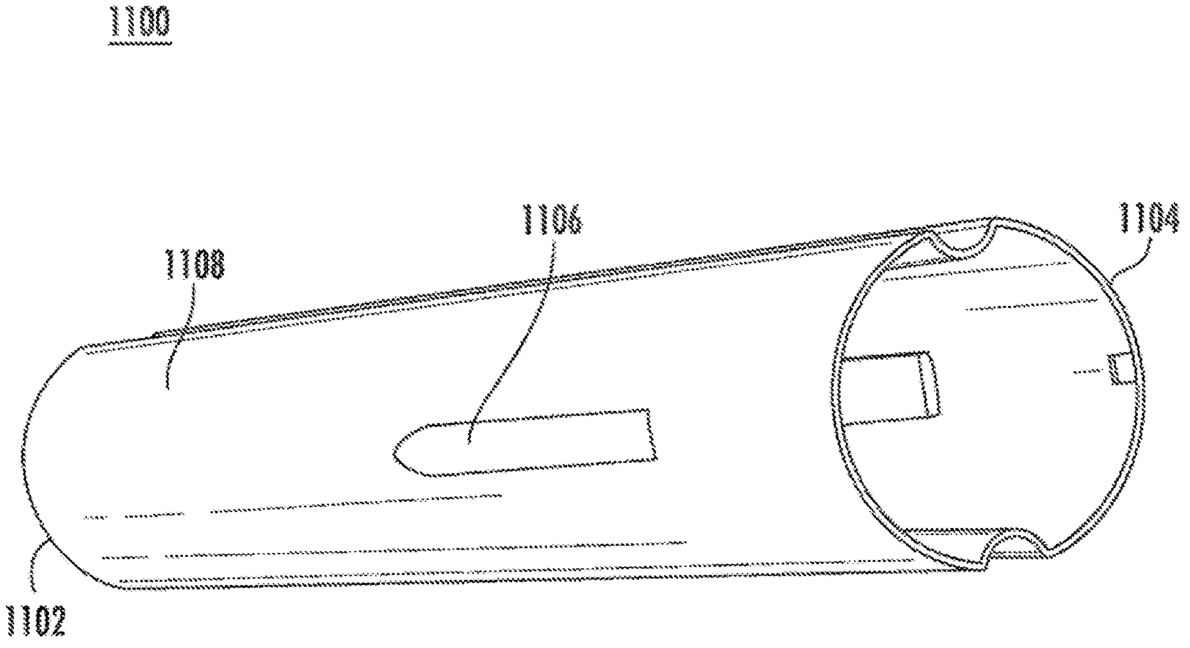
FIG. 61 is a perspective view of a "nestable" refill cartridge.

FIG. 61 is a perspective view of a "nestable" refill cartridge 1100. Refill cartridge 1100 is more tapered at a bottom end 1102 of refill cartridge 1100 than at an opposing top end 1104 of refill cartridge 1100. An indent 1106 is present on an external surface or side 1108 of refill cartridge 1100 that allows the refill cartridge nubs to slide down into and be received into another refill cartridge when more than one refill cartridge is nested together. The indents allow the nubs to slide down further when the refill cartridge is nested. The ability to nest is particularly beneficial for purposes of storage and transport of refill cartridges as they take up less space when bulk shipped.

Figure 62:
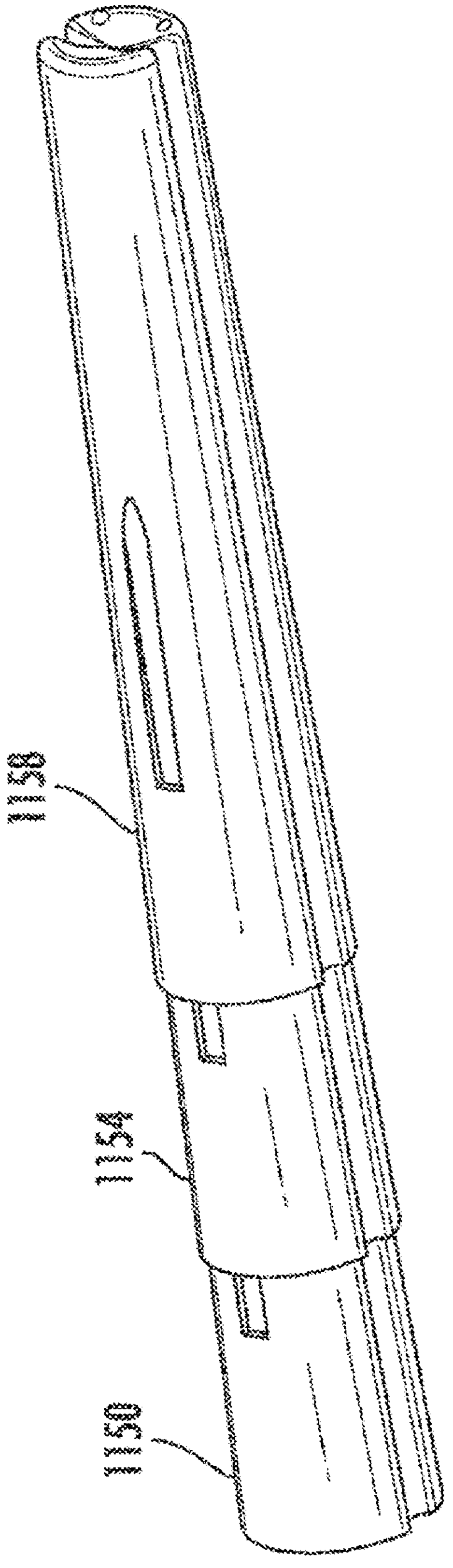
FIG. 62 is a perspective view of three nested refill cartridges.

FIG. 62 is a perspective view of three nested refill cartridges. Although refill cartridges 1150, 1154, and 1158 are shown, any number of refill cartridges may be nested.

Figure 63:
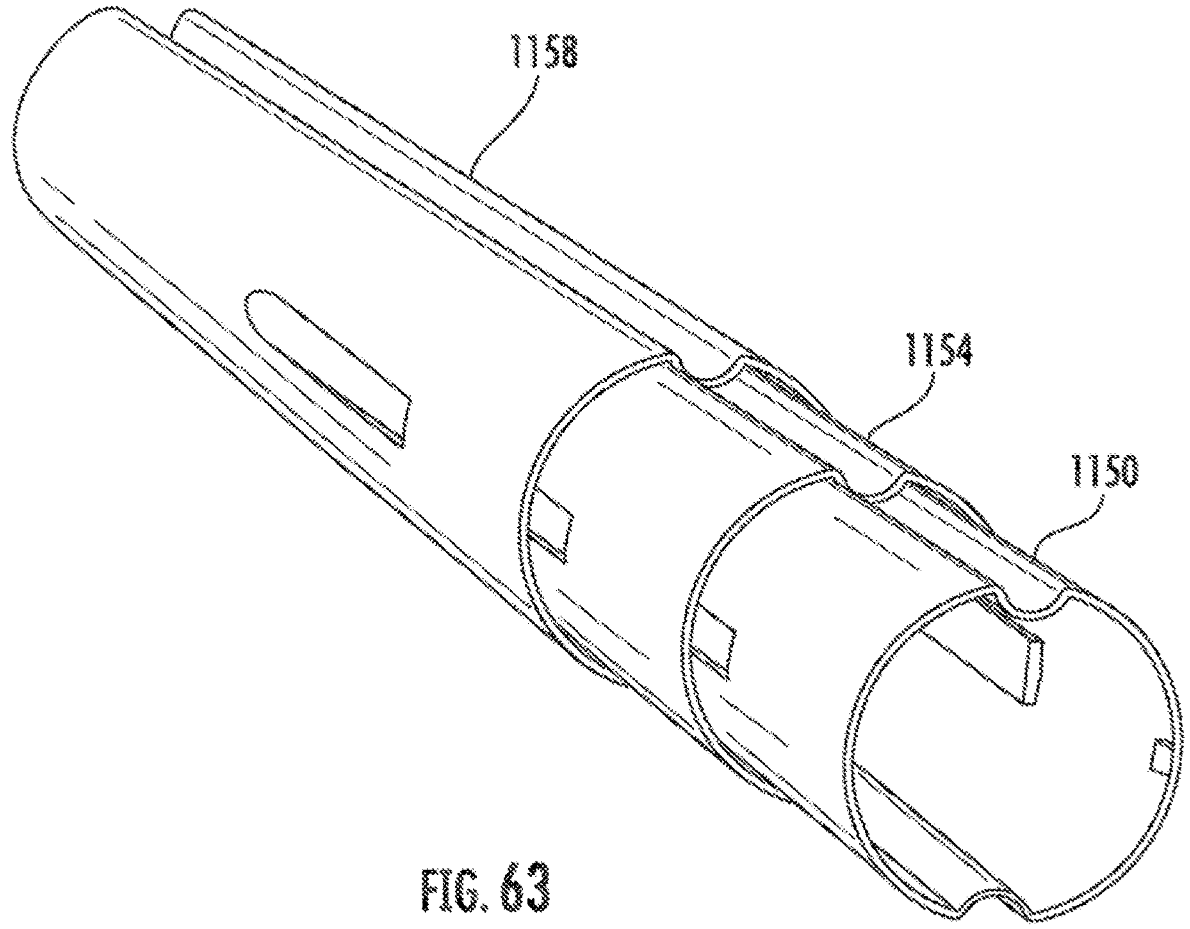
FIG. 63 is another perspective view of three nested refill cartridges.

FIG. 63 is another perspective view of nested refill cartridges 1150, 1154, and 1158 of FIG. 62.

Figure 64:
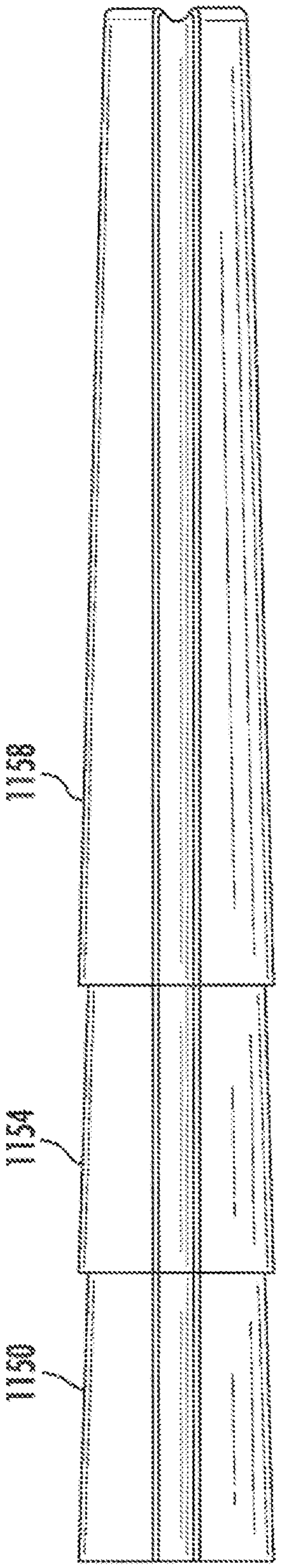
FIG. 64 is a side view of the three nested refill cartridges of FIG. 62.

FIG. 64 is a side view of the nested refill cartridges 1150, 1154, and 1158 of FIG. 62.

Figure 65:
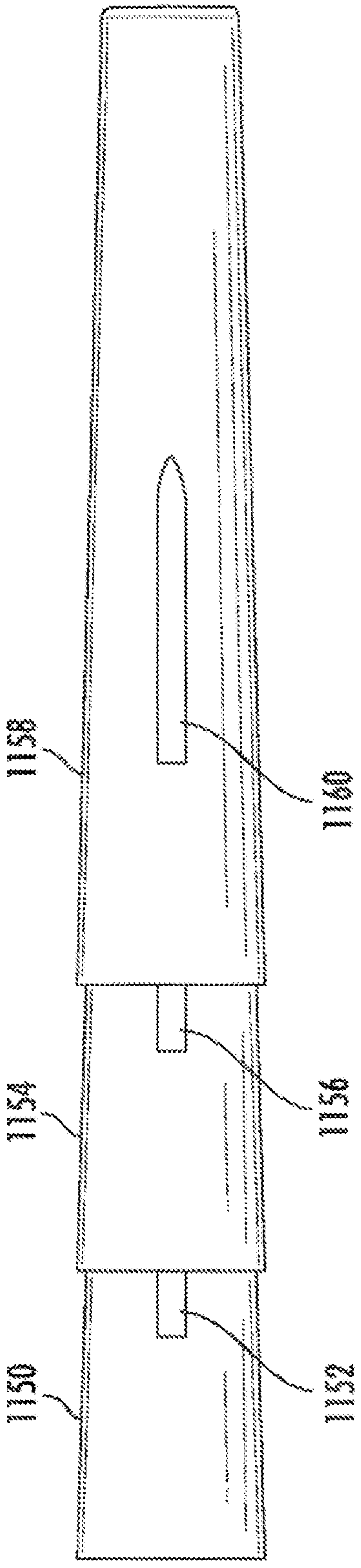
FIG. 65 is a view of the three nested refill cartridges of FIG. 64 rotated at an angle.
Figure 66:
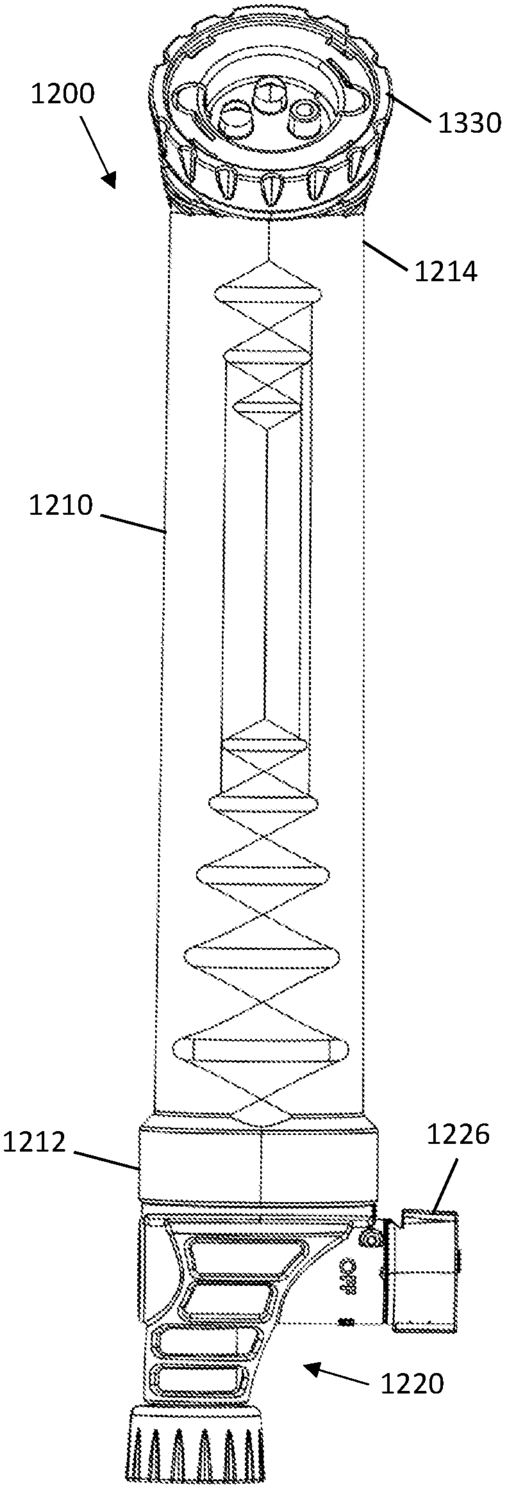
FIG. 66 is a side view of an improved spray wand according to at least one embodiment.
Figure 67:
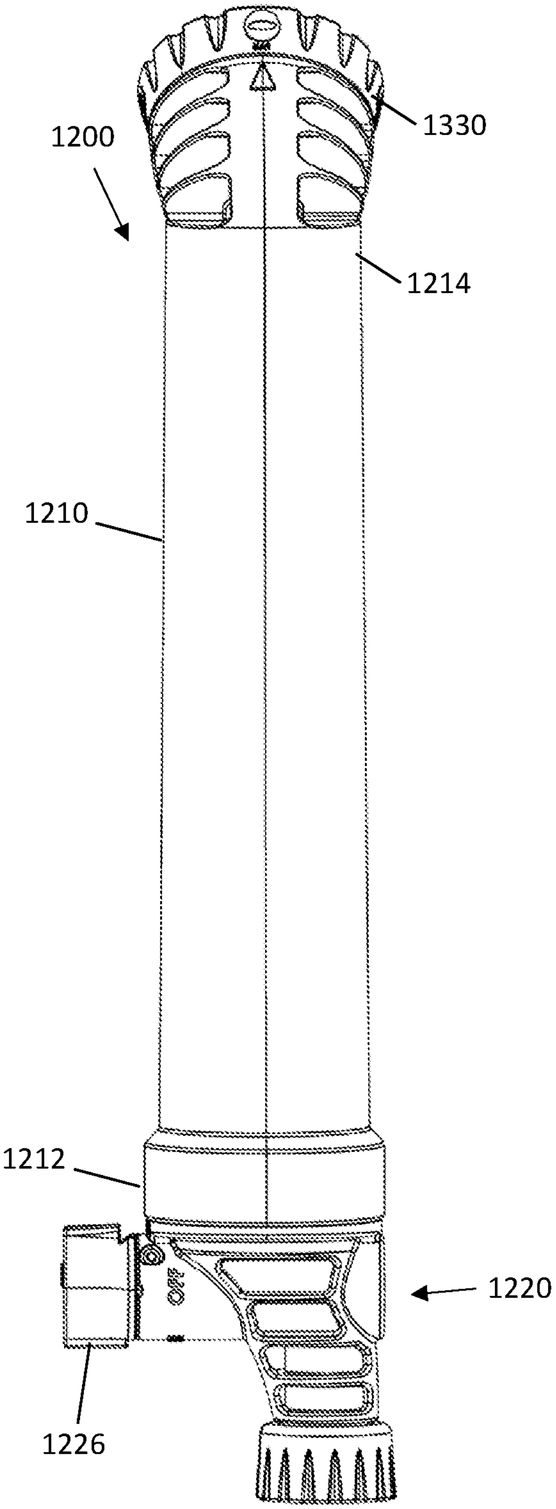
FIG. 67 is an opposite side view of the spray wand of FIG. 66.

FIG. 65 is a view of nested refill cartridges 1150, 1154, and 1158 of FIG. 64 (rotated at an angle) showing indents 1152, 1156, and 1160, respectively, on external surfaces or sides of the refill cartridges 1150, 1154, and 1158.

Figure 68:
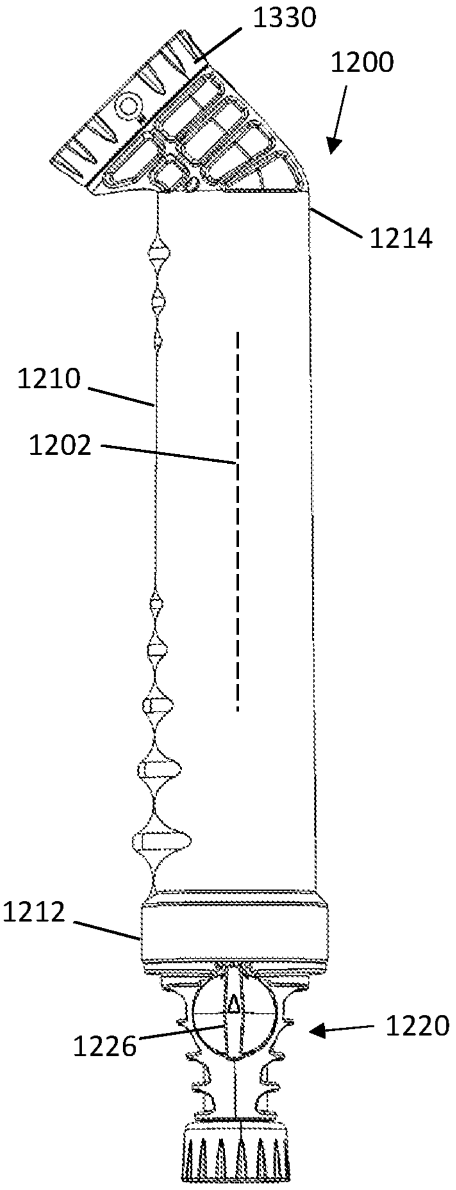
FIG. 68 is an adjacent side view of the spray wand with respect to FIG. 66.
Figure 69:
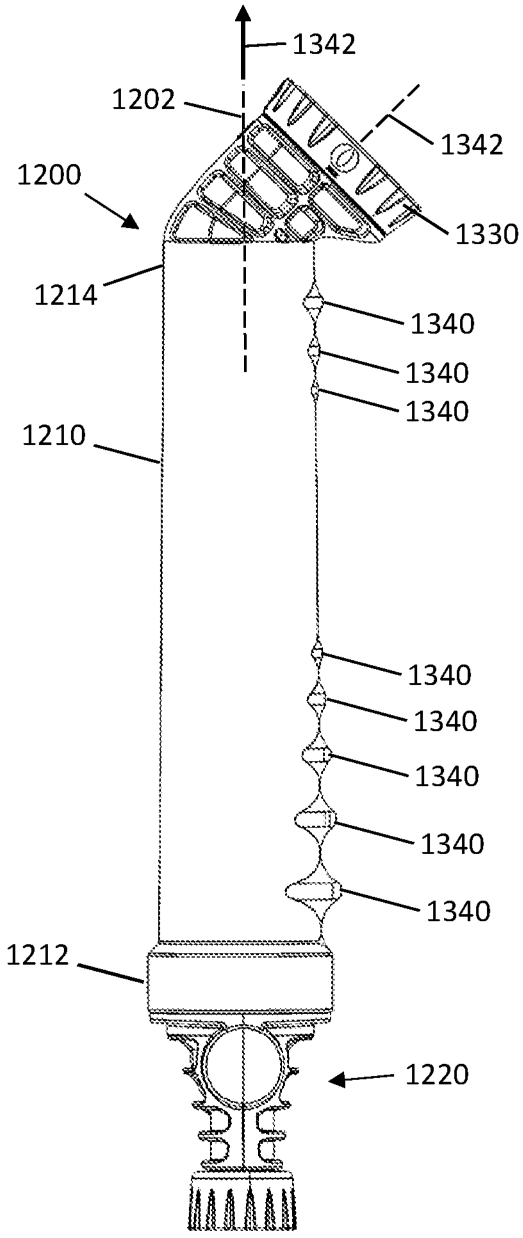
FIG. 69 is an opposite side view of the spray wand with respect to FIG. 68.
Figure 70:
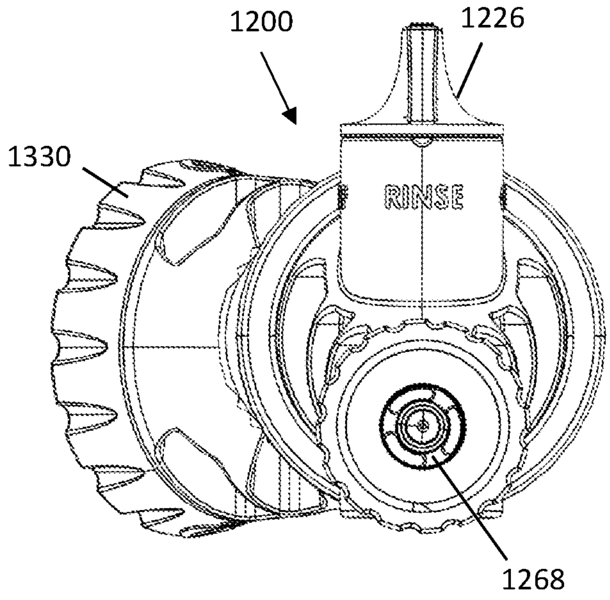
FIG. 70 is a longitudinal view of the spray wand of FIG. 66 showing the input end thereof.
Figure 71:
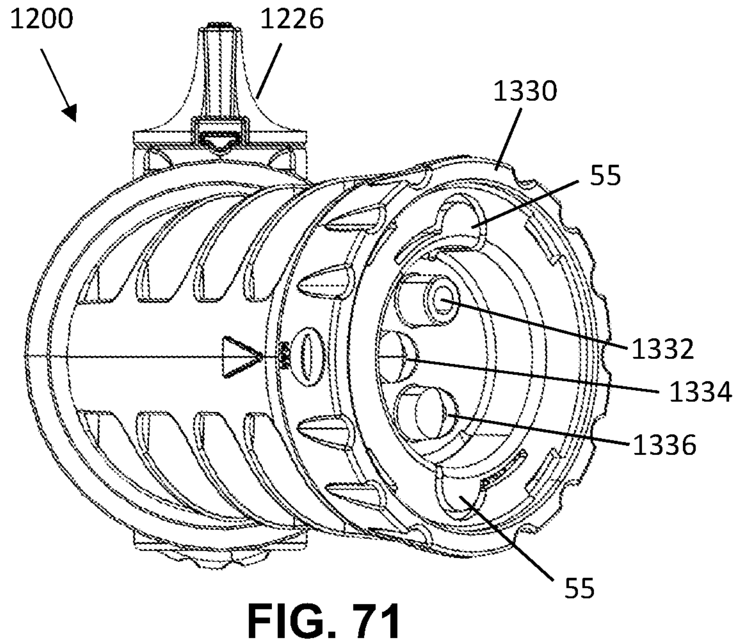
FIG. 71 is a longitudinal view opposite FIG. 70 of the spray wand of FIG. 66 showing the output end thereof.

FIGS. 66-84 illustrate, in various views, an improved spray wand 1200 according to at least one embodiment, and components thereof. As shown assembled in FIGS. 66-69, the spray wand 1200 includes a hollow tubular main body 1210 extending generally along a longitudinal axis 1202 (FIG. 68), an operative valve assembly 1220 mounted on an input end 1212 of the main body, a nozzle 1330 mounted on an output end 1214 of the main body 1210 opposite the valve assembly, and a cartridge assembly 1300 (FIG. 84) installed within the main body in the illustrated embodiment.

Figure 74:
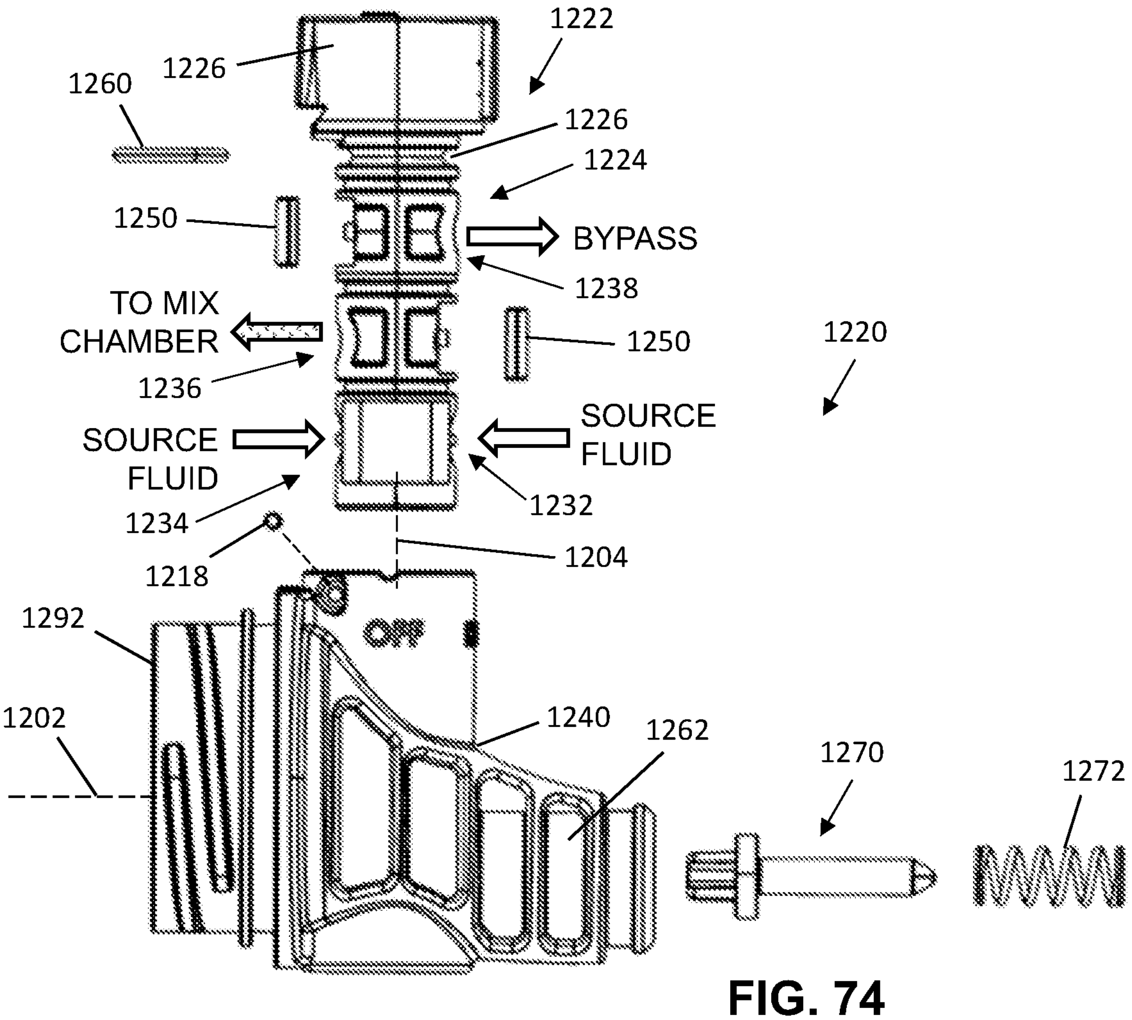
FIG. 74 is an exploded view of components of the operative valve assembly of FIG. 72.
Figure 75:
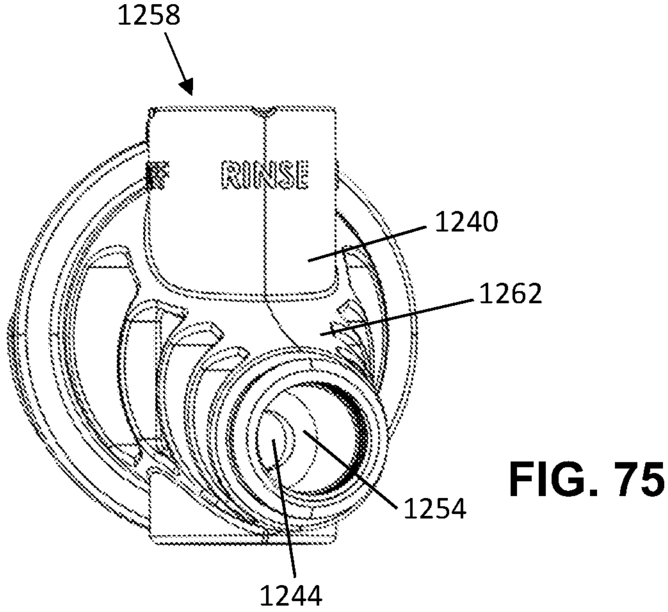
FIG. 75 is yet another perspective view of the housing of the valve assembly of FIG. 72.
Figure 76A:
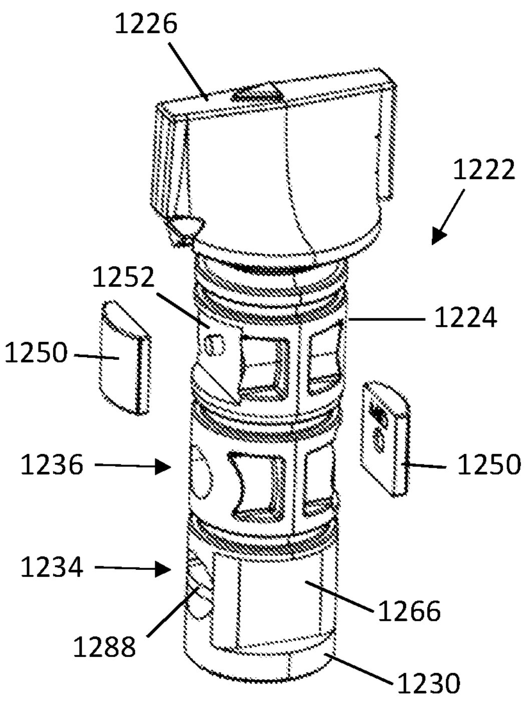
FIG. 76A is a perspective view of a valve core of the operative valve assembly of FIG. 72, according to at least one embodiment.
Figure 76B:
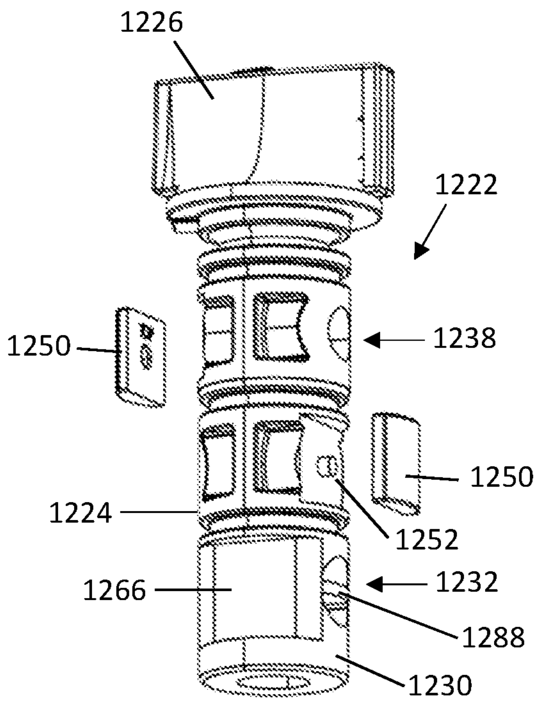
FIG. 76B is another perspective view of the valve core of the operative valve assembly of FIG. 72, according to at least one embodiment.
Figure 77A:
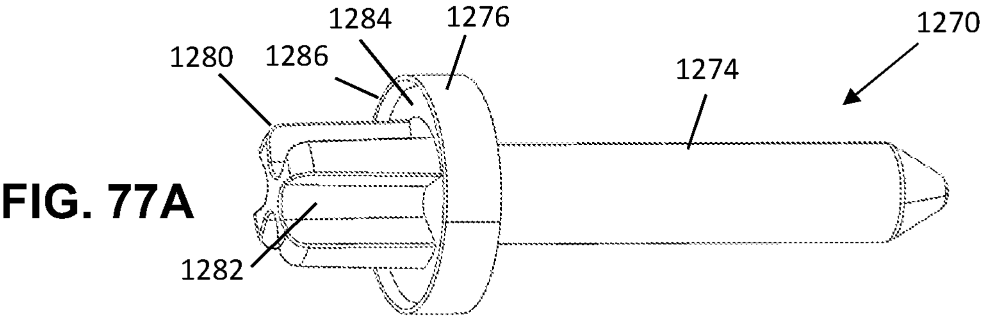
FIG. 77A is a perspective view of a sealing piston of the operative valve assembly of FIG. 72, according to at least one embodiment.
Figure 77B:
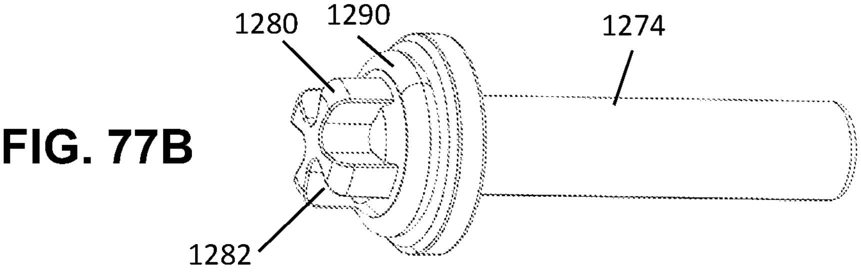
FIG. 77B is a perspective view of an alternative sealing piston, according to at least one embodiment.

The operative valve assembly 1220 serves as an input device for the spray wand 1200, and has several operative modes according to a user-selected rotational position of a valve core 1222 relative to an external valve housing 1240, shown as separated for illustration in FIG. 74. The valve core 1222 has a contoured column 1224 positioned within a corresponding cylindrical interior space 1242 (FIG. 73A) of the valve housing 1240 when assembled and retained by a pin 1218 (FIG. 74) pressed into the housing and engaging a exterior groove 1226 defined by the valve core 1222 while permitting rotation of the core. In the illustrated embodiment, the valve core 1222 extends along, and rotates around, a rotational axis 1204 (FIGS. 72, 74), which is non-parallel to the longitudinal axis 1202 (FIGS. 68, 69, 72), and perpendicular thereto in the illustrated embodiment.

The valve core 1222 is similarly constructed, arranged, and operable as the rotatable valve 720 described above with reference to FIGS. 39-42. Source fluid can enter a distal portion 1230 (FIG. 76B) of the contoured column 1224 of the valve core 1222 from either of two input channels that are diametrically opposed with respect to the rotational axis 1204, and are referenced nominally herein as a mix input channel 1232 (FIG. 74), with reference to entering the cartridge assembly 1300, and a bypass input channel 1234, with reference to bypassing the cartridge assembly 1300.

When either the mix input channel 1232 or the bypass input channel 1234 is directed rearward toward and aligned with the single input opening 1244 (FIG. 73A) through the wall of the valve housing 1240, source fluid can flow into and along the interior of the contoured column 1224 of the valve core 1222. Thus, either condition corresponds to one of two open positions of the valve core and corresponding open conditions of the valve assembly.

Source fluid can exit the valve core 1222 from either of two output channels according to the rotational position of the valve core 1222 relative to the external valve housing 1240. The two output channels, referenced as a mix output channel 1236 and a bypass output channel 1238, are offset along the rotational axis 1204 between a lever handle 1226 and the distal portion 1230, and are directed in opposite radial directions so as to align in alternating order with respective output openings through the wall of the valve housing 1240 corresponding to mix and bypass modes of the spray wand 1200 as the valve core 1222 is rotated. The output openings, referenced as a mix output opening 1246 and a bypass output opening 1248 (FIG. 73B), are similarly offset along the rotational axis 1204, but are directed in a common radial direction, forward toward the main body 1210 and cartridge assembly 1300. When either one of the mix output channel 1236 or the bypass output channel 1238 is directed forward toward and aligned with the respective a mix output opening 1246 or bypass output opening 1248, source fluid can forward flow along the interior of the valve core 1222 and forward therefrom.

The valve core lever handle 1226 is fixed to the contoured column 1224 opposite the distal portion 1230 for manual rotation and selection by a user of whether flow is off, directed to the cartridge assembly 1300 for mixing, or directed to bypass the cartridge assembly 1300. Corresponding indicia are provided on valve housing 1240 for reference by the user.

To provide for improved sealing within the valve housing 1240, stopper pads 1250 (FIGS. 74, 76A-76B) are engaged with the contoured column 1224, each in a respective chord recess 1252 of the outer wall of the column 1224 and retained by a post extending radially outward therefrom. The stopper pads 1250, each engaged with the column 1224, travel circumferentially around the rotational axis 1204 when the valve core is rotated. A respective chord recess 1252 and pad 1250 therewith are positioned as diametrically opposed to the mix output channel 1236 and the bypass output channel 1238 so as to seal against the output openings through the wall of the valve housing 1240. Thus, when either the mix output channel 1236 or the bypass output channel 1238 is directed forward to align with the corresponding mix output opening 1246 or bypass output opening 1248 by user selection, a stopper pad 1250 diametrically opposes and seals against the unselected output opening. The lower or internal end of the interior space of the valve housing 1240 is sealed by a contiguous end plate 1256 (FIG. 72), and the opposite mouth 1258 (FIG. 75) of the interior space is sealed with the contoured column 1224 by an O-ring 1260 (FIG. 74) upon assembly of the operative valve assembly 1220.

The operative valve assembly 1220 has a reciprocating sealing piston 1270 that improves valve function against unwanted forward flow and leaking when the valve core 1222 is in a closed position corresponding to a closed condition of the valve assembly 1220. The piston 1270 serves to prevent forward flow of source fluid into the input opening 1244 (FIG. 73A) through the wall of the valve housing 1240 when neither the mix input channel 1232 nor the bypass input channel 1234 is directed rearward toward and aligned with the single input opening 1244. The valve housing 1240 includes a rearward extending input conduit 1262 for coupling the valve assembly 1220 and the input opening 1244 thereof with a fluid source such as a water hose. A rotatable hose nut 1264 (FIG. 72) is mounted on the terminal end of the conduit. A vented retainer 1268 (FIGS. 78A and 70) having external threads engages internal threads within the terminal end of the conduit and traps a spring 1272 and the piston 1270 within the conduit.

The piston 1270, in the illustrated embodiment, has a cylindrical shank 1274 (FIG. 77A), a sealing cap 1276 attached to a forward end of the shank, and a fluted alignment knob 1280 attached to the forward end of the sealing cap. The alignment knob 1280 is illustrated as having a cruciform profile defined by four external flutes 1282 for source fluid flow. The cap 1276, extending radially outward from the shank 1274, defines a rearward shoulder by which the spring 1272 is trapped between the cap and retainer 1268. The spring 1272 is illustrated as a helical compression spring mounted and trapped on the shank 1274.

Referring also to the housing 1240 (FIG. 75), a sealing surface 1254 is defined within the conduit 1262 and surrounding the input opening 1244 for engaging, when the piston 1270 is in a forward sealing position thereof, the forward end of the sealing cap, by way of an O-ring 1290 (FIG. 78B) carried by the piston 1270 at the forward end of the sealing cap 1276 in the illustrated embodiment. The spring 1272 is compressed upon assembly, persistently biasing the piston 1270 toward the forward sealing position to move the cap 1276 toward the input opening 1244 and sealing surface 1254.

In at least one embodiment, the sealing cap 1276 (FIG. 77A) has a planar annular forward surface 1284 and a forward extending perimeter lip 1286 surrounding the forward surface to receive the O-ring 1290. In such an embodiment, the sealing surface 1254 (FIG. 75) is correspondingly planar and annular. In at least one other embodiment, an alternative sealing cap (FIG. 77B) has a frustoconical forward surface tapering radially inward toward the alignment knob 1280, with a groove defined in the forward surface to receive the O-ring 1290.

Figure 72:
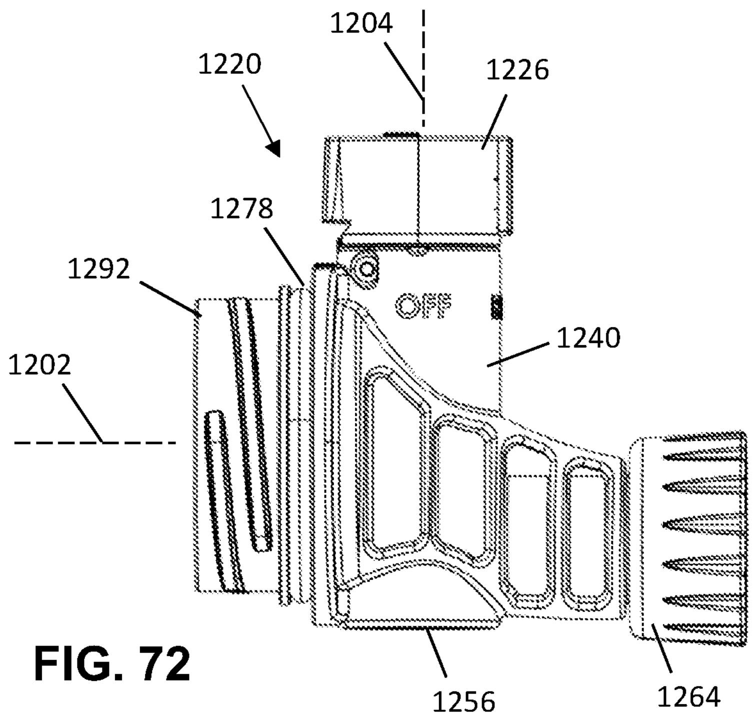
FIG. 72 is a side view, as in FIG. 66, of the operative valve assembly of the improved spray wand, according to at least one embodiment.
Figure 73A:
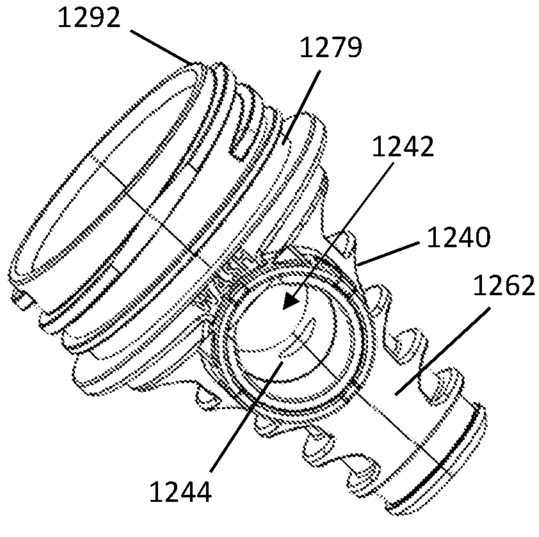
FIG. 73A is a perspective view of the housing of the valve assembly of FIG. 72.
Figure 73B:
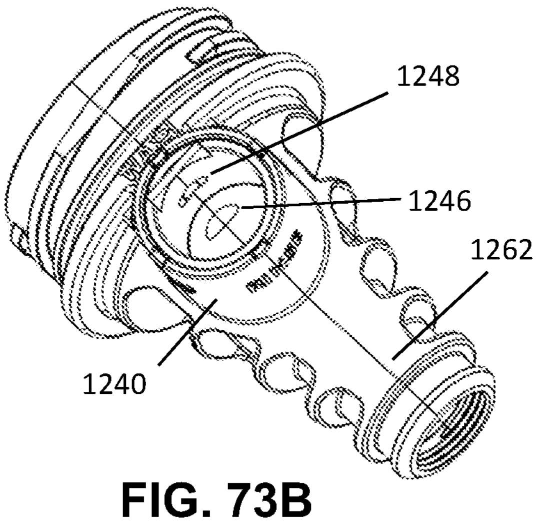
FIG. 73B is another perspective view of the housing of the valve assembly of FIG. 72.
Figure 78A:
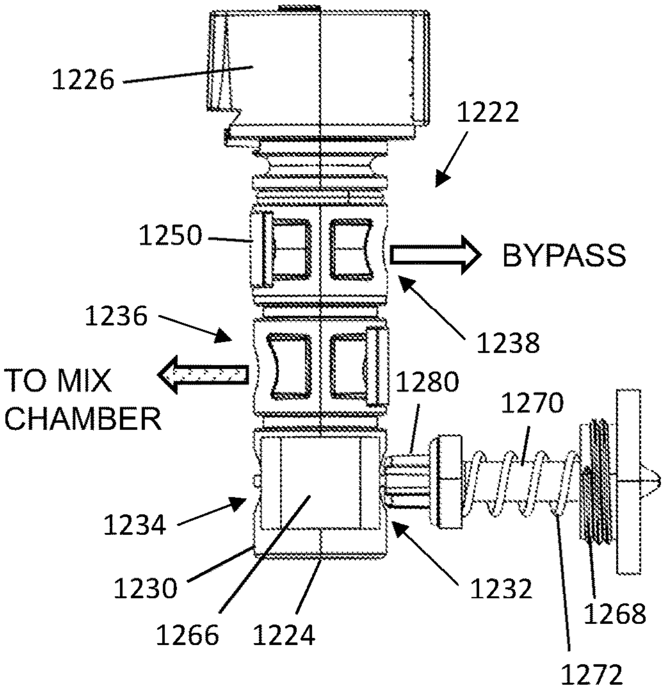
FIG. 78A is a side view of components of the operative valve assembly for illustration of dual purpose flow.
Figure 78B:
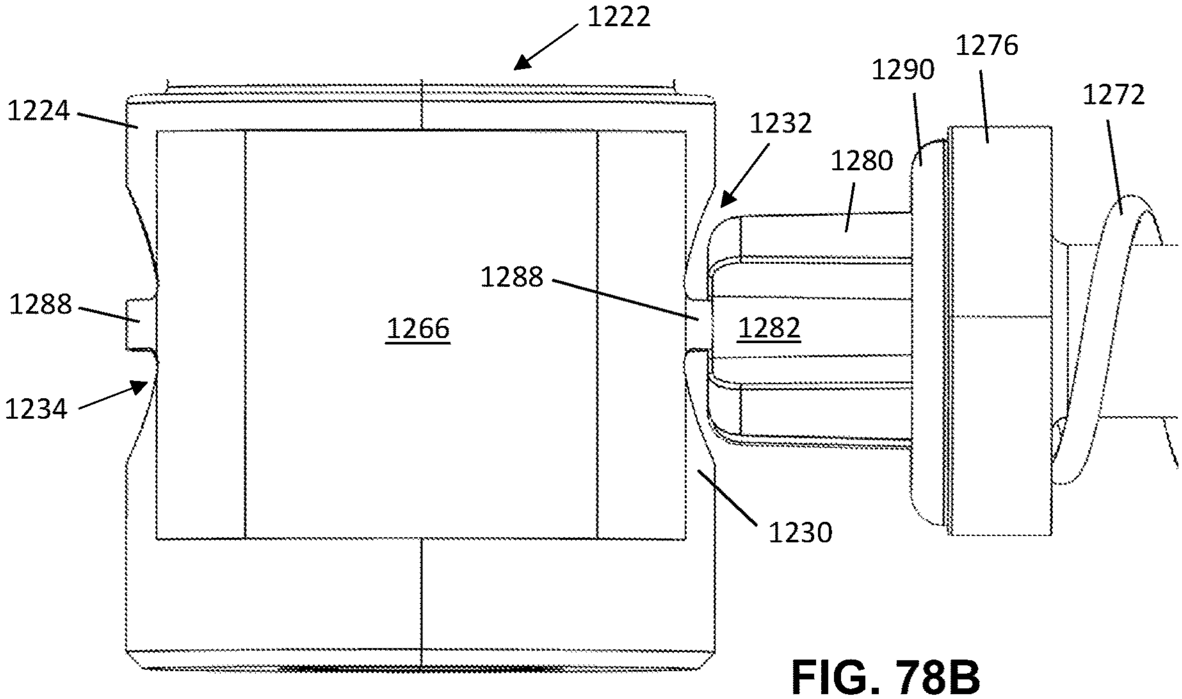
FIG. 78B is an enlarged view of a portion FIG. 78A for illustration of actuation of the sealing piston.

FIG. 78A shows the assembled relative arrangement of the valve core 1222 and sealing piston 1270 without the valve housing (FIG. 72). The fluted alignment knob 1280 is received by the input opening 1244 and extends toward the contoured distal portion 1230 of the valve core 1222, which has two diametrically opposed and diametrically reduced areas, illustrated as flat chord recesses 1266, each being adjacent the mix input channel 1232 and the bypass input channel 1234. When either chord recess 1266 is directed toward the input opening 1244, corresponding to closed conditions of the operative valve assembly 1220, the biased sealing piston 1270 is positioned fully forward in a sealing position.

Upon rotation of the valve core 1222 from either closed position, as either chord recess 1266 moves from alignment with the alignment knob 1280, the piston 1270 is pressed rearward from the sealing position. When either of the mix input channel 1232 and the bypass input channel 1234 is directed toward the input opening 1244, corresponding to the mix and bypass conditions, the biased sealing piston 1270 is pressed and maintained rearward from the sealing position, thus opening the valve for source fluid entry. A respective cam 1288 (FIG. 78B) is positioned in the opening of each of the mix input channel 1232 and the bypass input channel 1234 along the exterior of the distal portion 1230 of the contoured column 1224, pressing and maintaining the piston 1270 rearward from the sealing position against the force of the spring. The forward face of the alignment knob 1280 is concave to smoothly engage either cam as the valve core 1222 is rotated. Each cam 1288 bifurcates its respective input channel 1232 or 1234.

As source fluid flows from a hose or other source, the fluid enters the rearward extending conduit 1262 through the vents (FIG. 70) of the retainer 1268, past the unseated sealing cap of the piston 1270, along the external flutes 1282 of the alignment knob 1280, and into the aligned mix input channel 1232 or bypass input channel 1234.

Source fluid entering the valve core 1222 in either open position of the valve assembly 1220, with reference to either the mix input channel 1232 or the bypass input channel 1234 being directed rearward, travels along the interior of the contoured column 1224 and exits the valve core 1222 through either the forward directed mix output channel 1236 or bypass output channel 1238 respectively. From there, flowing fluid travels through either the mix output opening 1246 or bypass output opening 1248 (FIGS. 73B and 79), thus exiting the valve assembly 1220.

Figure 81:
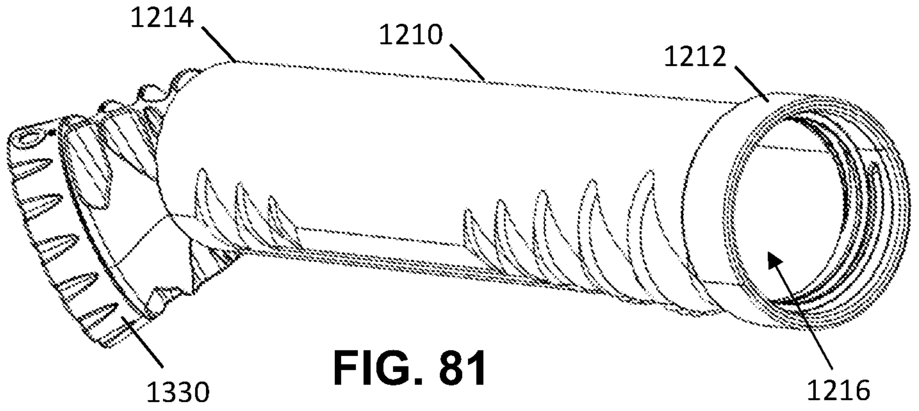
FIG. 81 is a perspective view of the tubular main body of the spray wand of FIG. 66, according to at least one embodiment, carrying the nozzle at its forward end.
Figure 83:
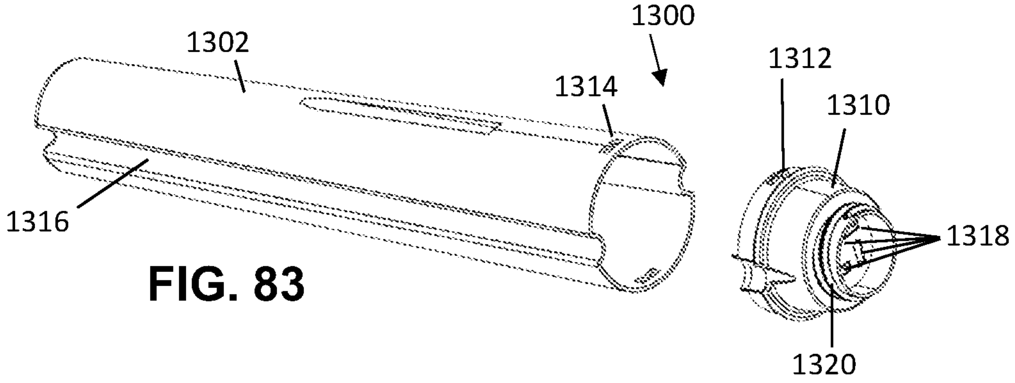
FIG. 83 is a perspective view of the cartridge assembly of FIG. 82, separated as a swirl chamber and container, each according to at least one embodiment.

The operative valve assembly 1220 serves as the input device for the spray wand 1200, and as a coupling structure for the tubular main body 1210 and any cartridge assembly therein, which are shown separately in FIGS. 81 and 83, respectively. Each is separately connected to the forward end of the valve assembly 1220 to complete the spray wand 1200. The tubular main body 1210, carrying the nozzle 1330 at its forward output end 1214, has an internally threaded mouth 1216 at its rearward end 1212 for mounting on and engaging the forward end of the valve assembly 1220, which has a forward extending and externally threaded outer mounting cylinder 1292 (FIG. 72). An O-ring 1278 (FIG. 72) received in an external groove 1279 (FIG. 73A) at the rearward end of the mounting cylinder 1292 seals with the smooth interior wall of the rearward end of the mouth 1216 of the tubular main body 1210 when assembled. In absence of a cartridge assembly within the tubular main body 1210, the spray wand 1200 can be used in either mix or bypass mode to dispense source fluid from the nozzle.

The cartridge assembly 1300 includes an elongate container 1302 and rearward swirl chamber 1310, which are illustrated as separated in FIG. 83. In the illustrated embodiment the forward end of the swirl chamber 1310 is received into the rearward end of the container 1302, with radially outward extending nubs 1312 on the exterior of the swirl chamber 1310 snapping into corresponding notches 1314 defined by the container to secure their engagement.

Figure 82:
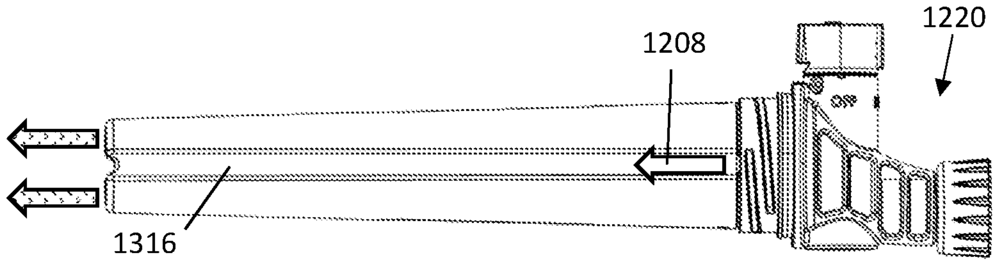
FIG. 82 is a perspective view of the valve assembly and cartridge assembly, each according to at least one embodiment, of the spray wand of FIG. 66.

The cartridge assembly 1300 is shown assembled and connected to the forward end of the valve assembly 1220 in FIG. 82. The swirl chamber 1300 has an externally threaded mouth 1320 (FIG. 83) at its rearward end for engaging the forward end of the valve assembly 1220, which has a corresponding mounting port 1294 (FIG. 79) concentric with and within the mounting cylinder 1292. For illustrative convenience, the swirl chamber 1310 is shown in FIG. 80 as mounted on the valve assembly 1220 without the container and tubular main body. FIG. 80 illustrates tangential source fluid flow 1206 within the swirl chamber as when emanating from the mix output opening 1246 (FIG. 79), and forward source fluid flow 1208 (FIGS. 80, 82), for example along external rinse channels 1316 that extend longitudinally along the exterior of the container 1302, as when fluid flows via bypass output opening 1248.

Figure 84:
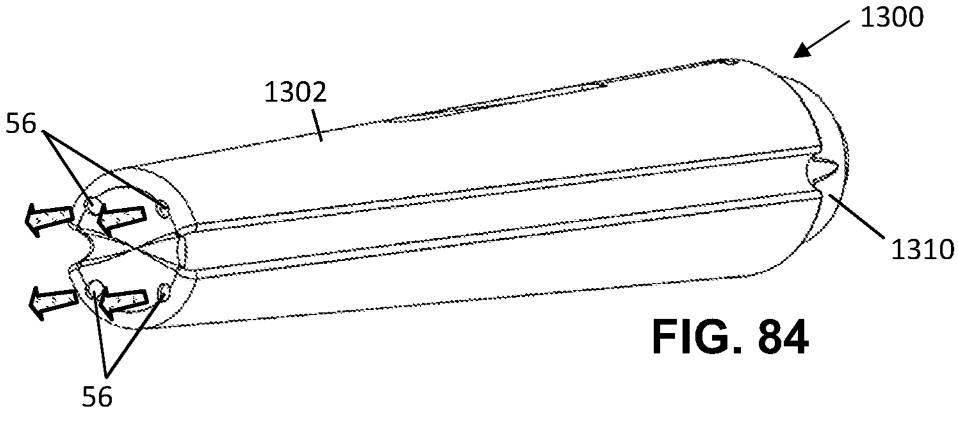
FIG. 84 is a perspective view of the forward end of the assembled cartridge assembly with reference to FIG. 83.

The function and structure of the swirl chamber is described in the preceding, for example with reference at least to FIG. 14 and the swirl chamber 42. The swirl chamber 1310 of FIGS. 80 and 83 similarly includes openings 1318 (FIG. 83) in the rearward side thereof through which source fluid from the mix output opening 1246 passes into respective the tangential channels 48 defined by the raised projections 50 extending forward and respective exit windows 52. During use, source fluid passes through the swirl chamber 1310 and creates a swirl or vortex and the mixing and release of soluble contents within the container. The mixture then exits the container from the forward end thereof, opposite the swirl chamber 1310, via the exit holes 56 (FIG. 84). The container can hold a chemical or chemical formulation in solid form, also referred to herein as a solid chemistry, as described in the preceding.

Figure 79:
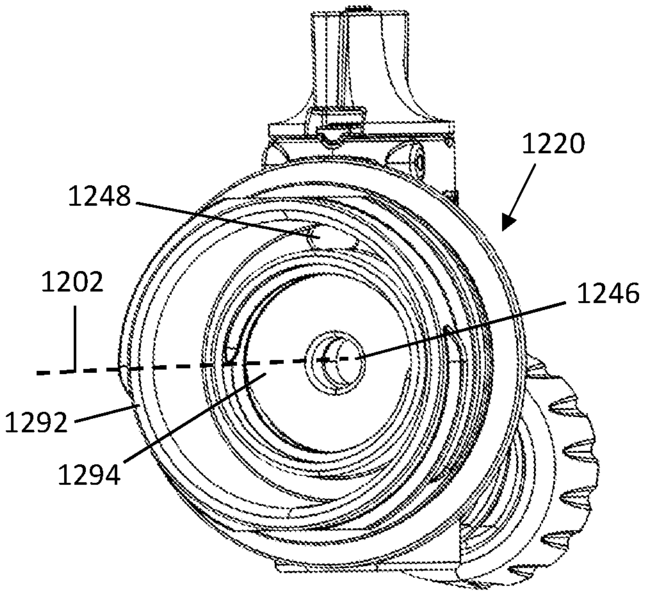
FIG. 79 is a perspective view of the output end of the operative valve assembly of FIG. 72.
Figure 80:
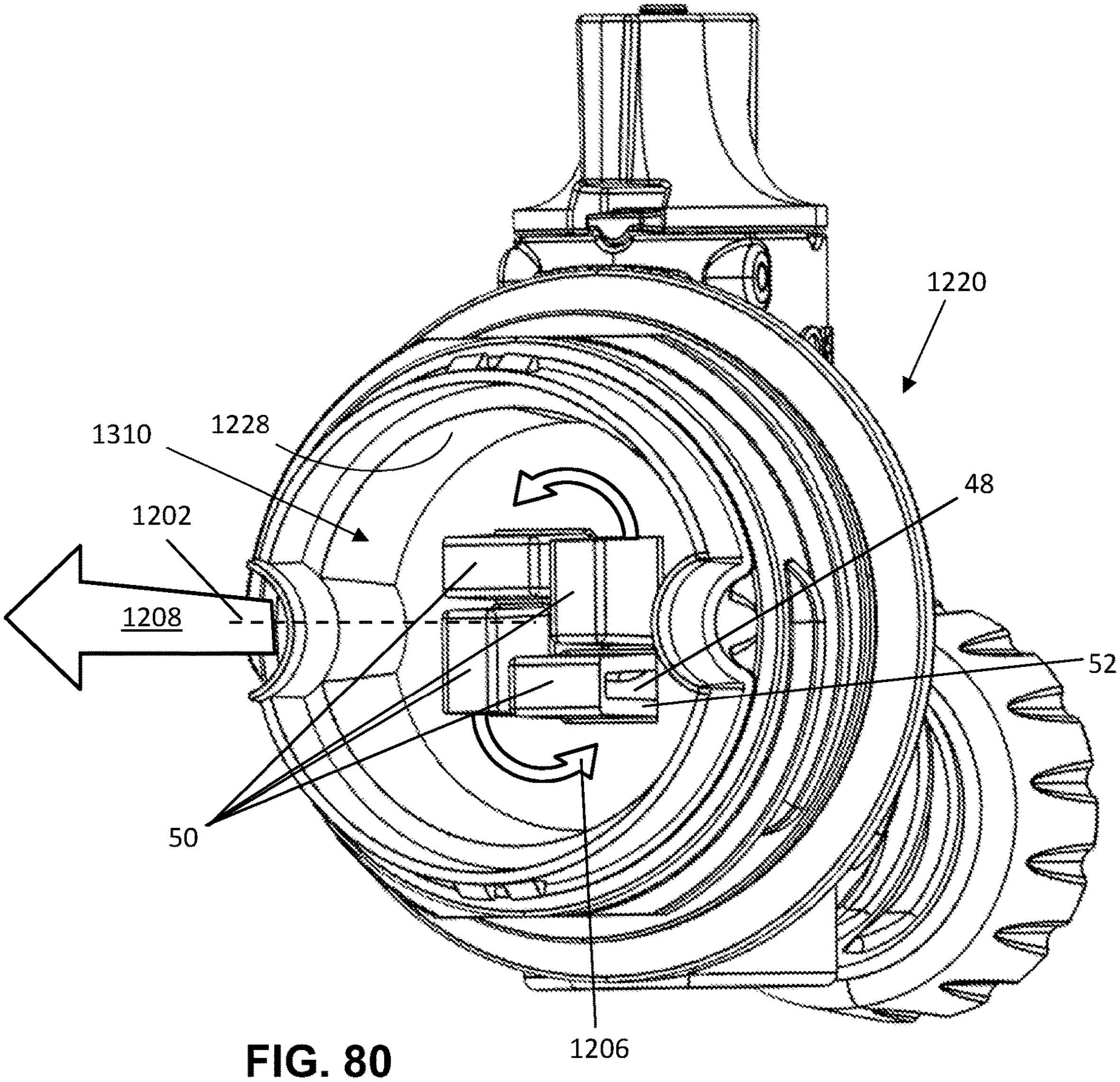
FIG. 80 is a perspective view of the output end of the operative valve assembly of FIG. 72, with a swirl chamber mounted thereon, according to at least one embodiment.

As shown in FIGS. 80 and 14, each of the multiple raised projections 50 has a respective exit window 48 that is radially offset from the longitudinal axis 1202 (FIGS. 79-80). Each raised projection 50 defines a respective tangential channel 48 that is radially offset from the longitudinal axis 1202 and that opens at the respective exit window 48 to direct source fluid therefrom. The raised projections 50 and exit windows 48 are circumferentially surrounded by a forward extending inner wall 1228 of the swirl chamber 1310. The inner wall 1228 is generally circularly cylindrical, having a central axis that is concentric with the longitudinal axis 1202 of the assembled spray wand. Source fluid from the mix output opening 1246, which is aligned with the longitudinal axis 1202, enters the swirl chamber and flows through the exit windows and is thus radially and tangentially diverted with respect to the longitudinal axis 1202 such that source fluid 1206 flows circumferentially in a tangential swirling manner within the inner wall 1228 of the swirl chamber 1310, around the longitudinal axis 1202, and forward along the longitudinal axis.

Similarly to the spray nozzle 10 FIG. 6, the spray nozzle 1330 of FIGS. 66-71 has multiple exit orifices corresponding to user-selectable spray patterns for exiting source fluid, in bypass mode, or exiting mixed fluid, in mixing mode. In the illustrated embodiment, the spray nozzle 1330 includes a streaming orifice 1332 for maximum flow, and orifices 1334 and 1336 having respective spray patterns in use, non-limiting examples of which include expanding cone, fan, mist, and collimated jet. Detents 55 are features that are shown to cue the user as rotation of the spray nozzle registers into indexed positions corresponding to the various orifices and maintain such positions.

The spray wand 1200 includes advantageous ergonomic features. The tubular main body 1210 has spaced partially circumferential ridges 1340 (FIG. 69) distributed along its exterior, for example proximal both the input end 1210 and output end 1214 in the illustrated embodiment, to facilitate handling of the spray wand 1200 along the main body at either end thereof. While variations may occur with various nozzle setting, the nozzle 1330 is generally directed along a spray axis 1342, which extends at an acute angle relative to a forward direction 1244 along the longitudinal axis. Thus, handling the spray wand in use and directing the spray from the nozzle 1330 by the user is comfortably accomplished without necessitating excess wrist strain and flexing.

Features shown similarly in FIGS. 66-84 as in one or more of FIGS. 1-65 benefit from descriptions of same. Descriptions of all are to be taken as cumulative wherever contradistinctions are neither illustrated nor described. All features described with reference to any one embodiment of the drawings are to be taken as part of, in at least some implementations, of any an all other embodiments wherever possible.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A spray wand comprising:
- a hollow tubular main body having an input end and an output end;
- a nozzle mounted on the output end of the main body; and
- a valve assembly configured to mount the input end of the main body, the valve assembly comprising:
  - a housing having a interior space and an input conduit for coupling the valve assembly with a fluid source;
  - a sealing piston biased within the input conduit toward a sealing position thereof; and
  - a valve core having a column rotatable within the interior space of the housing and a handle extending from the column, the valve core being rotatable between at least one open position corresponding to an open condition of the valve assembly and at least one closed position corresponding to a closed condition of the valve assembly;

wherein, upon rotation of the column to at least one open position thereof, the sealing piston biased within the input conduit is pressed from the sealing position and wherein, upon rotation of the column to at least one c on thereof the sealing piston biased within the input conduit is pressed by a contoured section of the column from the sealing position.

2. The spray wand of claim 1, wherein the housing has an input opening from the input conduit to the interior space, wherein the sealing piston comprises a knob received by the input opening and extending toward the contoured section of the column.

3. The spray wand of claim 2, wherein the contoured section of the column comprises:
- at least one recess that aligns with the input opening when the valve core is at the at least one closed position, permitting the sealing piston to reside at the sealing position thereof; and
- at least one input channel that aligns with the input opening when the valve core is at the at least one open position.

4. The spray wand of claim 3, wherein the contoured section of the column comprises a cam that aligns with the input opening and presses the sealing piston from the sealing position the when the valve core is at the least one open position.

5. The spray wand of claim 4, wherein the cam bifurcates the at least one input channel.

6. The spray wand of claim 1, wherein:
- the housing has an input opening from the input conduit to the cylindrical interior space; and
- the sealing piston comprises a shank and a sealing cap attached to a forward end of the shank, the sealing cap facing the input opening.

7. The spray wand of claim 6, wherein the sealing piston comprise a fluted knob attached to the forward end of the sealing cap.

8. The spray wand of claim 7, wherein the fluted knob has a cruciform profile defined by four external flutes.

9. The spray wand of claim 7, wherein the fluted knob comprises external flutes for source fluid flow along the external flutes from the input conduit into the input opening when the sealing piston biased within the input conduit is pressed from the sealing position.

10. The spray wand of claim 6, wherein the sealing cap has a planar annular forward surface for sealing the input opening.

11. The spray wand of claim 6, wherein the sealing cap has tapered forward surface for sealing the input opening.

12. The spray wand of claim 6, further comprising a helical compression spring mounted on the shank.

13. The spray wand of claim 12, wherein the spring is trapped between the cap and a vented retainer that engages the interior of the input conduit.

14. The spray wand of claim 1, wherein:
- the housing has an input opening from the input conduit to the cylindrical interior space;
- the valve core is rotatable at least partially around a rotational axis;
- the valve assembly comprises a first stopper pad and a second stopper pad; and
- the column comprises:
  - a distal portion through which source fluid can enter from the input opening when the sealing piston biased within the input conduit is pressed from the sealing position;
  - a first output channel and a diametrically opposed first recess in which the first stopper is retained; and
  - a second output channel and a diametrically opposed second recess in which the second stopper is retained, wherein the first output channel and second output channel are offset along the rotational axis and directed in opposite radial directions.

15. The spray wand of claim 1, further comprising a cartridge assembly comprising a swirl chamber and an elongate container extending along a longitudinal axis, the swirl chamber having a rearward end for engaging a forward end of the valve assembly.

16. The spray wand of claim 15, wherein the swirl chamber includes openings in a rearward side thereof leading into raised projections each having a respective exit window that is radially offset from the longitudinal axis.

17. The spray wand of claim 16, wherein the swirl chamber includes a forward extending inner wall that circumferentially surrounds the raised projections and the exit windows to divert source fluid radially and tangentially with respect to the longitudinal axis such that the source fluid flows circumferentially in a tangential swirling manner within the inner wall of the swirl chamber around the longitudinal axis and forward along the longitudinal axis.

18. The spray wand of claim 15, wherein the housing has a mix output opening leading to the swirl chamber and a bypass output opening leading to the main body.

19. The spray wand of claim 18, wherein:

the valve core is rotatable at least partially around a rotational axis;

the valve core has a mix output channel and a bypass output channel;

the bypass output channel is offset from the mix output channel along the rotational axis; and the mix output channel and the bypass output channel are directed in opposite radial directions to align in alternating order with the respective mix output opening and bypass output opening corresponding to mix and bypass modes of the spray wand as the valve core is rotated.

* * * * *